(12) United States Patent
Talagala et al.

(10) Patent No.: US 9,075,710 B2
(45) Date of Patent: Jul. 7, 2015

(54) NON-VOLATILE KEY-VALUE STORE

(75) Inventors: Nisha Talagala, Livermore, CA (US);
Swaminathan Sundararaman, Santa Clara, CA (US); Bharath Ramsundar, Fremont, CA (US); Ashish Batwara, Fremont, CA (US)

(73) Assignee: SanDisk Technologies, Inc., Plano, TX (US)

( * ) Notice: Subject to any disclaimer, the term of this patent is extended or adjusted under 35 U.S.C. 154(b) by 295 days.

(21) Appl. No.: 13/590,107

(22) Filed: Aug. 20, 2012

(65) Prior Publication Data

US 2013/0275656 A1 Oct. 17, 2013

Related U.S. Application Data

(60) Provisional application No. 61/625,614, filed on Apr. 17, 2012, provisional application No. 61/637,179, filed on Apr. 23, 2012.

(51) Int. Cl.
*G06F 12/02* (2006.01)

(52) U.S. Cl.
CPC .... *G06F 12/0246* (2013.01); *G06F 2212/7201* (2013.01)

(58) Field of Classification Search
CPC .......................... G06F 12/0246; G06F 12/0292
See application file for complete search history.

(56) References Cited

U.S. PATENT DOCUMENTS

| 5,794,253 | A | 8/1998 | Norin et al. | |
| 8,392,428 | B1 | 3/2013 | Bonwick et al. | |
| 8,578,126 | B1 | 11/2013 | Gaonkar et al. | |
| 8,589,362 | B1 | 11/2013 | Braam et al. | |
| 2005/0076185 | A1* | 4/2005 | Bhatti | 711/206 |
| 2006/0200700 | A1 | 9/2006 | Malcolm | |
| 2008/0109543 | A1 | 5/2008 | Abanami et al. | |
| 2011/0276578 | A1 | 11/2011 | Allalouf et al. | |
| 2011/0276744 | A1* | 11/2011 | Sengupta et al. | 711/103 |
| 2012/0089797 | A1* | 4/2012 | Shibayama et al. | 711/162 |
| 2012/0102298 | A1* | 4/2012 | Sengupta et al. | 711/216 |
| 2013/0055249 | A1* | 2/2013 | Vaghani et al. | 718/1 |
| 2013/0103729 | A1* | 4/2013 | Cooney et al. | 707/831 |
| 2013/0117227 | A1* | 5/2013 | Kruglick | 707/626 |

OTHER PUBLICATIONS

"Couchbase Server Manual 1.8", Couchbase, Feb. 13, 2012, pp. 157, http://www.couchbase.com/docs/couchbase-manual-1.8/index.html.
U.S. Appl. No. 13/748,559, 2380.2.105, Office Action, Jun. 30, 2014.

* cited by examiner

*Primary Examiner* — Charles Rones
*Assistant Examiner* — Tian-Pong Chang
(74) *Attorney, Agent, or Firm* — Kunzler Law Group, PC

(57) ABSTRACT

Apparatuses, systems, and methods are disclosed for a key-value store. A method includes encoding a key of a key-value pair into a logical address of a sparse logical address space for a non-volatile medium. A method includes mapping a logical address to a physical location in the non-volatile medium. A method includes storing a value of a key-value pair at a physical location.

30 Claims, 13 Drawing Sheets

NON-VOLATILE KEY-VALUE STORE

CROSS-REFERENCES TO RELATED APPLICATIONS

This application claims the benefit of U.S. Provisional Patent Application No. 61/625,614 entitled "APPARATUS, SYSTEM, AND METHOD FOR A KEY-VALUE STORE" and filed on Apr. 17, 2012 for David Flynn, et al. and to U.S. Provisional Patent Application No. 61/637,179 entitled "APPARATUS, SYSTEM, AND METHOD FOR A KEY-VALUE STORE" and filed on Apr. 23, 2012 for David Flynn, et al., which are incorporated herein by reference.

TECHNICAL FIELD

This disclosure relates to data stores and more particularly relates to persistently storing data values indexed by keys.

BACKGROUND

Data stored in a storage device is often accessible using a block device interface. The data is typically visible and accessible to any client with access to the storage device. Operating systems or other storage clients can erase data from the storage device, format the storage device, and otherwise manipulate and change the data.

Further, stored data is often unorganized and may be difficult to categorize or manage. Organizing or categorizing stored data often involves extra overhead for clients or for a storage controller, such as an extra layer of mapping, increased usage of volatile memory to store organizational data, or the like. This overhead can decrease the performance of the storage device to provide additional categorization or organization.

SUMMARY

Methods for a non-volatile key-value store are presented. In one embodiment, a method includes encoding a key of a key-value pair into a logical address within a sparse logical address space for a non-volatile medium. In a further embodiment, a method includes mapping a logical address to a physical location on a non-volatile medium. A method, in certain embodiments, includes storing a value of a key-value pair at a physical location.

Apparatuses for a non-volatile key-value store are presented. In one embodiment, a key-value mapping module is configured to determine a logical address for a key-value pair based on a key of the key-value pair in response to a key-value command. An exists module, in certain embodiments, is configured to determine whether data for a logical address is stored in a non-volatile device based on a logical-to-physical address mapping structure for the non-volatile device. A device interface module, in a further embodiment, is configured to translate a key-value command to one or more primitive storage operations for a non-volatile device to satisfy a key-value command.

In one embodiment, an apparatus includes means for mapping a key of a key-value pair to a logical address for a non-volatile memory medium using a known transform. An apparatus, in a further embodiment, includes means for mapping logical addresses for a non-volatile memory medium to physical locations in a non-volatile memory medium. In certain embodiments, an apparatus includes means for writing a value of a key-value pair and associated key-value metadata to a physical location.

Computer program products comprising a computer readable storage medium storing computer usable program code executable to perform operations are presented. In one embodiment, an operation includes hashing keys of key-value pairs into key address portions of logical addresses of a sparse logical address space for a non-volatile memory device. An operation, in a further embodiment, includes dividing logical addresses into a key address portion and a value address portion, the value address portions configured to segment a sparse logical address space into contiguous data ranges for key-value pairs. In certain embodiments, an operation includes maintaining a logical-to-physical address mapping structure mapping logical addresses to physical locations in a non-volatile memory device.

In one embodiment, the method includes providing a buffer of at least one logical address between stored key-value pairs in the sparse logical address space. In a further embodiment, the method includes storing key-value metadata for the key-value pair logically contiguous with the value of the key-value pair in the sparse logical address space. In a further embodiment, a storage capacity recovery process for the non-volatile recording media stores the value of the key-value pair and the key-value metadata for the key-value pair contiguously on the non-volatile recording media in response to detecting buffers of at least one logical address each between the key-value pair and adjacent key-value pairs in the sparse logical address space. In one embodiment, the key-value metadata includes at least the key and the pool identifier. In a further embodiment, encoding the pool identifier comprises determining a hash value of the pool identifier and including the hash value directly in the logical address.

In one embodiment, encoding the pool identifier into the logical address comprises including the pool identifier directly in the logical address in response to a maximum pool identifier value satisfying a size threshold. Encoding the pool identifier into the logical address, in another embodiment, includes determining a hash value of the pool identifier and including the hash value in the logical address in response to a maximum pool identifier value failing to satisfy the size threshold. In one embodiment, encoding the key into the logical address includes hashing the key and the pool identifier and including a resulting hash value in the logical address.

In one embodiment, the method includes searching a logical-to-physical address mapping structure of the non-volatile recording media for a logical address entry within a logical address range associated with the key-value pair in response to a put command for the key-value pair. In a further embodiment, the method includes hashing the key-value pair to a different logical address range in response to locating a logical address entry within the logical address range associated with the key-value pair. In one embodiment, the method includes storing the value within the logical address range associated with the key-value pair in response to (a) locating an existing logical address entry within the logical address range and (b) determining that the value does not overlap with a different value associated with the located logical address entry. The existing logical address entry, in certain embodiments, is for a different key-value pair and the different value is associated with the different key-value pair.

In one embodiment, the sparse logical address space is larger than a storage capacity of the non-volatile recording media. The encoding of the pool identifier into the logical address, in certain embodiments, is transparent to a logical-to-physical translation layer that maps the logical address to the location in the non-volatile recording media.

Apparatuses for key-value pool identifier encoding are presented. In one embodiment, a key-value mapping module is configured to encode a key of a key-value pair into a key address portion of a logical address of a sparse logical address space for non-volatile storage media. In another embodiment, a pool module is configured to encode a pool identifier for the key-value pair into a value address portion of the logical address. In a further embodiment, the value address portion has a number of bits selected so that the value address portion addresses at least a maximum size key-value pair value. In one embodiment, a logical-to-physical translation layer is configured to map the logical address to a location for the value, or a portion of the value, of the key-value pair in the non-volatile storage media.

In a further embodiment, the apparatus includes a client interface module configured to receive one or more key-value store commands for the key-value pair from one or more clients. In various embodiments, the one or more key-value store commands may include a CREATE command, a POOL CREATE command, an OPEN command, a PUT command, a GET command, a DELETE command, a DELETE POOL command, a DELETE ALL command, an ITERATOR NIT command, a BEGIN command, a NEXT command, a GET CURRENT command, an ENUMERATE command, an EXPORT command, a GET STORE INFO command, a SET STORE METADATA, a GET POOL INFO command, a SET POOL METADATA command, a GET KEY INFO command, a SET KEY METADATA command, a REGISTER NOTIFICATION HANDLER command, a CLOSE command, a DESTROY command, a BATCH GET command, and/or a BATCH PUT command.

In one embodiment, the apparatus includes a device interface module configured to fulfill the one or more key-value store commands using one or more primitive operations of a non-volatile storage controller for the non-volatile storage media. In a further embodiment, the one or more primitive operations include an ATOMIC WRITE operation, an EXISTS operation, a RANGE EXISTS operation, a RANGE READ operation, a CONDITIONAL WRITE operation, a and/or a persistent TRIM operation. In another embodiment, the apparatus includes an exists module configured to search a logical address range associated with the key-value pair to confirm that the logical address range is not assigned to a different key-value pair. In one embodiment, the value address portion is sized to address the maximum size key-value pair value and a logical offset indicated by the encoded pool identifier.

One embodiment of a system for key-value pool identifier encoding includes a non-volatile memory device including a sequential log-based writing structure preserved by non-volatile memory media. In one embodiment, the system includes a non-volatile memory controller for the non-volatile memory device. In one embodiment, the non-volatile memory controller includes a key-value mapping module configured to encode a key of a key-value pair into a first portion of a logical address of a sparse logical address space for the non-volatile memory media. In another embodiment, the non-volatile memory controller includes a pool module configured to encode a pool identifier for the key-value pair into a second portion of the logical address. In a further embodiment, the non-volatile memory controller includes a logical-to-physical translation layer configured to map the logical address to a location for a value of the key-value pair in the sequential log-based writing structure.

In one embodiment, the system includes a computer device and the non-volatile memory device is in communication with the computer device over one or more communications buses. In a further embodiment, the non-volatile memory controller at least partially comprises a device driver for the non-volatile memory device. In a further embodiment, the device driver is executing on the computer device.

One embodiment of a computer program product comprising a computer readable storage medium storing computer usable program code executable to perform operations for key-value pool identifier encoding is presented. The operations, in certain embodiment, include hashing at least a key of a key-value pair into a key address portion of a logical address within a sparse logical address space for non-volatile storage media. In one embodiment, the operations include encoding a pool identifier for the key-value pair into a value address portion of the logical address. A size of the value address portion, in one embodiment, is selected to segment the sparse logical address space into a plurality of regions. Each region, in certain embodiments, is associated with a key address portion of a logical address.

In another embodiment, the operations include mapping the logical address to a location for a value of the key-value pair in the non-volatile storage media. In a further embodiment, the operations include including the pool identifier directly in the value address portion of the logical address in response to a maximum pool identifier being less than or equal to a maximum encodable value and determining a hash value of the pool identifier and including the hash value in the value address portion of the logical address in response to a maximum pool identifier value being greater than the maximum encodable value.

Another apparatus for key-value pool identifier encoding, in one embodiment, includes means for encoding a key of a key-value pair into a logical address of a sparse logical address space for non-volatile recording media. In a further embodiment, the apparatus includes means for encoding a pool identifier for the key-value pair into the logical address. In one embodiment, the apparatus includes means for mapping the logical address to a location for a value of the key-value pair in the non-volatile recording media. In a further embodiment, the apparatus includes means for providing a buffer of at least one logical address between stored key-value pairs in the sparse logical address space.

Methods for key-value pool identifier encoding are presented. In certain embodiments, a method includes mapping a key of a key-value pair to a slot within a sparse logical address space of non-volatile memory media. In a further embodiment, a method includes determining an offset for the key-value pair within the slot based on a pool identifier for the key-value pair. A method, in another embodiment, includes reading a populated range of data comprising a value of the key-value pair from a range of logical addresses. The range of logical addresses may include a logical address associated with the slot and the offset.

In one embodiment, the key is mapped to the slot by hashing the key to form a hash value, the hash value identifying a starting logical address for the slot. The pool identifier, in certain embodiments, is encoded as the offset within the slot by encoding the pool identifier into least significant bits of the logical address. A number of the least significant bits allocated to encode the offset, in one embodiment, defines a size of the slot. In one embodiment, the slot is sized to address at least a maximum size for the value of the key-value pair and the offset. The sparse logical address space, in a further embodiment, is segmented into a plurality of slots. Each of the plurality of slots, in one embodiment, are sized to provide a buffer of at least one logical address between stored key-value pairs in the sparse logical address space.

BRIEF DESCRIPTION OF THE DRAWINGS

In order that the advantages of the disclosure will be readily understood, a more particular description will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
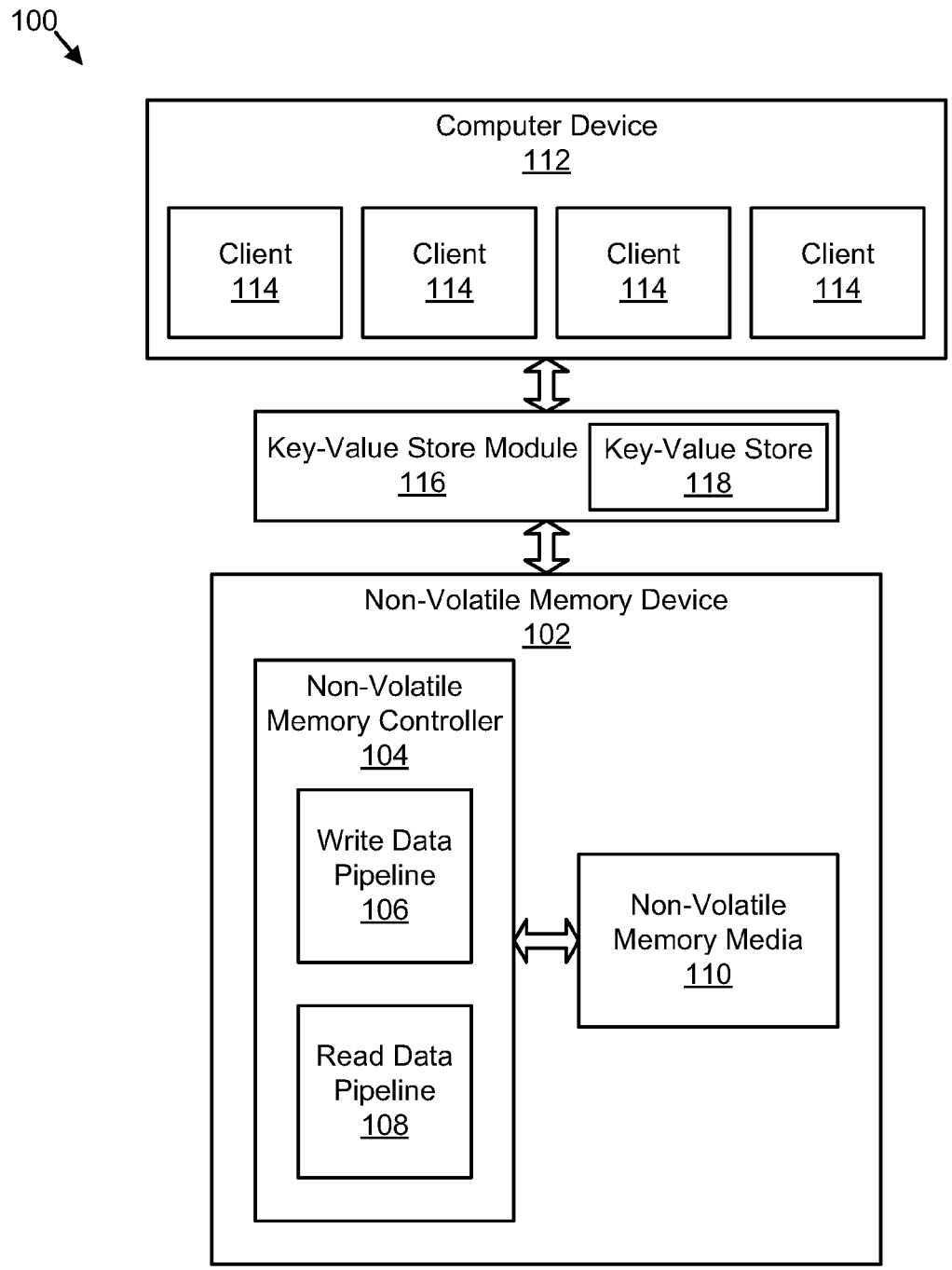
FIG. 1A is a schematic block diagram illustrating one embodiment of a system for a key-value store.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Non-Volatile Memory System

FIG. 1A depicts one embodiment of a system 100 for a key-value store 118. The system 100 includes a non-volatile memory device 102, a non-volatile memory controller 104, a write data pipeline 106, a read data pipeline 108, a non-volatile memory media 110, a computer device 112, several clients 114, and a key-value store module 116, which are described below.

The system 100 includes at least one non-volatile memory device 102. In another embodiment, the system 100 includes two or more non-volatile memory devices 102. Each non-volatile memory device 102 may include non-volatile memory media 110, such as flash memory, nano random access memory ("nano RAM or NRAM"), nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), magneto-resistive RAM ("MRAM"), dynamic RAM ("DRAM"), phase change RAM ("PRAM"), or other non-volatile solid-state storage media. In other embodiments, the non-volatile memory media 110 may comprise magnetic media, optical media, or other types of non-volatile storage media. For example, in those embodiments, the non-volatile memory device 102 may comprise a hard disk drive, an optical storage drive, or the like. While the non-volatile memory media 110 is referred to herein as "memory media," in various embodiments, the non-volatile memory media 110 may more generally comprise a non-volatile recording media capable of recording data, which may be referred to as a non-volatile memory media, a non-volatile storage media, or the like. Further, the non-volatile memory device 102, in various embodiments, may comprise a non-volatile recording device, a non-volatile memory device, a non-volatile storage device, or the like. The non-volatile memory device 102 is described in more detail with respect to FIGS. 2 and 3. The non-volatile memory device 102 is depicted in communication with several clients 114 executing on a computer device 112.

In one embodiment, the non-volatile memory device 102 is internal to the computer device 112 and is connected using a system communications bus, such as a peripheral component interconnect express ("PCI-e") bus, a Serial Advanced Technology Attachment ("serial ATA") bus, or the like. In another embodiment, the non-volatile memory device 102 is external to the computer device 112 and is connected using an external communications bus, such as a universal serial bus ("USB") connection, an Institute of Electrical and Electronics Engineers ("IEEE") 1394 bus ("FireWire"), or the like. In other embodiments, the non-volatile memory device 102 is connected to the computer device 112 using a peripheral component interconnect ("PCI") express bus using external electrical or optical bus extension or bus networking solution such as Infiniband or PCI Express Advanced Switching ("PCIe-AS"), or the like.

In various embodiments, the non-volatile memory device 102 may be in the form of a dual-inline memory module ("DIMM"), a daughter card, or a micro-module. In another embodiment, the non-volatile memory device 102 is an element within a rack-mounted blade. In another embodiment, the non-volatile memory device 102 is contained within a package that is integrated directly onto a higher level assembly (e.g., mother board, lap top, graphics processor). In another embodiment, individual components comprising the non-volatile memory device 102 are integrated directly onto a higher level assembly without intermediate packaging.

The non-volatile memory device 102 includes one or more non-volatile memory controllers 104, each may include a write data pipeline 106 and a read data pipeline 108 and each includes a non-volatile memory media 110, which are described in more detail below with respect to FIGS. 2 and 3.

The system 100 includes one or more computer devices 112 connected to the non-volatile memory device 102. A computer device 112 may be a host device, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, a computer device 112 may be a client and the non-volatile memory device 102 operates autonomously to service data requests sent from the computer device 112. In this embodiment, the computer device 112 and non-volatile memory device 102 may be connected using a computer network, system bus, or other communication means suitable for connection between a computer device 112 and an autonomous non-volatile memory device 102. The computer device 112 is one embodiment of a host device for the non-volatile memory device 102.

In one embodiment, the computer device 112 and/or the one or more clients 114 may be connected to the non-volatile memory device 102 through one or more computer networks. In one embodiment, the client 114 operates within the computer device 112. The client 114 may be an application, a server, an applet, a thread, a driver, a database management system, a daemon, or the like. In another embodiment, a client 114 may include hardware, such as a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. A computer network may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. A computer network may also include a network from the IEEE 802 family of network technologies, such Ethernet, token ring, WiFi, WiMax, and the like.

A computer network may include servers, switches, routers, cabling, radios, and other equipment used to facilitate networking computers device 112, clients 114, and/or the non-volatile memory device 102. In one embodiment, the system 100 includes multiple computer devices 112 that communicate as peers over a computer network. In another embodiment, the system 100 includes multiple non-volatile memory devices 102 that communicate as peers over a computer network. One of skill in the art will recognize other computer networks and related equipment with single or redundant connections between one or more clients 114 and/or computer devices 112 with one or more non-volatile memory devices 102 or with one or more non-volatile memory devices 102 connected to one or more computer devices 112. In one embodiment, the system 100 includes two or more non-volatile memory devices 102 connected through a computer network to a client 114 without a computer device 112.

In the depicted embodiment, the one or more clients 114 are in communication with the non-volatile memory device 102 through the key-value store module 116. In certain embodiments, the one or more clients 114 may also be in communication with the non-volatile memory device 102 through a block device interface or the like. The key-value store module 116 maintains one or more key-value stores 118 that associate data values with unique keys, and provides the data values to the clients 114 in exchange for the corresponding keys.

The key-value store module 116 persists data values on the non-volatile memory media 110 of the non-volatile memory device 102. The data values, in certain embodiments, may have variable lengths. In one embodiment, the key-value store module 116 stores data values in a restricted set of logical block addresses of the non-volatile memory device 102, so that the data values are only available to clients 114 through the key-value store module 116. As used herein, a restricted set of logical block addresses is a set of logical block addresses that are unavailable to clients 114 using a block device interface and/or are exclusively available to clients 114 using a key-value store interface. The restricted set of logical block addresses may be unavailable and substantially invisible to clients 114 using a block device interface to access the non-volatile memory device 102. In embodiments where the non-volatile memory device 102 stores workload or user data received over a block device interface and data values of a key-value store 118, the key-value store module 116 may store data values of the key-value store 118 on the non-volatile memory media 110 together with the workload or user data, so that the key-value store data values receive the same data protection features as the workload data. In this manner, the data values of the key-value store 118 may be logically separated from workload data, but physically intermingled with workload data on the non-volatile memory media 110.

In certain embodiments, persistent data values may include cache binding information, startup configuration information, runtime configuration information, license information, device driver software, data map information, logical-to-physical address mapping information, recovery information, or other data or metadata values for the non-volatile memory device 102. In other embodiments, persistent data values may include parameters, settings, profiles, software, data files, or other data values for clients 114. By persistently storing data values indexed by keys, the key-value store module 116 maintains the data values across pairings of the non-volatile memory device 102 with different computer devices 112, for different clients 114, and the like which may access the data values using associated keys.

Other types of data stores or protected storage areas are often only hidden until opened or unlocked using a special command or setting, at which point the protected storage area is typically visible and available to any client 114 using a standard block device interface. In certain embodiments, unlike these other types of protected storage areas, the key-value store module 116 may not provide stored data values to clients 114 using a block device interface, so that data values in a key-value store 118 of the key-value store module 116 are not inadvertently unlocked or made visible to other clients 114, but are available exclusively through a key-value store interface or application program interface ("API") of the key-value store module 116. In other embodiments, clients 114 may access stored data values using a block device interface, such as the memory controller interface 124 described below with regard to FIG. 1B, or the like.

In one embodiment, the logical address space of the non-volatile memory device 102 or of an individual virtual storage unit ("VSU") of the non-volatile memory device 102 is a sparse address space that is either as large as, or is larger than, the physical storage capacity of the non-volatile memory device 102. VSUs are described in greater detail below with regard to FIG. 1B. A sparse logical address space, in certain embodiments, allows the non-volatile memory device 102 to use a single logical address space for keys and for the associated data values.

For example, the key-value store module 116 may divide a logical address space into a key portion and a data value portion to share a single logical address space between keys and data values. In another embodiment, the key-value store module 116 may divide individual logical addresses into a key address portion and a value address portion, logically segmenting the logical address space into contiguous ranges for each data value. In one embodiment, using a single logical address space, a single mapping structure, or the like for mapping keys to data values and for mapping logical addresses to physical locations on the non-volatile memory media 110 eliminates the need for a separate key-value map, key-value index, key-value tags, or the like, for which look-up time overhead would otherwise increase access times of the non-volatile memory device 102 by requiring look-ups in multiple maps or indexes.

A sparse logical address space, in certain embodiments, may be thinly provisioned. For example, the storage capacity of the non-volatile memory media 110 may be smaller than a size of the sparse logical address space of the non-volatile memory device 102 and the non-volatile memory controller 104 may allocate storage capacity of the non-volatile memory media 110 and map logical addresses to the allocated storage capacity as the logical addresses are used. Dynamically mapping and allocating physical storage capacity of the non-volatile memory media 110 on demand using a thinly provisioned, sparse logical address space, in one embodiment, provides an efficient use of the non-volatile memory media 110, using physical capacity as it is requested.

As the key-value store module 116 and/or the non-volatile memory controller 104 clear, trim, replace, delete, expire, and/or evict, data from the non-volatile memory device 102, the physical addresses and associated physical storage media of the non-volatile memory media 110 in the depicted embodiment, are freed to store data for other logical addresses. In one embodiment, the non-volatile memory controller 104 stores the data (such as data values of a key-value store 118) at physical addresses using a log-based, append-only writing structure such that data cleared from the non-volatile memory device 102 or overwritten by a subsequent write request invalidates other data in the log. Consequently, a garbage collection process recovers the physical capacity of the invalid data in the log. One embodiment of the log-based, append only writing structure is a logically ring-like, cyclic data structure, as new data is appended to the log-based writing structure, previously used physical capacity is reused in a circular, theoretically infinite manner.

The key-value store module 116, in one embodiment, stores a data value to the non-volatile memory device 102, in response to a PUT command or the like for an associated key, using an ATOMIC WRITE operation to guarantee the atomicity of the data value, updates to the data value, and the like. An ATOMIC WRITE operation, in certain embodiments, provides variable size writes to accommodate variable sized data values. The key-value store module 116, in a further embodiment, in response to a GET command or the like for an associated key, uses an EXISTS operation to determine whether the non-volatile memory media 110 stores a data value for the key. For example, in one embodiment, membership in a logical-to-physical address mapping structure for the non-volatile memory device 102 denotes storage, or existence, in the non-volatile memory media 110 and an EXISTS operation queries the logical-to-physical address mapping structure to ascertain existence or storage of a data value.

In response to a DELETE command or the like for a key, in one embodiment, the key-value store module 116 uses a persistent TRIM ("PTRIM") operation to delete, erase, remove, or otherwise clear the associated data value from the non-volatile memory media 110. A PTRIM operation, in certain embodiments, operates atomically to clear data values from the non-volatile memory media 110 to free the associated physical capacity of the non-volatile memory media 110 for storing other data and to free the LBA associated with the cleared data values for association with other data. ATOMIC WRITE, EXISTS, and PTRIM operations, in certain embodiments, are primitive operations that the non-volatile memory controller 104 provides to the key-value store module 116, allowing the key-value store module 116 to store and retrieve variable sized data values efficiently without wasting physical storage capacity of the non-volatile memory media 110.

In one embodiment, the key-value store module 116 may manage a plurality of pools within a key-value store 118 for clients 114. Clients 114, in certain embodiments, may manage key-value pairs in pools to group related key-value pairs, categorize key-value pairs, or the like. Pools may provide an abstraction to group or categorize logically related key-value pairs within a key-value store 118. Pools may enable clients 114 to manage key-value pairs more efficiently, by performing management operations for an entire pool instead of for individual key-value pairs, such as a pool or group delete or the like.

In certain embodiments, to make efficient use of the sparse logical address space, to avoid increased use of volatile memory and/or the non-volatile memory media 110, or the like, the key-value store module 116 may use the sparse logical address space of the non-volatile memory device 102, or of a VSU, to encode pool identifiers as an offset within a range of logical addresses for a key-value pair. By encoding pool identifiers into logical addresses of a sparse logical address space, the key-value store module 116 may organize a key-value store 118 into key-value pools within a logical-to-physical address mapping structure, without separately storing, tracking, or mapping pool identifiers, thereby minimizing the overhead of providing key-value pools to clients 114. In one embodiment, encoding pool identifiers into logical addresses of a sparse logical address space may alleviate the need to allocate additional volatile memory to store a pool identifier for each key-value pair.

Figure 1B:
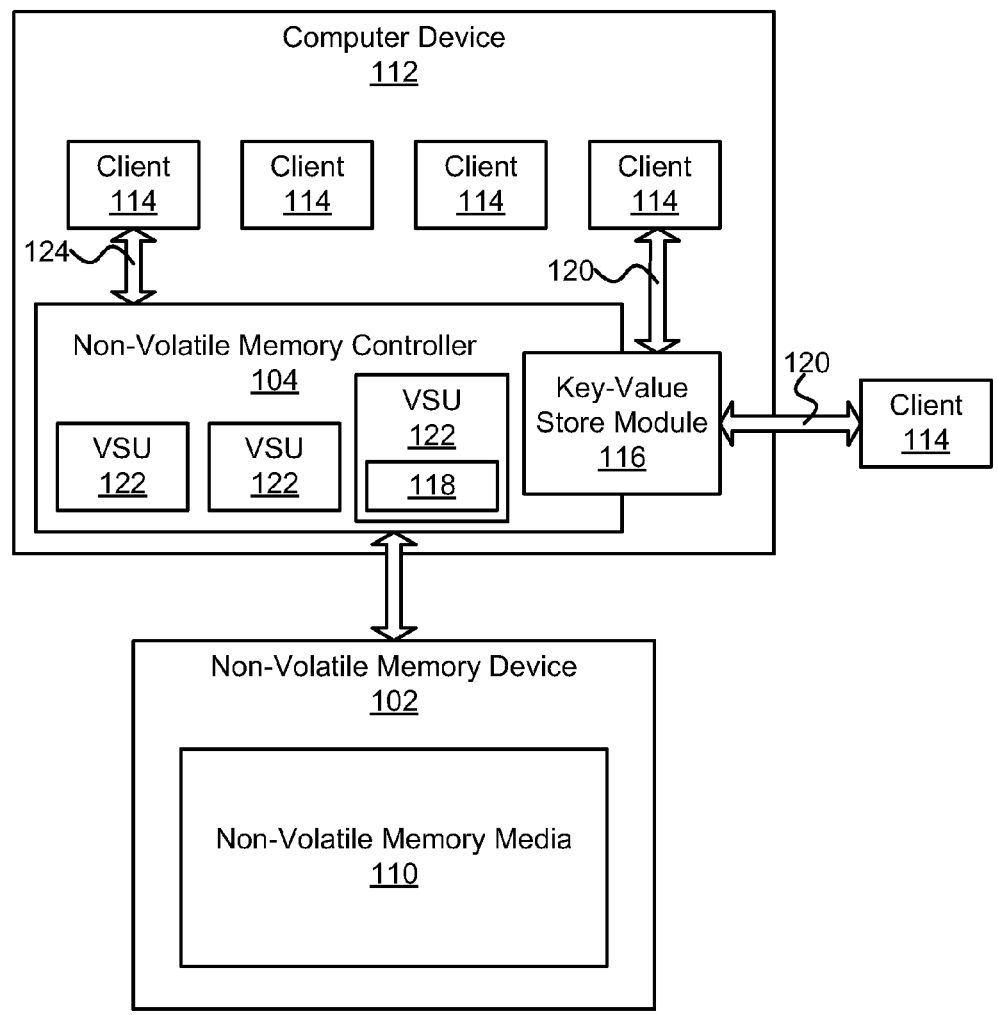
FIG. 1B is a schematic block diagram illustrating another embodiment of a system for key-value pool identifier encoding.

FIG. 1B depicts a further embodiment of a system 101 for a key-value store 118. The system 101, in certain embodiments, may be substantially similar to the system 100 described above with regard to FIG. 1A. The system 101 includes a plurality of clients 114 and a plurality of VSUs 122. Several of the clients 114, in the depicted embodiment, comprise software clients executing on the computer device 112 and communicating with the key-value store module 116 over the key-value store interface 120 internally within the computer device 112. The system 101 also includes a client 114 that is external to the computer device 112 and communicating with the key-value store module 116 over the key-value store interface 120 externally to the computer device 112, over a data network or the like.

The non-volatile memory device 102 may be a general-purpose storage device, memory device, or the like and may serve other functions in addition to providing one or more key-value stores 118. In the depicted embodiment, the non-volatile memory device 102 stores data of the VSUs 122 for the clients 114, which may serve as key-value stores 118, cache units, general-purpose storage units, swap/memory extension units, sparse address space units, or the like. The key-value store module 116 provides a key-value store interface 120 over which the key-value store module 116 exchanges key-value information for key-value store 118 VSUs 122 of the non-volatile memory device 102.

The clients 114, in one embodiment, each comprise software and/or hardware that use a key-value store 118. For example, a client 114 may include a database program such as a database management system ("DBMS"), a server, an operating system, a file system manager, or other entities that use a key-value store 118. The key-value store module 116, in certain embodiments, exchanges key-value information with the clients 114 over the key-value store interface 120, allowing the clients 114 to customize setup and management of individual VSUs 122 of the non-volatile memory device 102, including key-value store 118 VSUs 122.

The key-value store module 116 cooperates with the non-volatile memory controller 104 to create and manage key-value store 118 VSUs 122 for the clients 114. Each VSU is a data structure maintained by the non-volatile memory controller 104 to logically divide the non-volatile memory device 102 into independent storage units or containers, so that the non-volatile memory device 102 may be shared between multiple clients 114. Each VSU 122 may have different properties and attributes, such as different use cases, different quality-of-service ("QoS") levels, different priority levels, different logical address space types (e.g., sparse logical address space, contiguous logical address space), different replication attributes, different logical and/or physical storage capacities, or the like. Clients 114, in certain embodiments, may independently create, delete, and manage VSUs 122. The non-volatile memory controller 104 may store metadata defining attributes of the VSUs 122 in volatile and/or nonvolatile storage of the computer device 112, the non-volatile memory device 102, or the like.

Attributes and metadata of a VSU 122 may be used to ensure high availability, to provide failover, or the like. For example, if a first VSU 122 encounters a fault, error, or otherwise fails, the non-volatile memory controller 104 may use the attributes and metadata of the failed first VSU 122 to migrate one or more clients 114 to a second VSU 122. The attributes of a failed VSU 122 may allow the non-volatile memory controller 104 to manage storage capacity allocation for a newly allocated VSU 122, to select a suitable VSU 122 as a failover candidate, and the like.

While the VSUs 122 depicted in FIG. 1B are logically associated with a single non-volatile memory controller 104, with physical non-volatile memory media 110 provided by a single non-volatile memory device 102, in another embodiment, the system 101 may include a plurality of non-volatile memory devices 102, a plurality of non-volatile memory controllers 104, or the like, each with associated VSUs 122. The non-volatile memory controller 104, in certain embodiments, may use a plurality of VSUs 122 in cooperation. For example, the non-volatile memory controller 104 may stack, layer, aggregate, export, and/or replicate one or more VSUs 122 to extend across multiple software layers, across data networks, across non-volatile memory devices 102, or the like. In other embodiments, the non-volatile memory controller 104 may stripe or mirror data to multiple VSUs 122, provide snapshots of one or more VSUs 122, or the like.

While each VSU 122 may be logically independent, in one embodiment, data stored in different VSUs 122 is intermingled in the non-volatile memory media 110. For example, the non-volatile memory media 110 may store data using a sequential, append-only, log-based writing structure, and the non-volatile memory controller 104 may write data of several VSUs 122 sequentially to an append point of the log-based writing structure as the key-value store module 116 receives data values from clients 114. Because data from each VSU 122, in certain embodiments, is written to the same append point, the data from different VSUs 122 may be dispersed throughout the log-based writing structure on the non-volatile memory media 110.

By logically separating the data from different VSUs 122 but intermingling the data physically, data from each VSU 122 receives the same data protection characteristics. For example, as described in greater detail below with regard to FIG. 3, the non-volatile memory controller 104, the write data pipeline 106, and the read data pipeline 108 provide certain data protection characteristics for data, such as error correction, garbage collection or storage capacity recovery, power cut or power loss protection, or the like to protect the integrity of data on the non-volatile memory media 110. The non-volatile memory controller 104 applies these data protection characteristics to data regardless of which VSU 122 logically corresponds to the data.

Another benefit of storing data for VSUs 122 in a sequential, append-only, log-based writing structure as the non-volatile memory controller 104 receives data from clients 114, is that one or more of the VSUs 122 may be thinly provisioned, having a larger logical address space than the physical storage capacity of the non-volatile memory media 110. In a thinly provisioned embodiment, the non-volatile memory controller 104 may allocate physical storage capacity of the non-volatile memory media 110 to a VSU 122 as the physical storage capacity is used, instead of allocating the entire storage capacity of the VSU 122 initially when the VSU 122 is created. Additionally, the non-volatile memory controller 104 may export a logical address space for a VSU 122 to a client 114 (e.g., a sparse address space) that is much larger than the physical storage capacity of the non-volatile memory media 110. The non-volatile memory controller 104 may provision the logical address space when creating a VSU 122, and allocate physical storage capacity to the VSU 122 dynamically in response to a write request from a client 114.

In various embodiments, the key-value store module 116 may be independent from the non-volatile memory controller 104 or may be integrated with the non-volatile memory controller 104, in a single virtual storage layer, or the like. Further, the non-volatile memory controller 104 and the key-value store module 116 may comprise one or more device drivers installed on the computer device 112 and/or one or more hardware controllers of the non-volatile memory device 102. In the depicted embodiment, the system 101 includes the key-value store interface 120 between clients 114 and the key-value store module 116 and also includes a memory controller interface 124 between clients 114 and the non-volatile memory controller 104. Clients 114 that use VSUs 122 as key-value store 118 units send and receive key-value information over the key-value store interface 120 while other clients 114 may send and receive general storage commands over the memory controller interface 124. Certain clients 114 may communicate with both the key-value store module 116 over the key-value store interface 120 and the non-volatile memory controller 104 over the memory controller interface 124. In other embodiments, where the key-value store module 116 and the non-volatile memory controller 104 are integrated, the key-value store interface 120 and the memory controller interface 124 may comprise a single interface, as parts of a single API or the like.

In one embodiment, the key-value store module 116 sends and receives key/value information, and communicates with the non-volatile memory controller 104, which manages and controls the non-volatile memory device 102. In response to a request or command from a client 114, the key-value store module 116 and/or the non-volatile memory controller 104 may create a VSU 122, configure the VSU 122 as a key-value store 118 unit, and further manage the key-value store 118 unit VSU 122. Examples of how the key-value store module 116 may manage key-value store 118 unit VSUs 122 based on exchanging key-value information with clients 114 may include managing address spaces for VSUs 122, managing storage capacity for VSUs 122, prioritizing data within VSUs 122 and/or between VSUs 122, evicting data from cache unit VSUs 122, trimming data from VSUs 122, setting retention requirements for data of VSUs 122, adjusting capacity over time as the non-volatile memory device 102 ages, or the like. Providing a key-value store interface 120 over which clients 114 may customize and manage their own key-value store 118 unit VSUs 122 allows the key-value store module 116 to provide key-value capabilities that closely match the use patterns and caching requirements of the clients 114, even for clients 114 of different types with different characteristics.

Non-Volatile Memory

Figure 2:
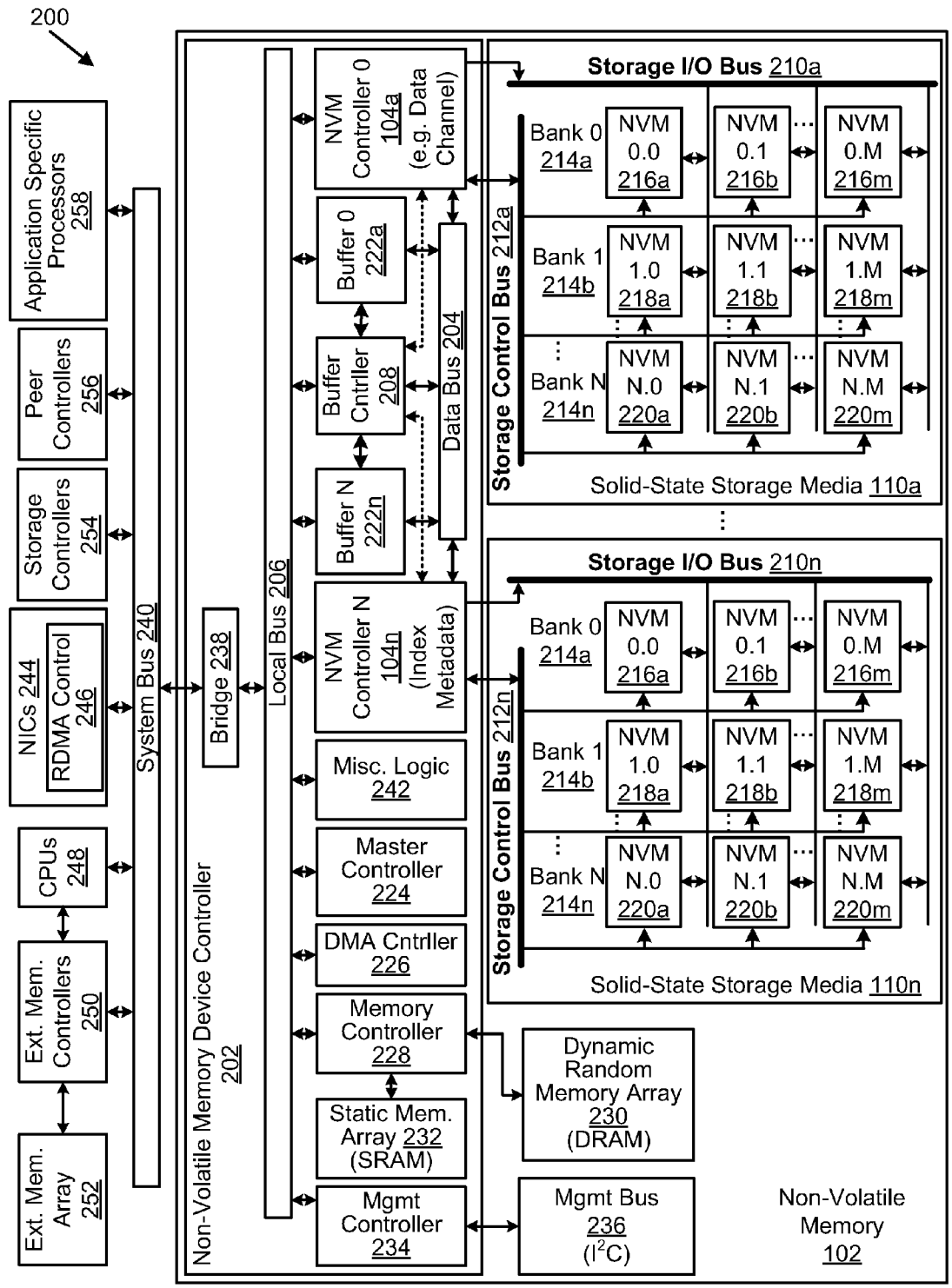
FIG. 2 is a schematic block diagram illustrating one embodiment of a non-volatile memory controller in a non-volatile memory.

FIG. 2 depicts one embodiment 200 of a non-volatile memory device controller 202 that includes a write data pipeline 106 and a read data pipeline 108 in a non-volatile memory device 102. The non-volatile memory device controller 202 may be embodied as hardware, as software, or as a combination of hardware and software. The non-volatile memory device controller 202 may include a number of non-volatile memory controllers 0-N 104a-n, each controlling non-volatile memory media 110.

In the depicted embodiment, two non-volatile memory controllers are shown: non-volatile memory controller 0 104a and non-volatile memory controller N 104n, and each controls non-volatile memory media 110a-n. In the depicted embodiment, non-volatile memory controller 0 104a controls a data channel so that the attached non-volatile memory media 110a stores data. Non-volatile memory controller N 104n controls an index metadata channel associated with the stored data and the associated non-volatile memory media 110n stores index metadata. In an alternate embodiment, the non-volatile memory device controller 202 includes a single non-volatile memory controller 104a with a single non-volatile memory media 110a. In another embodiment, there are a plurality of non-volatile memory controllers 104a-n and associated non-volatile memory media 110a-n. In one embodiment, one or more non-volatile memory controllers 104a-104n−1, coupled to their associated non-volatile memory media 110a-110n−1, control data while at least one non-volatile memory controller 104n, coupled to its associated non-volatile memory media 110n, controls index metadata.

In one embodiment, at least one non-volatile memory controller 104 is field-programmable gate array ("FPGA") and controller functions are programmed into the FPGA. In a particular embodiment, the FPGA is a Xilinx® FPGA. In another embodiment, the non-volatile memory controller 104 comprises components specifically designed as a non-volatile memory controller 104, such as an application-specific integrated circuit ("ASIC") or custom logic solution. Each non-volatile memory controller 104 typically includes a write data pipeline 106 and a read data pipeline 108, which are describe further in relation to FIG. 3. In another embodiment, at least one non-volatile memory controller 104 is made up of a combination FPGA, ASIC, and custom logic components.

The non-volatile memory media 110 is an array of non-volatile memory elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the non-volatile memory media 110, data cannot be read from the non-volatile memory media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A non-volatile memory element (e.g., NVM 0.0 216a) is typically configured as a chip (a package of one or more dies) or a die on a circuit board. As depicted, a non-volatile memory element (e.g., 216a) operates independently or semi-independently of other non-volatile memory elements (e.g., 218a) even if these several elements are packaged together in a chip package, a stack of chip packages, or some other package element. As depicted, a row of non-volatile memory elements 216a, 216b, 216m is designated as a bank 214.

As depicted, there may be "n" banks 214a-n and "m" non-volatile memory elements 216a-m, 218a-m, 220a-m per bank in an array of n×m non-volatile memory elements 216, 218, 220 in a non-volatile memory media 110. Of course different embodiments may include different values for n and m. In one embodiment, the non-volatile memory media 110a includes twenty non-volatile memory elements 216, 218, 220 per bank 214 with eight banks 214. In one embodiment, the non-volatile memory media 110a includes twenty four non-volatile memory elements 216, 218, 220 per bank 214 with eight banks 214. In addition to the n×m storage elements 216, 218, 220, one or more additional columns (P) may also be addressed and operated in parallel with other non-volatile memory elements 216a, 216b, 216m for one or more rows. The added P columns in one embodiment, store parity data for the portions of an ECC chunk (i.e. an ECC codeword) that span m storage elements for a particular bank. In one embodiment, each non-volatile memory element 216, 218, 220 is comprised of single-level cell ("SLC") devices. In another embodiment, each non-volatile memory element 216, 218, 220 is comprised of multi-level cell ("MLC") devices.

In one embodiment, non-volatile memory elements that share a common storage I/O bus 210a (e.g., 216b, 218b, 220b) are packaged together. In one embodiment, a non-volatile memory element 216, 218, 220 may have one or more dies per chip with one or more chips stacked vertically and each die may be accessed independently. In another embodiment, a non-volatile memory element (e.g., NVM 0.0 216a) may have one or more virtual dies per die and one or more dies per chip and one or more chips stacked vertically and each virtual die may be accessed independently. In another embodiment, a non-volatile memory element NVM 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g., NVM 0.0-NVM 8.0) 216a-220a, each in a separate bank 214a-n. In another embodiment, 24 storage elements (e.g., NVM 0.0-NVM 0.24) 216 form a logical bank 214a so that each of the eight logical banks has 24 storage elements (e.g., NVM 0.0-NVM 8.24) 216, 218, 220. Data is sent to the non-volatile memory media 110 over the storage I/O bus 210 to all storage elements of a particular group of storage elements (NVM 0.0-NVM 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In a one embodiment, the storage I/O bus 210 is comprised of one or more independent I/O buses ("IIOBa-m" comprising 210a.a-m, 210n.a-m) wherein the non-volatile memory elements within each column share one of the independent I/O buses that accesses each non-volatile memory element 216, 218, 220 in parallel so that all banks 214 are accessed simultaneously. For example, one channel of the storage I/O bus 210 may access a first non-volatile memory element 216a, 218a, 220a of each bank 214a-n simultaneously. A second channel of the storage I/O bus 210 may access a second non-volatile memory element 216b, 218b, 220b of each bank 214a-n simultaneously. Each row of non-volatile memory element 216a, 216b, 216m is accessed simultaneously. In one embodiment, where non-volatile memory elements 216, 218, 220 are multi-level (physically stacked), all physical levels of the non-volatile memory elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level non-volatile memory element 216, 218, 220. In other embodiments, other commands are used by the storage control bus 212 to individually select one level of a multi-level non-volatile memory element 216, 218, 220. Non-volatile memory elements 216, 218, 220 may also be selected through a combination of control and of address information transmitted on storage I/O bus 210 and the storage control bus 212.

In one embodiment, each non-volatile memory element 216, 218, 220 is partitioned into erase blocks and each erase block is partitioned into pages. An erase block on a non-volatile memory element 216, 218 220 may be called a physical erase block or "PEB." A typical page is 2000 bytes ("2 kB"). In one example, a non-volatile memory element (e.g., NVM 0.0) includes two registers and can program two pages so that a two-register non-volatile memory element 216, 218, 220 has a capacity of 4 kB. A bank 214 of 20 non-volatile memory elements 216a, 216b, 216m would then have an 80 kB capacity of pages accessed with the same address going out the channels of the storage I/O bus 210.

This group of pages in a bank 214 of non-volatile memory elements 216a, 216b, 216m of 80 kB may be called a logical page or virtual page. Similarly, an erase block of each storage element 216a-m of a bank 214a may be grouped to form a logical erase block or a virtual erase block. In one embodiment, an erase block of pages within a non-volatile memory element 216, 218, 220 is erased when an erase command is received within a non-volatile memory element 216, 218, 220. Whereas the size and number of erase blocks, pages, planes, or other logical and physical divisions within a non-volatile memory element 216, 218, 220 are expected to change over time with advancements in technology, it is to be expected that many embodiments consistent with new configurations are possible and are consistent with the general description herein.

Typically, when a packet is written to a particular location within a non-volatile memory element 216, 218, 220, wherein the packet is intended to be written to a location within a particular page which is specific to a particular physical erase block of a particular storage element of a particular bank, a physical address is sent on the storage I/O bus 210 and followed by the packet. The physical address contains enough information for the non-volatile memory element 216, 218, 220 to direct the packet to the designated location within the page. Since all storage elements in a column of storage elements (e.g., NVM 0.0-NVM N.0 216a, 218a, 220a) are accessed simultaneously by the appropriate bus within the storage I/O bus 210a.a, to reach the proper page and to avoid writing the data packet to similarly addressed pages in the column of storage elements (NVM 0.0-NVM N.0 216a, 218a, 220a), the bank 214a that includes the non-volatile memory element NVM 0.0 216a with the correct page where the data packet is to be written is simultaneously selected by the storage control bus 212.

Similarly, satisfying a read command on the storage I/O bus 210 requires a simultaneous signal on the storage control bus 212 to select a single bank 214a and the appropriate page within that bank 214a. In one embodiment, a read command reads an entire page, and because there are multiple non-volatile memory elements 216a, 216b, 216m in parallel in a bank 214, an entire logical page is read with a read command. However, the read command may be broken into subcommands, as will be explained below with respect to bank interleave. A logical page may also be accessed in a write operation.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank (e.g., Bank 0 214a) is selected over the storage control bus 212 to prevent erasure of similarly addressed erase blocks in all of the banks (Banks 1-N 214b-n). Alternatively, no particular bank (e.g., Bank 0 214a) is selected over the storage control bus 212 to enable erasure of similarly addressed erase blocks in all of the banks (Banks 1-N 214b-n) simultaneously. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the non-volatile memory media 110. For example, packets are streamed to the storage write buffers of a bank 214a of storage elements 216 and when the buffers are full, the packets are programmed to a designated logical page. Packets then refill the storage write buffers and, when full, the packets are written to the next logical page. The next logical page may be in the same bank 214a or another bank (e.g., 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the non-volatile memory media 110. When a copy is made, new copy of the requested data is created and a new entry is created in the index mapping the new copy of the requested data to the original packets. The new copy of the requested data is also written to the non-volatile memory media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the non-volatile memory media 110 and allows the non-volatile memory device controller 202 to monitor storage hot spots and level usage of the various logical pages in the non-volatile memory media 110. Sequentially writing packets also facilitates a powerful, efficient garbage collection system, which is described in detail below. One of skill in the art will recognize other benefits of sequential storage of data packets.

Non-Volatile Memory Controller

In various embodiments, the non-volatile memory device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the computer device 112 or may be other devices.

Typically the non-volatile memory controller(s) 104 communicate data to the non-volatile memory media 110 over a storage I/O bus 210. In a typical embodiment where the non-volatile memory is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of data independent busses 204. In one embodiment, each storage I/O bus 210 accessing a column of storage elements (e.g., 216a, 218a, 220a) may include a logical-to-physical address mapping for storage divisions (e.g., erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the non-volatile memory controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a non-volatile memory controller 104, and on to the non-volatile memory media 110 such as NAND flash or other storage media. In one embodiment, data and associated out-of-band metadata ("metadata") arriving with the data is communicated using one or more data channels comprising one or more non-volatile memory controllers 104a-104n-1 and associated non-volatile memory media 110a-110n-1 while at least one channel (non-volatile memory controller 104n, non-volatile memory media 110n) is dedicated to in-band metadata, such as index information and other metadata generated internally to the non-volatile memory device 102.

The local bus 206 is typically a bidirectional bus or set of busses that allows for communication of data and commands between devices internal to the non-volatile memory device controller 202 and between devices internal to the non-volatile memory device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a computer device 112 or other device in which the non-volatile memory device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The non-volatile memory device 102 may be packaged to fit internally to a device or as an externally connected device.

The non-volatile memory device controller 202 includes a master controller 224 that controls higher-level functions within the non-volatile memory device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/non-volatile memory device controller 202 manages multiple data storage devices/non-volatile memory media 110a-n, the master controller 224 divides the work load among internal controllers, such as the non-volatile memory controllers 104a-n. For example, the master controller 224 may divide an object to be written to the data storage devices (e.g., non-volatile memory media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a computer device 112 or other device connected to the storage device/ non-volatile memory device 102 views the storage device/ non-volatile memory device 102 as a block storage device and sends data to specific physical addresses in the storage device/ non-volatile memory device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in the computer device 112, client 114, or other device wishing to use the storage device/non-volatile memory device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a client 114 may have access to a computer network through an I/O memory driver using a standard stack API and operating in conjunction with NICs 244.

In one embodiment, the master controller 224 is also a redundant array of independent drive ("RAID") controller. Where the data storage device/non-volatile memory device 102 is networked with one or more other data storage devices/ non-volatile memory devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via a computer network) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/non-volatile memory device 102 may appear as a storage device connected through a SCSI bus, Internet SCSI ("iSCSI"), fiber channel, etc. Meanwhile the storage device/non-volatile memory device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/non-volatile memory device 102 to be partitioned into multiple virtual devices and allows partition-based media encryption. In yet another embodiment, the master controller 224 supports a non-volatile memory controller 104 with advanced, multi-bit ECC correction. One of skill in the art will recognize other features and functions of a master controller 224 in a non-volatile memory device controller 202, or more specifically in a non-volatile memory device 102.

In one embodiment, the non-volatile memory device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the non-volatile memory media 110n or other non-volatile memory. One of skill in the art will recognize other uses and configurations of the memory controller 228, dynamic memory array 230, and static memory array 232.

In one embodiment, the non-volatile memory device controller 202 includes a DMA controller 226 that controls DMA operations between the storage device/non-volatile memory device 102 and one or more external memory controllers 250 and associated external memory arrays 252 and CPUs 248. Note that the external memory controllers 250 and external memory arrays 252 are called external because they are external to the storage device/non-volatile memory device 102. In addition the DMA controller 226 may also control RDMA operations with requesting devices through a NIC 244 and associated RDMA controller 246.

In one embodiment, the non-volatile memory device controller 202 includes a management controller 234 connected to a management bus 236. Typically the management controller 234 manages environmental metrics and status of the storage device/non-volatile memory device 102. The management controller 234 may monitor device temperature, fan speed, power supply settings, etc. over the management bus 236.

The management controller 234 may support the reading and programming of erasable programmable read only memory ("EEPROM") for storage of FPGA code and controller software. Typically the management bus 236 is connected to the various components within the storage device/non-volatile memory device 102. The management controller 234 may communicate alerts, interrupts, etc. over the local bus 206 or may include a separate connection to a system bus 240 or other bus. In one embodiment the management bus 236 is an Inter-Integrated Circuit ("I2C") bus. One of skill in the art will recognize other related functions and uses of a management controller 234 connected to components of the storage device/non-volatile memory device 102 by a management bus 236.

In one embodiment, the non-volatile memory device controller 202 includes miscellaneous logic 242 that may be customized for a specific application. Typically where the non-volatile memory device controller 202 or master controller 224 is/are configured using a FPGA or other configurable controller, custom logic may be included based on a particular application, customer requirement, storage requirement, etc.

Data Pipeline

Figure 3:
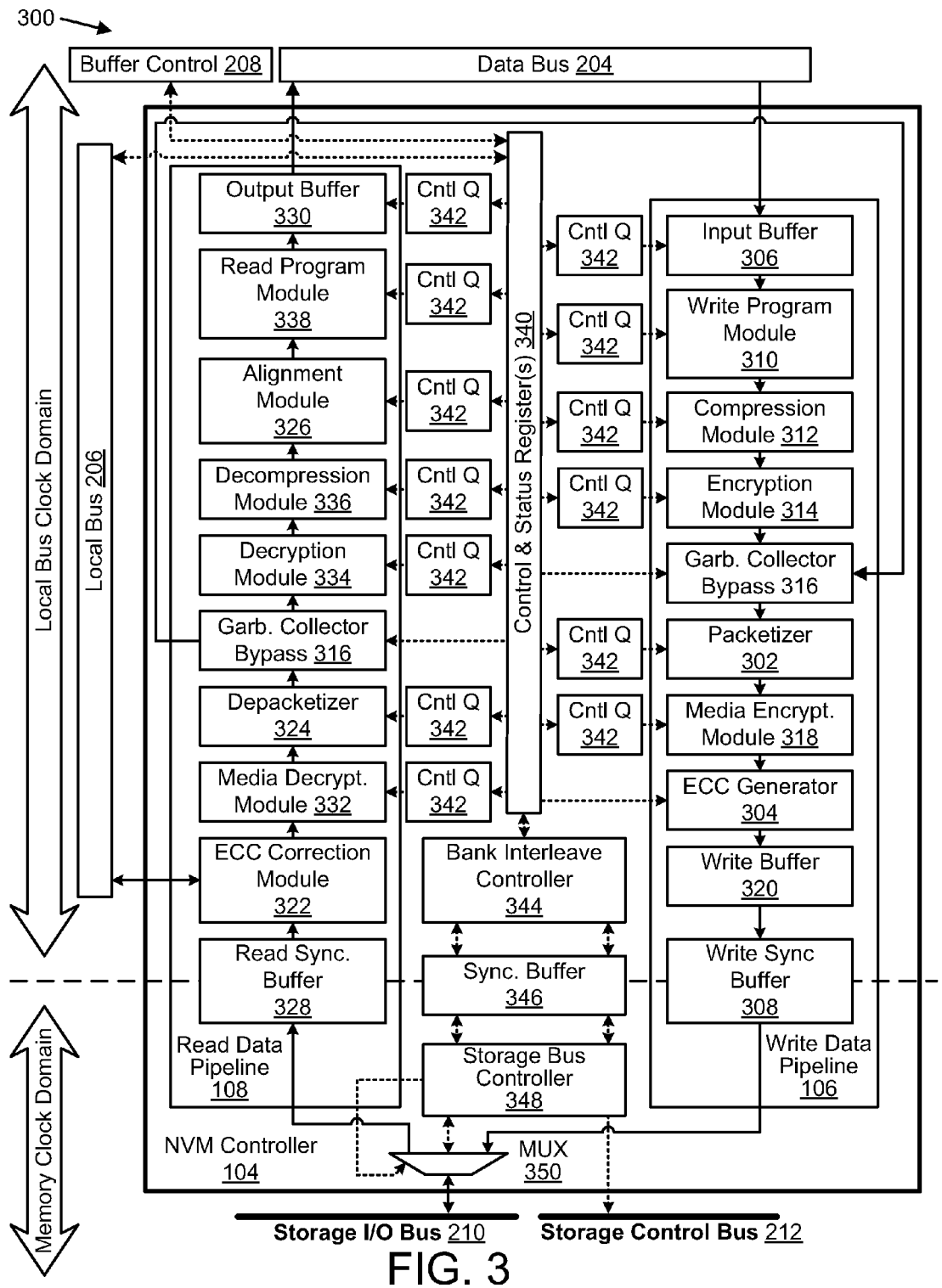
FIG. 3 is a schematic block diagram illustrating one embodiment of a non-volatile memory controller with a write data pipeline and a read data pipeline in a non-volatile memory.

FIG. 3 depicts one embodiment 300 of a non-volatile memory controller 104 with a write data pipeline 106 and a read data pipeline 108 in a non-volatile memory device 102. The embodiment 300 includes a data bus 204, a local bus 206, and buffer control 208, which are substantially similar to those described in relation to the non-volatile memory device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The non-volatile memory controller 104 may also include control and status registers 340 and control queues 342, a bank interleave controller 344, a synchronization buffer 346, a storage bus controller 348, and a multiplexer ("MUX") 350. The components of the non-volatile memory controller 104 and associated write data pipeline 106 and read data pipeline 108 are described below. In other embodiments, synchronous non-volatile memory media 110 may be used and synchronization buffers 308 328 may be eliminated.

Write Data Pipeline

The write data pipeline 106 includes a packetizer 302 that receives a data or metadata segment to be written to the non-volatile memory, either directly or indirectly through another write data pipeline 106 stage, and creates one or more packets sized for the non-volatile memory media 110. The data or metadata segment is typically part of a data structure such as an object, but may also include an entire data structure. In another embodiment, the data segment is part of a block of data, but may also include an entire block of data. Typically, a set of data such as a data structure is received from a computer device 112 or other host device, or other computer or device and is transmitted to the non-volatile memory device 102 in data segments streamed to the non-volatile memory device 102 and/or the computer device 112.

A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the non-volatile memory media 110 to be extended. For example, if flash memory is used as the storage medium in the non-volatile memory media 110, the flash memory may be written approximately 100,000 times without error per erase cycle. This usage limit may be extended using a robust ECC algorithm. Having the ECC generator 304 and corresponding ECC correction module 322 onboard the non-volatile memory device 102, the non-volatile memory device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the non-volatile memory device 102 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the non-volatile memory media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the non-volatile memory device 102, but outside the write data pipeline 106, in the computer device 112, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the non-volatile memory media 110. The write synch buffer 308 is located at a boundary between a local clock domain and a non-volatile memory clock domain and provides buffering to account for the clock domain differences. In other embodiments, synchronous non-volatile memory media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the non-volatile memory device 102 prior to sending the packets to the ECC generator 304. Typically, the entire packet is encrypted, including the headers. In another embodiment, headers are not encrypted. In this document, encryption key is understood to mean a secret encryption key that is managed externally from a non-volatile memory controller 104.

The media encryption module 318 and corresponding media decryption module 332 provide a level of security for data stored in the non-volatile memory media 110. For example, where data is encrypted with the media encryption module 318, if the non-volatile memory media 110 is connected to a different non-volatile memory controller 104, non-volatile memory device 102, or server, the contents of the non-volatile memory media 110 typically could not be read without use of the same encryption key used during the write of the data to the non-volatile memory media 110 without significant effort.

In a typical embodiment, the non-volatile memory device 102 does not store the encryption key in non-volatile storage and allows no external access to the encryption key. The encryption key is provided to the non-volatile memory controller 104 during initialization. The non-volatile memory device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a computer device 112, a server, key manager, or other device that manages the encryption key to be used by the non-volatile memory controller 104. In another embodiment, the non-volatile memory media 110 may have two or more partitions and the non-volatile memory controller 104 behaves as though it was two or more non-volatile memory controllers 104, each operating on a single partition within the non-volatile memory media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the non-volatile memory device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The non-volatile memory device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a computer device 112, key manager, or other device that holds the encryption key to be used to encrypt the data segment. In one embodiment, encryption keys are transferred to the non-volatile memory controller 104 from one of a non-volatile memory device 102, a computer device 112, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the non-volatile memory device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the non-volatile memory device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the non-volatile memory media 110. For example, where data is encrypted with media encryption unique to the specific non-volatile memory device 102 if the non-volatile memory media 110 is connected to a different non-volatile memory controller 104, non-volatile memory device 102, or computer device 112, the contents of the non-volatile memory media 110 typically could not be read without use of the same encryption key used during the write of the data to the non-volatile memory media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the non-volatile memory device 102 is beneficial so that the computer device 112 or other devices writing data to the non-volatile memory device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the non-volatile memory controller 104. In one embodiment, the garbage collector bypass 316 is part of an autonomous garbage collector system that operates within the non-volatile memory device 102. This allows the non-volatile memory device 102 to manage data so that data is systematically spread throughout the non-volatile memory media 110 to improve performance, data reliability and to avoid overuse and underuse of any one location or area of the non-volatile memory media 110 and to lengthen the useful life of the non-volatile memory media 110.

The garbage collector bypass 316 coordinates insertion of segments into the write data pipeline 106 with other segments being written by a computer device 112 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the non-volatile memory media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the non-volatile memory media 110. This allows a write operation to send an entire page of data to the non-volatile memory media 110 without interruption. By sizing the write buffer 320 of the write data pipeline 106 and buffers within the read data pipeline 108 to be the same capacity or larger than a storage write buffer within the non-volatile memory media 110, writing and reading data is more efficient since a single write command may be crafted to send a full virtual page of data to the non-volatile memory media 110 instead of multiple commands.

While the write buffer 320 is being filled, the non-volatile memory media 110 may be used for other read operations. This is advantageous because other non-volatile memory devices with a smaller write buffer or no write buffer may tie up the non-volatile memory when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each non-volatile memory element 216, 218, 220 to the designated page within each non-volatile memory element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the non-volatile memory media 110.

In another embodiment, the write buffer 320 is sized smaller than a virtual page so that less than a page of information could be written to a storage write buffer in the non-volatile memory media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the non-volatile memory media 110 to fill the pages of a virtual page prior to programming the data. In this way a data stall in the write data pipeline 106 would not stall reading from the non-volatile memory device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the non-volatile memory controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the non-volatile memory media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the non-volatile memory media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the non-volatile memory controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the non-volatile memory device 102. In another embodiment, the depacketizer 324 operation may be packet type dependent.

The read data pipeline 108 includes an alignment module 326 that receives data from the depacketizer 324 and removes unwanted data. In one embodiment, a read command sent to the non-volatile memory media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the non-volatile memory media 110 prior to processing by the read data pipeline 108. The read synchronization buffer 328 is at the boundary between the non-volatile memory clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the non-volatile memory controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the non-volatile memory device 102 prior to sending the one or more requested packets to the depacketizer 324. Typically the encryption key used to decrypt data by the media decryption module 332 is identical to the encryption key used by the media encryption module 318. In another embodiment, the non-volatile memory media 110 may have two or more partitions and the non-volatile memory controller 104 behaves as though it was two or more non-volatile memory controllers 104 each operating on a single partition within the non-volatile memory media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a computer device 112, a computer, key manager, or other device that manages the encryption key to be used by the non-volatile memory controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The non-volatile memory controller 104 includes control and status registers 340 and corresponding control queues 342. The control and status registers 340 and control queues 342 facilitate control and sequencing commands and sub-commands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
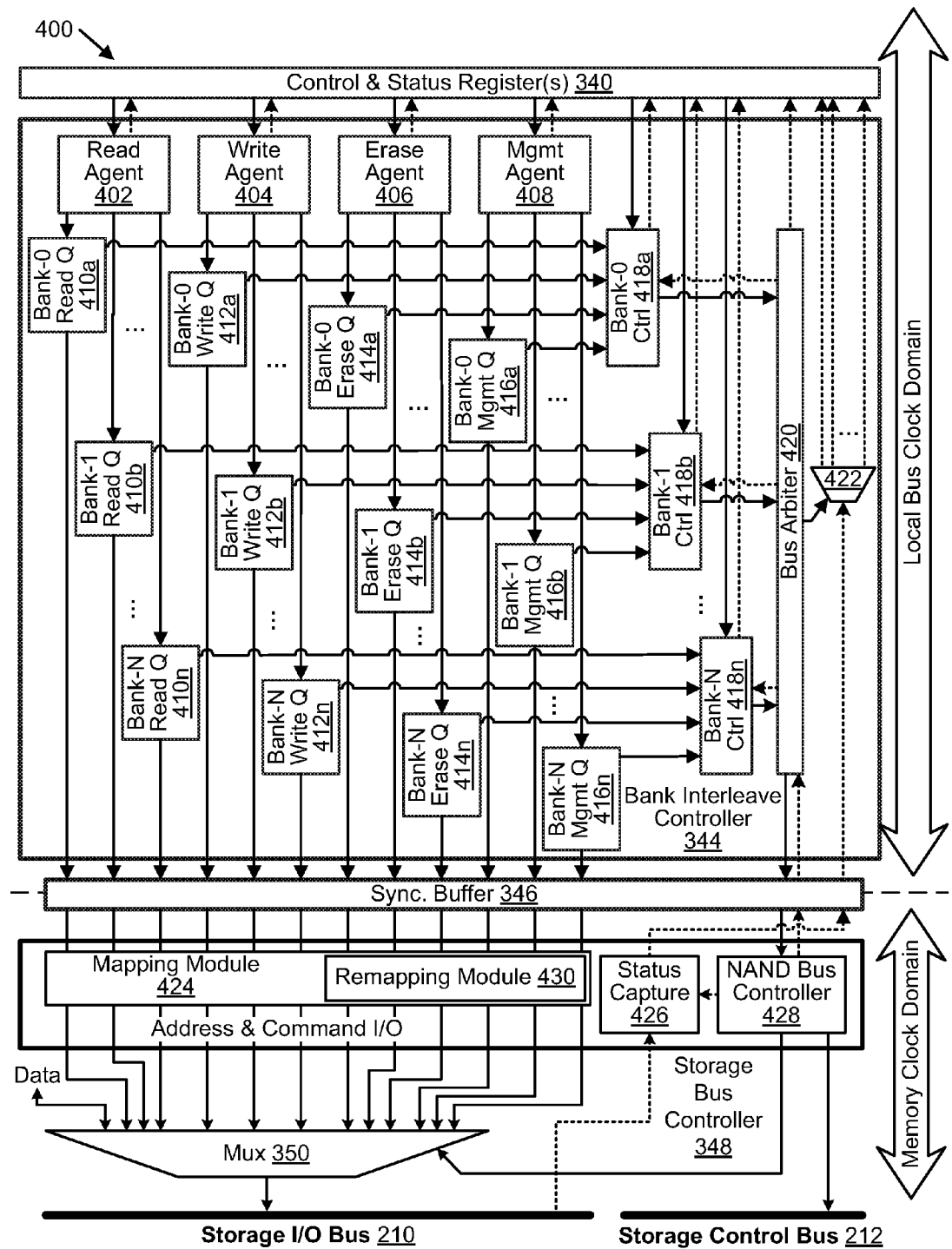
FIG. 4 is a schematic block diagram illustrating one embodiment of a bank interleave controller in a non-volatile memory controller.

The non-volatile memory controller 104 and or the non-volatile memory device 102 may also include a bank interleave controller 344, a synchronization buffer 346, a storage bus controller 348, and a multiplexer ("MUX") 350, which are described in relation to FIG. 4.

Bank Interleave

FIG. 4 depicts one embodiment 400 of a bank interleave controller 344 in the non-volatile memory controller 104. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the non-volatile memory media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the non-volatile memory media 110 execution of the commands stored in the queues, such that a command of a first type executes on one bank 214a while a command of a second type executes on a second bank 214b. The one or more commands are separated by command type into the queues. Each bank 214 of the non-volatile memory media 110 has a corresponding set of queues within the bank interleave controller 344 and each set of queues includes a queue for each command type.

The bank interleave controller 344 coordinates among the banks 214 of the non-volatile memory media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, SONOS, RRAM, PMC, CBRAM, racetrack memory, memristor memory, nanocrystal wire-based memory, silicon-oxide based sub-10 nanometer process memory, graphene memory, etc.

For other types of non-volatile memory media 110, other types of commands and corresponding queues may be included without straying from the scope of the disclosure. The flexible nature of an FPGA non-volatile memory controller 104 allows flexibility in storage media. If flash memory were changed to another non-volatile memory type, the bank interleave controller 344, storage bus controller 348, and MUX 350 could be altered to accommodate the media type without significantly affecting the data pipelines 106, 108 and other non-volatile memory controller 104 functions.

In the embodiment depicted in FIG. 4, the bank interleave controller 344 includes, for each bank 214, a read queue 410 for reading data from the non-volatile memory media 110, a write queue 412 for write commands to the non-volatile memory media 110, an erase queue 414 for erasing an erase block in the non-volatile memory, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the non-volatile memory media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the non-volatile memory media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the non-volatile memory banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate subcommands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the non-volatile memory array 216, select the appropriate location for writing one or more data packets, clear the input buffers within the non-volatile memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the non-volatile memory media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other non-volatile memory media 110 with an asynchronous, bi-directional serial storage I/O bus 210, only one command (control information) or set of data can be transmitted at a time. For example, when write commands or data are being transmitted to the non-volatile memory media 110 on the storage I/O bus 210, read commands, data being read, erase commands, management commands, or other status commands cannot be transmitted on the storage I/O bus 210. For example, when data is being read from the storage I/O bus 210, data cannot be written to the non-volatile memory media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the non-volatile memory elements 110 associated with the bank-0 214a, and sending a command to validate the status of the non-volatile memory elements 216, 218, 220 associated with the bank-0 214a.

The storage bus controller 348 then transmits a write subcommand on the storage I/O bus 210, which contains the physical addresses including the address of the logical erase block for each individual physical erase non-volatile memory element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the non-volatile memory elements 216a-m associated with the bank-0 214a to program the input buffer to the memory cells within the non-volatile memory elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the non-volatile memory media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214*a*, other subcommands of other commands are executing on other banks 214*b-n*. When one command is fully executed on a bank 214*a*, the bus arbiter 420 directs another command to the bank 214*a*. The bus arbiter 420 may also coordinate commands stored in the queues 410, 412, 414, 416 with other commands that are not stored in the queues 410, 412, 414, 416.

For example, an erase command may be sent out to erase a group of erase blocks within the non-volatile memory media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214*a*. While bank-0 214*a* is executing an erase command, the bus arbiter 420 may select other commands for execution on the other banks 214*b-n*. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other non-volatile memory systems without a bank interleave function.

In one embodiment, the non-volatile memory controller 104 includes one bank interleave controller 344 that serves all of the storage elements 216, 218, 220 of the non-volatile memory media 110. In another embodiment, the non-volatile memory controller 104 includes a bank interleave controller 344 for each column of storage elements 216*a-m*, 218*a-m*, 220*a-m*. For example, one bank interleave controller 344 serves one column of storage elements NVM 0.0-NVM M.0 216*a*, 216*b*, . . . 216*m*, a second bank interleave controller 344 serves a second column of storage elements NVM 0.1-NVM M.1 218*a*, 218*b*, . . . 218*m* etc.

Storage-Specific Components

The non-volatile memory controller 104 includes a synchronization buffer 346 that buffers commands and status messages sent and received from the non-volatile memory media 110. The synchronization buffer 346 is located at the boundary between the non-volatile memory clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the non-volatile memory device 102 in order to optimize some aspect of design implementation.

The non-volatile memory controller 104 includes a storage bus controller 348 that interprets and translates commands for data sent to and read from the non-volatile memory media 110 and status messages received from the non-volatile memory media 110 based on the type of non-volatile memory media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the non-volatile memory controller 104 includes a MUX 350 that comprises an array of multiplexers 350*a-n* where each multiplexer is dedicated to a row in the non-volatile memory array 110. For example, multiplexer 350*a* is associated with non-volatile memory elements 216*a*, 218*a*, 220*a*. MUX 350 routes the data from the write data pipeline 106 and commands from the storage bus controller 348 to the non-volatile memory media 110 via the storage I/O bus 210 and routes data and status messages from the non-volatile memory media 110 via the storage I/O bus 210 to the read data pipeline 108 and the control and status registers 340 through the storage bus controller 348, synchronization buffer 346, and bank interleave controller 344.

In one embodiment, the non-volatile memory controller 104 includes a MUX 350 for each column of non-volatile memory elements (e.g., NVM 0.0 216*a*, NVM 1.0 218*a*, NVM N.0 220*a*). A MUX 350 combines data from the write data pipeline 106 and commands sent to the non-volatile memory 110 via the storage I/O bus 210 and separates data to be processed by the read data pipeline 108 from commands. Packets stored in the write buffer 320 are directed on busses out of the write buffer 320 through a write synchronization buffer 308 for each column of non-volatile memory elements (NVM 0.x to NVM N.x 216, 218, 220) to the MUX 350 for each column of non-volatile memory elements (NVM 0.x to NVM N.x 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a non-volatile memory 110 with an array of twenty storage elements (e.g., NVM 0.0 to NVM 0.M 216) per bank 214*a* may have a logical address for a particular erase block mapped to twenty physical addresses of the erase block, one physical address per storage element. Because the storage elements are accessed in parallel, erase blocks at the same position in each storage element in a column of storage elements 216*a*, 218*a*, 220*a* will share a physical address. To select one erase block (e.g., in storage element NVM 0.0 216*a*) instead of all erase blocks in the column (e.g., in storage elements NVM 0.0, 1.0, . . . N.0 216*a*, 218*a*, 220*a*), one bank (in this case Bank 0 214*a*) is selected.

This logical-to-physical address mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element NVM 0.0 216a, to erase block 1 of storage element NVM 0.1 216b, . . . , and to storage element 0.M 216m, virtual erase block 2 may be mapped to erase block 2 of storage element NVM 1.0 218a, to erase block 2 of storage element NVM 1.1 218b, . . . , and to storage element 1.M 218m, etc. Alternatively, virtual erase block 1 may be mapped to one erase block from each storage element in an array such that virtual erase block 1 includes erase block 1 of storage element NVM 0.0 216a to erase block 1 of storage element NVM 0.1 216b to storage element 0.M 216m, and erase block 1 of storage element NVM 1.0 218a to erase block 1 of storage element NVM 1.1 218b, and to storage element 1.M 218m, for each storage element in the array up to erase block 1 of storage element N.M 220m.

If erase block 1 of a storage element NVM 0.0 216a is damaged, experiencing errors due to wear, etc., or cannot be used for some reason, the remapping module 430 could change the logical-to-physical address mapping for the logical address that pointed to erase block 1 of virtual erase block 1. If a spare erase block (call it erase block 221) of storage element NVM 0.0 216a is available and currently not mapped, the remapping module 430 could change the mapping of virtual erase block 1 to point to erase block 221 of storage element NVM 0.0 216a, while continuing to point to erase block 1 of storage element NVM 0.1 216b, erase block 1 of storage element NVM 0.2 (not shown) . . . , and to storage element 0.M 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the non-volatile memory 110 and sends the status messages to the status MUX 422. In another embodiment, when the non-volatile memory 110 is flash memory, the storage bus controller 348 includes a NAND bus controller 428. The NAND bus controller 428 directs commands from the read and write data pipelines 106, 108 to the correct location in the non-volatile memory 110, coordinates timing of command execution based on characteristics of the flash memory, etc. If the non-volatile memory 110 is another non-volatile memory type, the NAND bus controller 428 would be replaced by a bus controller specific to the storage type. One of skill in the art will recognize other functions of a NAND bus controller 428.

Key-Value Store

Figure 5:
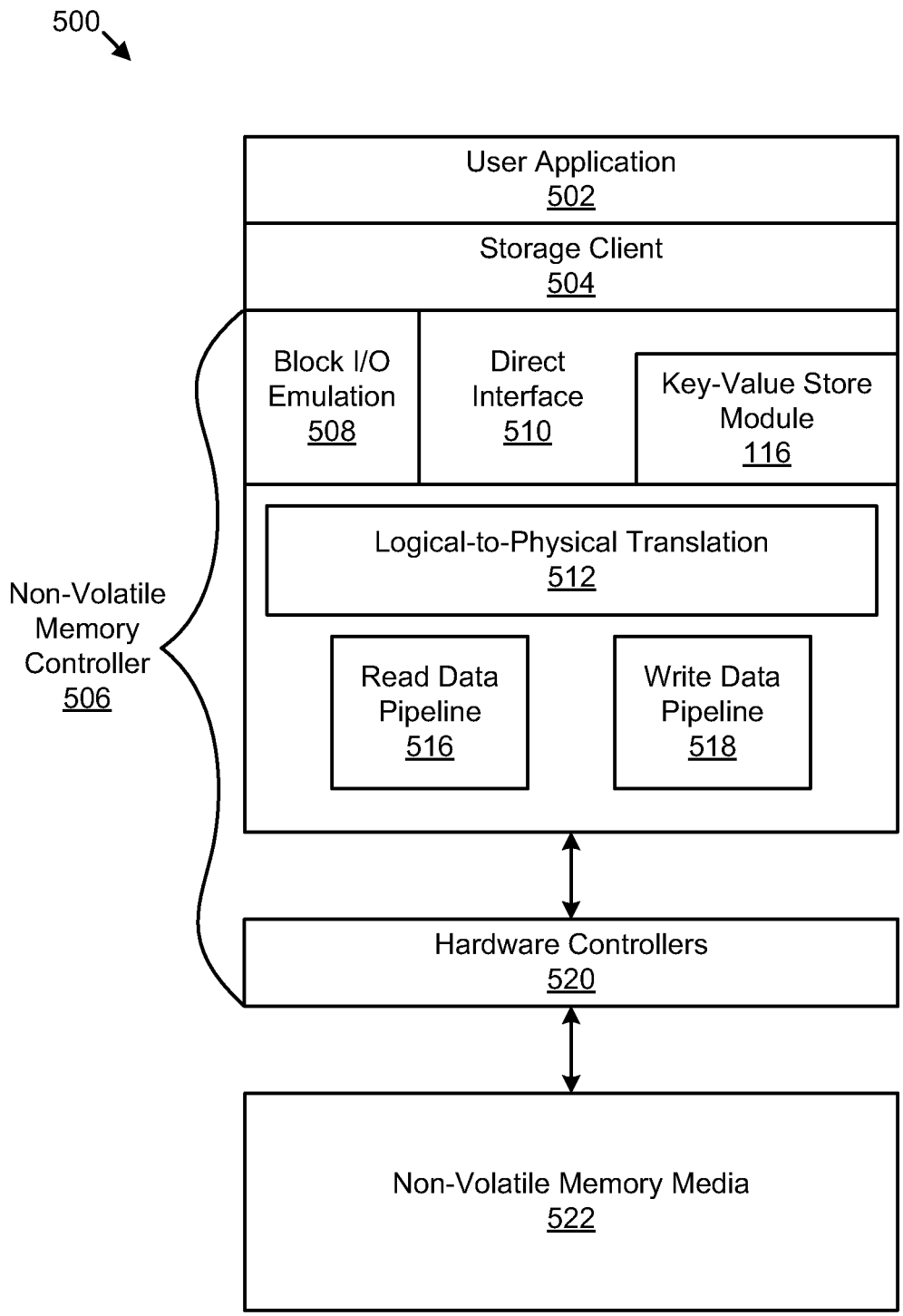
FIG. 5 is a schematic block diagram illustrating one embodiment of a logical representation of a non-volatile memory controller.

FIG. 5 depicts one embodiment of a logical representation 500 of a non-volatile memory controller 506 with a key-value store module 116. The non-volatile memory controller 506 may be similar, in certain embodiments, to the non-volatile memory controller 104 depicted in FIG. 1A, FIG. 1B, and FIG. 2 and may include one or more non-volatile memory controllers 104. The depicted embodiment shows a user application 502 in communication with a storage client 504. The storage client 504 is in communication with a non-volatile memory controller 506 that includes a logical-to-physical translation layer 512, a read data pipeline 516, and a write data pipeline 518.

The non-volatile memory controller 506 manages the non-volatile memory media 522. The non-volatile memory controller 506 may include various hardware and software controllers, drivers, and software, such as the depicted hardware controllers 520.

In one embodiment, the depicted hardware controllers 520 may be substantially similar to and include similar functionality as the non-volatile memory controllers 104 and accompanying controllers and modules depicted in FIG. 2 and/or the bank interleave controller 344 and storage bus controller 348 depicted in FIG. 3. In addition, the read data pipeline 516 and the write data pipeline 518 may be substantially similar to the read data pipeline 108 and the write data pipeline 106 depicted in FIG. 1A and FIG. 3. The non-volatile memory media 522 be substantially similar to the non-volatile memory media 110 and associated array of non-volatile memory banks 214 depicted in FIG. 2.

In one embodiment, the user application 502 is a software application, device driver, or other client 114 operating on or in conjunction with the storage client 504. The storage client 504 manages files and data and utilizes the functions and features of the non-volatile memory controller 506 and associated non-volatile memory media 522. Representative examples of storage clients 504 include, but are not limited to, a server, a file system, an operating system, a database management system ("DBMS"), a volume manager, and the like. The storage client 504 is in communication with the non-volatile memory controller 506. In one embodiment, the storage client 504 communicates through an Input/Output (I/O) interface represented by a block I/O emulation layer 508 and/or the direct interface 510.

Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, certain non-volatile memory devices 102 do not directly or necessarily associate logical block addresses with particular physical blocks. These non-volatile memory devices 102 may emulate a conventional block storage interface to maintain compatibility with block storage clients 504.

When the storage client 504 communicates through the block I/O emulation layer 508, the non-volatile memory device 102 appears to the storage client 504 as a conventional block storage device. In one embodiment, the non-volatile memory controller 506 provides a block I/O emulation layer 508 which serves as a block device interface, or API. In this embodiment, the storage client 504 communicates with the non-volatile memory device 102 through this block device interface. In one embodiment, the block I/O emulation layer 508 receives commands and logical block addresses from the storage client 504 in accordance with this block device interface. As a result, the block I/O emulation layer 508 provides the non-volatile memory device 102 compatibility with block storage clients 504.

In one embodiment, a storage client 504 communicates with the non-volatile memory controller 506 through a direct interface layer 510. In this embodiment, the non-volatile memory device 102 directly exchanges information in a format specific to non-volatile storage devices. A non-volatile memory device 102 supporting a direct interface 510 may store data on the non-volatile memory media 522 as blocks, sectors, pages, logical blocks, logical pages, erase blocks, logical erase blocks, ECC chunks, logical ECC chunks, data values, or in any other format or structure advantageous to the technical characteristics of the non-volatile memory media 522. The non-volatile memory controller 506 receives a logical address and a command from the storage client 504 and performs the corresponding operation in relation to the non-volatile memory media 522. The non-volatile memory controller 506 may support a block I/O emulation layer 508, a direct interface 510, or both a block I/O emulation layer 508 and a direct interface 510.

In the depicted embodiment, clients 114, such as user applications 502 and/or storage clients 504, communicate with the key-value store module 116 using a direct interface 510. The key-value store module 116 makes data values available to clients 114 over the direct interface 510. Clients 114 send key-value store commands, such as create key-value store commands, read or GET commands, write or PUT commands, delete commands, enumerate commands, export commands, or the like, directly to the key-value store module 116 to access and manipulate data values by associated keys. In one embodiment, the direct interface 510 presents an API or other interface for the key-value store module 116 to clients 114 as part of a device driver for the non-volatile memory device 102.

The key-value store API or other key-value store interface of the key-value store module 116 may support several commands, requests, function calls, or the like. In one embodiment, the key-value store API or other key-value store interface supports a create key-value store command that initializes or creates a new key-value store 118 for a requesting client 114. Another key-value store API command is a read request or GET command, discussed in greater detail below with regard to the get module 708 of FIGS. 6 and 7. A client 114 issues a read request or GET command with a key, and the key-value store module 116 responds by returning the data value corresponding to the key. A write request or PUT command of the key-value store API is described below with regard to the put module 706 of FIG. 7. A client 114 issues a write request or PUT command to the key-value store module 116 with a data value to add to a key-value store 118. In one embodiment, a client 114 manages its own keys, and sends a key to the key-value store module 116 with a write request or PUT command. In another embodiment, the key-value store module 116 may manage and assign keys, and may generate a key for a data value in response to receiving a write request or PUT command, sending the generated key back to the requesting client 114.

An additional key-value store API command is a delete request. Delete requests are described in greater detail below with regard to the delete module 710 of FIG. 7. A client 114 sends a delete request to the key-value store module 116 with a key, and the key-value store module 116 deletes the data value corresponding to the key. Another key-value store API command is an enumerate request, described below with regard to the enumerate module 714 of FIG. 7. A client 114 sends an enumerate request to the key-value store module 116 and the key-value store module 116 returns a listing of a set of keys corresponding to data values stored in the key-value store 118, by client identifier, section identifier, or the like. An export request is another type of key-value store API command described below with regard to the export module 716 of FIG. 7. A client 114 sends an export request to the key-value store module 116 and the key-value store module 116 exports a key-value store 118, a portion of a key-value store 118, or the like to the requesting client 114.

Figure 6A:
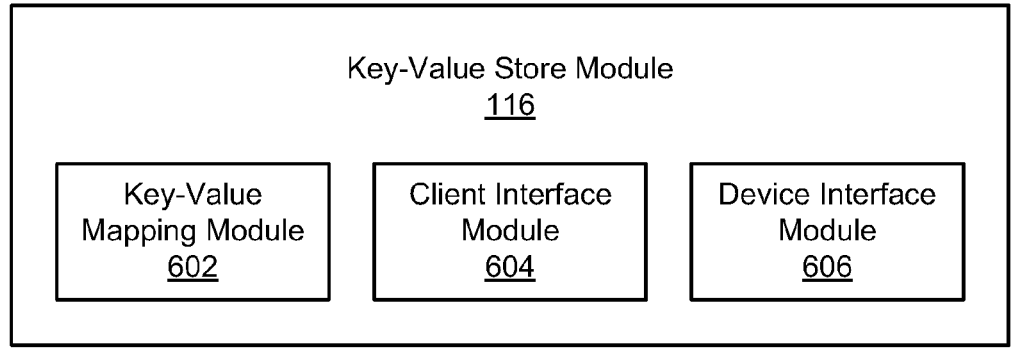
FIG. 6A is a schematic block diagram illustrating one embodiment of a key-value store module.
Figure 6B:
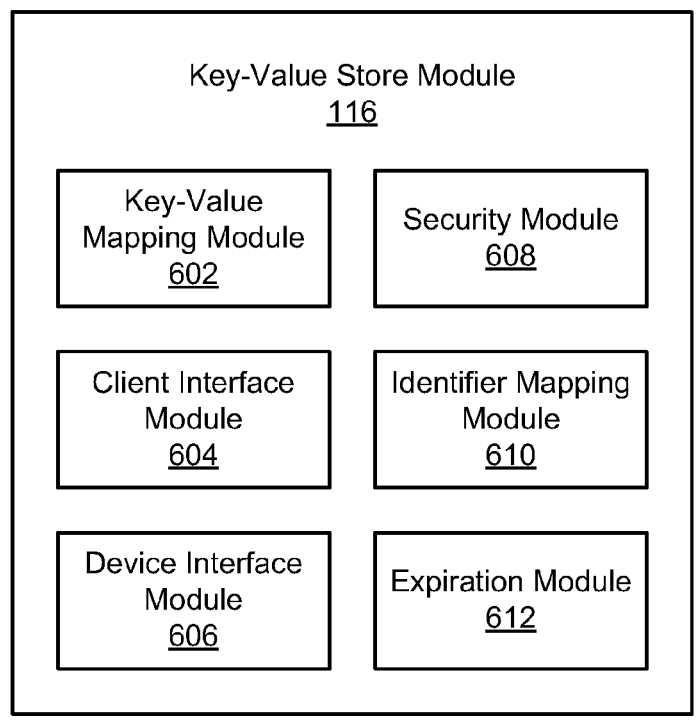
FIG. 6B is a schematic block diagram illustrating another embodiment of a key-value store module.
Figure 7A:
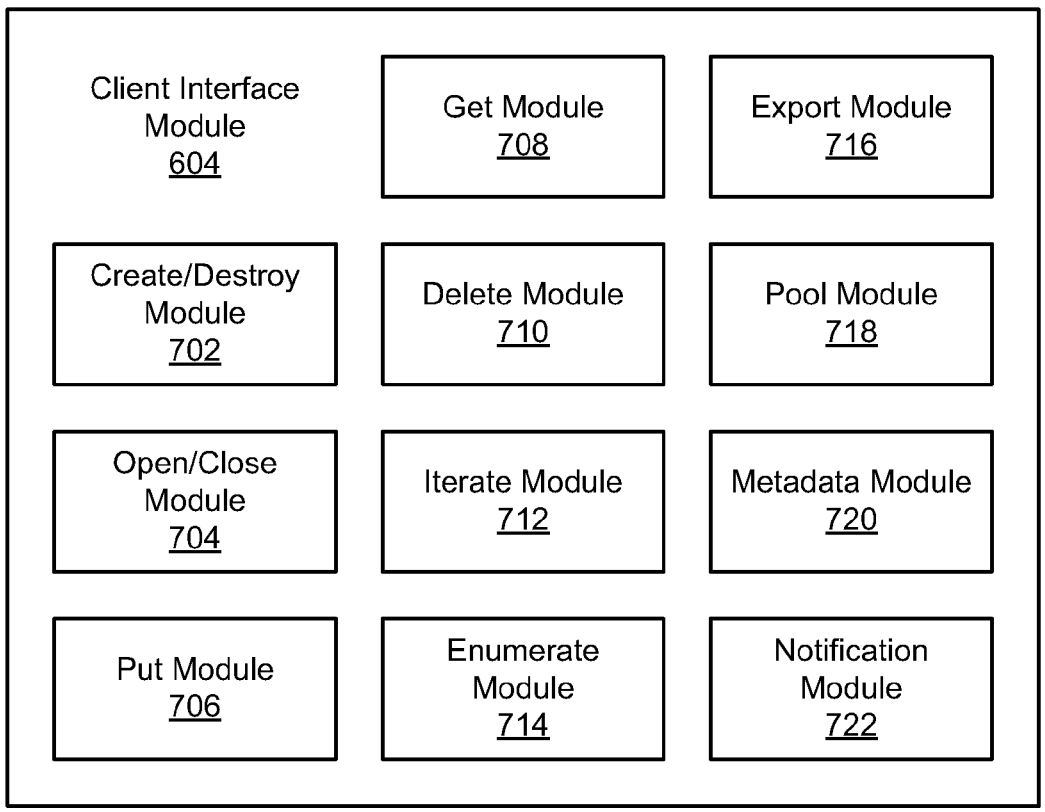
FIG. 7A is a schematic block diagram illustrating one embodiment of a client interface module.

Various key-value store API commands, such as a CREATE command, a POOL CREATE command, an OPEN command, a PUT command, a GET command, a DELETE command, a DELETE POOL command, a DELETE ALL command, an ITERATOR INIT command, a BEGIN command, a NEXT command, a GET CURRENT command, an ENUMERATE command, an EXPORT command, a GET STORE INFO command, a SET STORE METADATA, a GET POOL INFO command, a SET POOL METADATA command, a GET KEY INFO command, a SET KEY METADATA command, a REGISTER NOTIFICATION HANDLER command, a CLOSE command, a DESTROY command, a BATCH GET command, a BATCH PUT command, and the like are described below with regard to the client interface module 604 of FIGS. 6A, 6B, and 7A. One of skill in the art, in light of this disclosure, will recognize other key-value store API commands that the key-value store module 116 may support to facilitate the manipulation and administration of data values and key-value stores 118.

The key-value store module 116, in certain embodiments, makes data values and key-value store commands available to clients 114 exclusively through a key-value store interface, such as the direct interface 510, such that data values are unavailable using a block device interface, such as the block I/O emulation layer 508. For example, the key-value store module 116 may store data defining a key-value store 118, data values, or the like in a restricted set of logical block addresses ("LBAs"), to which the block I/O emulation layer 508 denies access. In one embodiment, if a client 114, such as a user application 502 or a storage client 504, sends a storage request for a restricted LBA to the block I/O emulation layer 508, the block I/O emulation layer 508 may ignore the storage request, reject the storage request, throw an out of range error, or the like to prevent access to the restricted set of LBAs. In this manner, data values stored in the restricted set of LBAs may be available to clients 114 exclusively using a key-value store interface, such as the direct interface 510.

As described above, certain storage devices, while appearing to a storage client 504 to be a block storage device, do not directly associate particular logical block addresses with particular physical blocks, also referred to in the art as sectors. Such storage devices may use a logical-to-physical translation layer 512. The logical-to-physical translation layer 512 provides a level of abstraction between the logical block addresses used by the storage client 504, and the physical block addresses at which the non-volatile memory controller 506 stores the data. The logical-to-physical translation layer 512 maps logical addresses to physical locations of data stored on non-volatile memory media 522. This mapping allows data to be referenced in a logical address space using logical identifiers, such as a logical block address. A logical identifier does not indicate the physical location of data on the non-volatile memory media 522, but is an abstract reference to the data.

The non-volatile memory controller 506 manages physical addresses in a physical address space. In one example, contiguous logical block addresses may in fact be stored in non-contiguous physical block addresses as the logical-to-physical translation layer 512 determines the location on the non-volatile memory media 522 to perform data operations.

Furthermore, in one embodiment, the logical address space is substantially larger than the physical address space. This "thinly provisioned" or "sparse address space" embodiment, allows the number of logical identifiers for data references to greatly exceed the number of possible physical addresses.

In one embodiment, the logical-to-physical translation layer 512 maintains an address mapping structure or index that maps logical addresses to physical locations of the non-volatile memory media 522. The address mapping structure may be in the form of a B-tree, a content addressable memory ("CAM"), a binary tree, a hash table, a look up table ("LUT"), an array, a linked list, a heap, or the like. In certain embodiments, the address mapping structure of the logical-to-physical translation layer 512 is a tree with nodes and/or entries that comprise logical block addresses and corresponding physical addresses/locations.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 with a logical-to-physical translation layer 512 (a storage controller 104 that does not map a logical block address directly to a particular physical block), deletes a logical block address, the corresponding physical block address remains allocated because the storage client 504 does not communicate the change in used blocks to the non-volatile memory controller 506. The storage client 504 may not be configured to communicate changes in used blocks (also referred to herein as "data block usage information"). Because the storage client 504 uses the block I/O emulation 508 layer, the storage client 504 may erroneously believe that the non-volatile memory controller 506 is a conventional storage controller that would not utilize the data block usage information. Or, in certain embodiments, other software layers between the storage client 504 and the non-volatile memory controller 506 may fail to pass on data block usage information.

Consequently, the non-volatile memory controller 104 preserves the relationship between the logical block address and a physical address and the data on the non-volatile memory device 102 corresponding to the physical block. As the number of allocated blocks increases, the performance of the storage controller 104 may suffer depending on the configuration of the storage controller 104.

Specifically, in certain embodiments, the non-volatile memory controller 506 is configured to store data sequentially, using an append-only writing process, and use a storage space recovery process that re-uses non-volatile storage media storing deallocated/unused logical blocks. Specifically, as described above, the non-volatile memory controller 506 may sequentially write data on the non-volatile memory media 522 in a log structured format and within one or more physical structures of the storage elements, the data is sequentially stored on the non-volatile memory media 522.

As a result of storing data sequentially and using an append-only writing process, the non-volatile memory controller 506 achieves a high write throughput and a high number of I/O operations per second ("IOPS"). The non-volatile memory controller 506 includes a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 512.

As described above, the storage space recovery process determines that a particular section of storage may be recovered. Once a section of storage has been marked for recovery, the non-volatile memory controller 506 may relocate valid blocks in the section. The storage space recovery process, when relocating valid blocks, copies the packets and writes them to another location so that the particular section of storage may be reused as available storage space, typically after an erase operation on the particular section. The non-volatile memory controller 506 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some non-volatile memory devices 102 are configured to receive messages or commands notifying the non-volatile memory device 102 of these unused logical blocks so that the non-volatile memory device 102 may deallocate the corresponding physical blocks. As used herein, to deallocate a physical block includes marking the physical block as invalid, unused, or otherwise designating the physical block as available for storage space recovery, its contents on storage media no longer needing to be preserved by the non-volatile memory controller 506. Data block usage information, in reference to the non-volatile memory controller 506, may also refer to information maintained by the non-volatile memory controller 506 regarding which physical blocks are allocated and/or deallocated/unallocated and changes in the allocation of physical blocks and/or logical-to-physical block address mapping information. Data block usage information, in reference to the non-volatile memory controller 506, may also refer to information maintained by the non-volatile memory controller 506 regarding which blocks are in use and which blocks are not in use by a storage client. Use of a block may include storing of data in the block on behalf of the client, reserving the block for use by a client, and the like.

While physical blocks may be deallocated, in certain embodiments, the non-volatile memory controller 506 may not immediately erase the data on the storage media. An erase operation may be performed later in time. In certain embodiments, the data in a deallocated physical block may be marked as unavailable by the non-volatile memory controller 506 such that subsequent requests for data in the physical block return a null result or an empty set of data.

One example of a command or message for such deallocation is a PTRIM command or operation. A storage device, upon receiving a PTRIM command, may deallocate physical blocks for logical blocks whose data is no longer needed by the storage client 504. A non-volatile memory controller 506 that deallocates physical blocks may achieve better performance and increased storage space, especially non-volatile memory controllers 506 that write data using certain processes and/or use a similar data storage recovery process as that described above.

Consequently, the performance of the non-volatile memory controller 506 is enhanced as physical blocks are deallocated when they are no longer needed such as through the PTRIM command or other similar deallocation commands issued to the non-volatile memory controller 506.

FIG. 6A depicts one embodiment of a key-value store module 116. In certain embodiments, the key-value store module 116 may be substantially similar to one or more of the key-value store modules 116 described above with regard to FIGS. 1A, 1B, and 5. The key-value store module 116, in the depicted embodiment, includes a key-value mapping module 602, a client interface module 604, and a device interface module 606.

In one embodiment, the key-value mapping module 602 maps or otherwise associates data values with unique keys to form a key-value store 118. The key-value store 118 maps keys to data values so that a client 114 can access the data values using the keys. The key-value mapping module 602, in certain embodiments, uses a logical-to-physical address mapping structure for the non-volatile memory device 102 to map keys to physical locations of the data values on the non-volatile memory media 110. A location, as used herein, may comprise a physical address in the non-volatile memory media 110, a logical address which the non-volatile memory media 110 may map, interpret, or translate to a physical address, or another indicator of which storage elements of the non-volatile memory media 110 store data. For example, the key-value mapping module 602 may use the logical-to-physical address mapping structure described above with regard to the logical-to-physical translation layer 512 of FIG. 5. In one embodiment, the key-value mapping module 602 does not maintain a separate key-value index or other mapping structure for a key-value store 118, but instead uses a logical address space of the non-volatile memory device 102 (or of a VSU 122) and the logical-to-physical address mapping structure of the logical-to-physical translation layer 512 to map keys to associated data values stored on the non-volatile memory media 110.

In order to determine a logical address for a data value based on an associated key, in one embodiment, the key-value mapping module 602 performs one or more predefined or known transforms on the key, thereby converting the key to the logical address. A known transform may include a hash function, a truncation, a bit-masking, or another transformation or conversion that yields consistent, repeatable, deterministic, results. In one embodiment, a hash function may include a unity hash function where the output equals the input and the key-value mapping module 602 does not modify the key when converting the key to a logical address or key address portion of a logical address, thereby using the key itself as a logical address or key address portion. The key-value mapping module 602 may map a key to a logical address for an associated data value in response to a key-value command from a client 114 with the key, such as a PUT command to write or store a data value for the key, a GET command to retrieve the data value for the key, a DELETE command to delete the data value for the key, or the like. In certain embodiments, the key-value mapping module 602 converts or maps a key to a logical address without a key-value index or another key-value specific mapping structure. The key-value mapping module 602, in cooperation with the logical-to-physical translation layer 512 or the like, may use the logical-to-physical address mapping structure and a logical address determined from a key to determine a physical location on the non-volatile memory media 110 for a data value associated with the key.

In one embodiment, the logical address space is sparse and/or thinly provisioned, and the key-value mapping module 602 determines a logical address for a key by dividing the logical address space (for the non-volatile memory device 102, for a VSU 122, or the like) into one or more key address ranges and one or more value address ranges. The key-value mapping module 602 may divide a logical address space by separating logical addresses of the logical address space into a key address portion and a value address portion. Dividing the logical address space and/or logical addresses of the logical address space, in certain embodiments, allows the key-value store module 116 to efficiently store data values of variable lengths while still using consecutive keys.

The key-value mapping module 602, in one embodiment, sizes the key address range and the value address range to accommodate a maximum data value size. For example, the key-value mapping module 602 may space addresses in the value address range at least a maximum data value size apart from each other. The maximum data value size, in certain embodiments, comprises a maximum allowed or supported size of a data value. In a further embodiment, the maximum data value size comprises a maximum allowed or supported size of a data value and key-value metadata stored with the data value such as an associated key, a size of the data value, an identifier of a client 114 or user associated with the data value, file system metadata, access control metadata, or the like.

The key-value mapping module 602, in one embodiment, assigns a key to a data value in response to receiving a write request or PUT command for the data value. In another embodiment, clients 114 manage their own keys and a client 114 sends a key to the key-value mapping module 602 with a write request or PUT command for a data value. The key, in certain embodiments, comprises a logical address or key address portion of a logical address directly, without manipulation. In a further embodiment, the key-value mapping module 602 maps or converts a key into a logical address or key address portion of a logical address. For example, the key-value mapping module 602 may perform a predefined transform, such as a hash function, on a key to convert the key to a logical address or key address portion of a logical address.

The key-value mapping module 602, in one embodiment, appends, concatenates or otherwise combines a determined key address portion of a logical address with a value address portion to form the logical address for an associated data value. In certain embodiments, the key-value mapping module 602 may use the same value address portion for each logical address, such as binary zeros, binary ones, or another predefined constant value. In another embodiment, the key-value mapping module 602 may logically use a predefined constant value for the value address portion of each logical address, but may store a different value in the bits for the value address portion in the logical-to-physical address mapping structure. As described below with regard to the pool module 718, in certain embodiments, the key-value mapping module 602 may store an additional hash value or other metadata in the value address portion.

In one example embodiment, if the non-volatile memory device 102 (or a VSU 122) has a sparse logical address space of $2^{48}$ blocks or sectors, with 48 bit logical addresses and a block/sector size of 512 bytes, to support a maximum data value size of about 1 mebibyte, the key-value mapping module 602 may segment logical addresses into two portions, a 37 bit key address portion and an 11 bit value address portion. In the example, by using a predetermined number of bits for the value address portion, 11 bits in the example, and using a predefined constant value for each value address portion (e.g., all zeros, all ones, a predefined value or bit pattern), the logical addresses for each data value are spaced the maximum data value size apart, 1 mebibyte in the example. In other embodiments, a sparse logical address space of $2^{64}$ blocks, $2^{128}$ blocks, or other sizes may be used, with the corresponding logical addresses segmented into a key address portion and a value address portion or the like.

In this manner, the key-value mapping module 602 logically segments or divides the sparse logical address space (or a key-value portion of the sparse logical address space) into segments or chunks of a predetermined size, such as the maximum data value size, without allocating or using physical non-volatile memory media 110 until a data value is written to the media 110. By combining a key address portion and a value address portion to convert a key to a logical address, in certain embodiments, the key-value mapping module 602 allows values to have variable sizes while allowing clients 114 to use consecutively numbered keys.

In other embodiments, instead of using a key address portion and a value address portion, the key-value mapping module 602 may perform another transform on a key to convert the key into a logical address for the associated data value. For example, the key-value mapping module 602 may append a predefined sequence of bits to a key, add a predefined offset to a key, perform a predefined bitwise logic operation on a key, perform a hash on a key, or perform another predefined transform on a key to determine a logical address from the key. In embodiments where the key-value mapping module 602 uses one or more predefined or known transforms to convert a key to a logical address, whether using a key address portion and a value address portion or not, the key-value mapping module 602 may determine a physical location for a data value directly using the logical-to-physical address mapping structure, without a key-value index or other key-value specific structure to map keys to logical addresses or the like.

The key-value mapping module 602 may use a key directly, either as a key address portion of a logical address or as a logical address itself, or, in other embodiments, may perform a predefined transform such as a hash function to convert a key to a key address portion or to a logical address. In embodiments where the key-value mapping module 602 uses a non-unique transform such as a hash function to convert a key to a key address portion of a logical address or to a logical address, the key-value mapping module 602 may use one or more collision management techniques to handle collisions. For example, the key-value mapping module 602, in response to converting a received key to a logical address using a key address portion or otherwise, retrieves a stored key from key-value metadata stored at the logical address and compares the stored key to the received key to determine whether or not a collision has occurred. If the stored key does not match the received key, typically a hash collision has occurred. In certain embodiments, the sparse logical address space is sufficiently large and the hash function is selected to evenly hash keys over an available key address range so that collisions occur infrequently, for example, in one embodiment, about 2% of the time or less.

The key-value mapping module 602, in one embodiment, may use one or more collision resolution techniques such as chaining, linear probing, quadratic probing, double hashing, or the like in response to a collision. For example, in response to a collision for a key-value pair, the key-value mapping module 602 may re-hash the key, the key and a pool identifier, or the like to a different logical address or logical address range. The key-value mapping module 602, in certain embodiments, may re-hash the key, the key and a pool identifier, or the like multiple times, until an available, collision-free logical address or logical address range is located. In another embodiment, the key-value mapping module 602 may send an error message or otherwise alert the key-value store module 116, a requesting client 114, or the like of a collision. In other embodiments, where a key-value store 118 operates as a cache for a key-value backing store or the like, in response to a subsequent data value colliding with a stored data value, the subsequent data value may take the place of the stored data value, invalidating and/or evicting the stored data value from the key-value store 118.

In one embodiment, the existence of an entry for a logical address in the logical-to-physical address mapping structure denotes membership of the key-value pair associated with the logical address in the key-value store 118 and storage of the associated data value on the non-volatile memory media 110 of the non-volatile memory device 102. The key-value mapping module 602, in certain embodiments, dynamically updates the logical-to-physical address mapping structure, in cooperation with the logical-to-physical translation layer 512 or the like, as clients 114 add or remove key-value pairs from the key-value store 118. Interfaces for adding and removing key-value pairs are described below with regard to the client interface module 604. The key-value store 118, in other embodiments, may be substantially static, and pre-populated with data values and associated keys, by a manufacturer, vendor, administrator, or the like.

For new key-value pairs, in one embodiment, the key-value mapping module 602 determines, generates, or otherwise assigns a key for the new data value. In another embodiment, the key-value mapping module 602 receives a key for a new key-value pair from a requesting client 114 with a write request or PUT command for the new pair, and clients 114 may manage keys themselves. A key may comprise a binary or hexadecimal value, a string, an integer, or another data type that may have different unique values. As described above, in one embodiment, a key may comprise a logical address, a portion of a logical address, or the like. In other embodiments, a key may be converted, transformed, or hashed to a logical address or portion of a logical address.

In certain embodiments, a key for a data value may be a combination of several sub-values, such as a client identifier, a pool identifier, a key identifier, or the like. A client identifier identifies or is otherwise associated with a requesting client 114. In one embodiment, clients 114 of the same type share a client identifier. By sharing the same client identifier, clients 114 of the same type, in certain embodiments, may access the same data values in the key-value store 118. Sharing data values may allow clients 114 to maintain consistent settings or to otherwise coordinate or synchronize data. For example, if a non-volatile memory device 102 is installed in or otherwise paired with a first computer device 112, a device driver or other client 114 may access data values, store data values, and the like, and when the non-volatile memory device 102 is installed in or otherwise paired with a second computer device 112, a client 114 of the same client type may access the same data values, such as license information, settings, cache binding information, software, recovery information, or the like. In other embodiments, a client identifier may be unique, even among clients 114 of the same type, so that the clients 114 may maintain separate data values, without interference from other clients 114. Alternatively, clients 114 of the same type may share a client identifier, but may use unique pool identifiers for private data values that are not shared between clients 114, even of the same type.

A pool identifier identifies, or is otherwise associated with, a group of data values that have a common characteristic. Pool identifiers provide organization for data values, allowing the key-value mapping module 602 and/or clients 114 to classify, manage, or otherwise organize data values in the key-value store 118. For example, a client 114 may use one pool identifier for startup configuration settings and another pool identifier for runtime configuration settings, or the like. In one embodiment, a client 114 may assign and manage pool identifiers for data values associated with the client 114. In another embodiment, a pool module 718 described below and/or the key-value mapping module 602 assigns and manages pool identifiers for clients 114. In certain embodiments, the pool module 718, in cooperation with the key-value mapping module 602 or the like, may encode a pool identifier into a logical address, as an offset within a range of logical block addresses, as the value address portion of a logical block address, hashing a pool identifier with a key and including the resulting hash value in a logical block address, or the like. The pool module 718 is described in greater detail below with regard to FIG. 7.

A key identifier identifies an associated data value, differentiating between data values with the same client identifier and pool identifier. The key-value mapping module 602 may assign and manage key identifiers and/or a client 114 may assign and manage key identifiers. Key identifiers may be assigned sequentially, or in another manner to ensure uniqueness. Keys are unique for a key-value store 118; and key identifiers are unique for a given client identifier and pool identifier to ensure that the keys remain unique. The size of a key and any sub-values such as client identifiers, pool identifiers, and key identifiers, may be selected based on a size of a logical address space for the non-volatile memory device 102 or VSU 122, a number of anticipated data values, a number of anticipated clients 114, a number of anticipated pools per client 114, a number of anticipated data values per pool, or the like.

In certain embodiments, a key for a data value may be a known value that is predefined for several clients 114, so that each of the clients 114 may access the data value. In another embodiment, as described below with regard to the iterate module 712 and the enumerate module 714, the key-value store module 116 may list keys for a client 114.

In one embodiment, the non-volatile memory device 102 or an associated VSU 122 operates as a cache, and a client 114, such as a cache device driver or the like, stores cache binding information in the key-value store 118 as a data value. Cache binding information may include link information between a cache non-volatile memory device 102 and a backing store, cache operational parameters, cache modes, a path or other identifier of a backing store, or the like.

In another embodiment, a data value may include configuration information or settings for the non-volatile memory device 102. Configuration information may include startup configuration information relating to a startup process for the non-volatile memory device 102, runtime configuration information relating to operation of the non-volatile memory 102, recovery information relating to recovery from an error such as an improper shutdown, or the like.

In certain embodiments, the non-volatile memory device 102 and/or a device driver client 114 for the non-volatile memory device 102 periodically stores or checkpoints configuration information as a data value. One embodiment of configuration information that may be checkpointed as a data value is data map information, such as a validity map, a clean/dirty map, or the like. A validity map indicates which data on the non-volatile memory device 102 or a VSU 122 is valid and which data has been invalidated by subsequent writes. A clean/dirty map for a cache non-volatile memory device 102 or a VSU 122 indicates which data has been destaged to a backing store. Another embodiment of configuration information that may be checkpointed is a logical-to-physical address mapping structure, described above with regard to the logical-to-physical translation layer 512 and described below with regard to the mapping structure 1000 of FIG. 10.

In one embodiment, a data value may include license information for the non-volatile memory device 102. License information for the non-volatile memory device 102 may indicate certain features, permissions, utilities, functions, or the like that a customer or user has been granted access to, so that such access or permissions remain consistent as the non-volatile memory device 102 is used with different computer devices 112, by different clients 114, or the like. A device driver client 114 may access a license information data value to determine which features or permissions to grant for the non-volatile memory device 102.

In a further embodiment, a data value may comprise device driver software for the non-volatile memory device 102. A client 114 may retrieve the device driver software from the key-value store 118 and install and/or execute the device driver software on the computer device 112. Storing device driver software for the non-volatile memory device 102 or for another device as a data value provides the device driver software to a client 114 without a separate download process, separate data storage media, or the like.

In another embodiment, a deduplication system, such as a disk based deduplication system or the like, stores fingerprint indexes as data values in a key-value store 118. Deduplication systems typically maintain some form of index which matches segment fingerprints, usually the cryptographic hash of a segment, to a block address. In response to a block being written, a hash is typically computed and compared to all known hashes in the deduplication system. If the hash matches, instead of writing the new block, the deduplication system stores a note or record indicating that the block already exists at a different block address.

Deduplication indexes typically contain fingerprints (for example, about 20 bytes for SHA 1 and larger for SHA 2) and block address pointers. As such, a fingerprint may be used as a key (of 20 bytes for example) and storage of the key plus some additional data or other bytes as the corresponding data value. Deduplication indexes can be sized in terabytes for a logical storage in the 100s of terabytes to petabytes of hard disk drives. As such, disk based deduplication systems may benefit from storing their fingerprint indexes in non-volatile memory media 110. However, a traditional deduplication index, even stored in a non-volatile memory media 110, may still consume volatile memory such as DRAM for an index of the index.

Instead of maintaining a traditional index of a deduplication index in volatile memory of a computer device 112, in one embodiment, a deduplication index stores fingerprints as values in a key-value store 118 on the non-volatile memory media 110. Storing a deduplication index as key-value pairs in a key-value store 118, in certain embodiments, may use little or no additional DRAM or other volatile memory of a host computer device 112 at the deduplication layer. The VSL/non-volatile memory device 102, in one embodiment, may have its own DRAM or other volatile memory consumption, so the total may not be zero.

A deduplication index stored in a key-value store 118 on the non-volatile memory media 110, as described herein, may have performance at or near native speeds of the non-volatile memory media 110, such as NAND flash or the like, with little or no additional code or configuration within an existing deduplication system. In certain embodiments, a deduplication index stored in a key-value store 118 may use and benefit from subsector (e.g., 64B aligned) operations made available by the non-volatile memory controller 104 for the non-volatile memory device 102.

In one embodiment, the client interface module 604 receives key-value commands from one or more clients 114 over a key-value store interface 120 or the like. For example, the client interface module 604 may provide a key-value API for clients 114 to access a key-value store 118. As described above, clients 114 may access the key-value store module 116 from the computer device 112, over a data network, or the like. The client interface module 604 may provide a key-value store interface 120 to clients 114 internally within the computer device 112, over a data network, or the like.

The client interface module 604 may support various key-value commands, examples of which are described in greater detail below with regard to FIG. 7A. For example, in certain embodiments, the client interface module 604 may support one or more of a CREATE command, a POOL CREATE command, an OPEN command, a PUT command, a GET command, a DELETE command, a DELETE POOL command, a DELETE ALL command, a BEGIN command, a NEXT command, a GET CURRENT command, a GET STORE INFO command, a SET STORE METADATA, a GET POOL INFO command, a SET POOL METADATA command, a GET KEY INFO command, a REGISTER NOTIFICATION HANDLER command, a CLOSE command, a DESTROY command, a BATCH GET command, a BATCH PUT command, and/or other key-value commands.

In one embodiment, the device interface module 606 performs one or more operations on the non-volatile memory device 102 for the key-value store module 116. The device interface module 606, in certain embodiments, implements key-value commands from the client interface module 604 on the non-volatile memory device 102 using primitive operations that the non-volatile memory controller 104 provides. Examples of primitive operations that the device interface module 606 may use to implement key-value commands are described in greater detail below with regard to FIG. 7B.

In one embodiment, the device interface module 606 stores a data value to the non-volatile memory device 102, in response to a PUT command or the like for an associated key, using an ATOMIC WRITE operation. An ATOMIC WRITE operation, in certain embodiments, provides variable size writes to accommodate variable sized data values. The device interface module 606, in a further embodiment, in response to a GET command or the like for an associated key, uses an EXISTS operation to determine whether the non-volatile memory media 110 stores a data value for the key. In response to a DELETE command or the like for a key, in one embodiment, the device interface module 606 uses a PTRIM operation to delete, erase, remove, or otherwise clear the associated data value from the non-volatile memory media 110. By using primitive operations such as ATOMIC WRITE, EXIST, and PTRIM, in certain embodiments, the device interface module 606 stores and retrieves variable sized data values efficiently without wasting physical storage capacity of the non-volatile memory media 110. Further, primitive operations such as ATOMIC WRITE, EXIST, and PTRIM, in one embodiment, obviate the need for additional key-value data structures such as a key-value index or the like, allowing the key-value mapping module 602 to use the logical-to-physical address mapping structure to map keys to physical locations for values without the overhead of additional levels of lookups or record keeping.

In one embodiment, the key-value store module 116 cooperates with the non-volatile memory controller 104 to optimize storage capacity recovery operations or other grooming operations for the non-volatile memory media 110. For example, the key-value store module 116 may track key-value pairs for the non-volatile memory controller 104 so that the non-volatile memory controller 104 performs storage capacity recovery operations or other grooming operations for the entire key-value pair, so that key-value pair data and/or metadata stored on the non-volatile memory media 110 is complete, is not separated, or the like.

FIG. 6B depicts another embodiment of a key-value store module 116. In certain embodiments, the key-value store module 116 may be substantially similar to the key-value store modules 116 described above with regard to FIGS. 1A, 1B, 5, and 6A. The key-value store module 116, in the depicted embodiment, includes the key-value mapping module 602, the client interface module 604, and the device interface module 606 described above with regard to FIG. 6A, and includes a security module 608, an identifier mapping module 610, and an expiration module 612.

The security module 608 implements a security policy for the key-value store 118. In one embodiment, the security module 608 authenticates clients 114 and/or key-value store requests/commands, providing security for the key-value store 118. The security module 608, in certain embodiments, authenticates each requesting client 114 by an associated client identifier, providing a requesting client 114 with access only to data values and keys associated with the client identifier of the requesting client 114. The security module 608 may coordinate with the client interface module 604 to ensure that key-value store commands are not serviced without client authentication.

In another embodiment, the security module 608 may encrypt and decrypt data values, keys, and/or other key-value store data. In other embodiments, clients 114 may individually encrypt or otherwise secure data values, if desired, prior to storing the data values in the key-value store 118. In certain embodiments, a client 114 may set a security or authentication level for the data values associated with the client 114. The security module 608, in a further embodiment, may implement a global security policy for data values of the key-value store 118.

The identifier mapping module 610 generates client identifiers for clients 114.

In one embodiment, clients 114 are each assigned a universal client identifier by a manufacturer, a vendor, an administrator, or the like. One example of a universal client identifier is a universally unique identifier ("UUID"), or the like. A UUID is a 128 bit number. In certain embodiments, to increase the efficiency of the key-value store 118, the identifier mapping module 610 maps a universal client identifier for a client 114, such as a UUID, to a key-value store client identifier for the client 114, using a known mapping. The known mapping may include a hash function, a truncation, a bit-masking, or another transformation that yields consistent, repeatable results. In embodiments where clients 114 of the same type have identical universal client identifiers, the identifier mapping module 610 maps the identical universal client identifiers to identical key-value store client identifiers. A key-value store client identifier, in one embodiment, is shorter than a universal client identifier. The size of key-value store client identifiers for a given key-value store 118 may be selected based on an anticipated amount of clients 114 for the key-value store 118, or the like.

Keys, in certain embodiments, include a key-value store client identifier for the client 114 associated with the key. In one embodiment, the identifier mapping module 610 maps a universal client identifier to a key-value store client identifier once for a client 114, and the client 114 retains the key-value store client identifier for use in subsequent key-value store requests. In another embodiment, clients 114 may use universal client identifiers for each key-value store request, and the identifier mapping module 610 may map the universal client identifier to a key-value store client identifier for each key-value store request.

The expiration module 612, in certain embodiments, expires keys and associated data values from a key-value store 118, thereby deleting, erasing, removing, trimming, or otherwise clearing the expired keys and associated data values from the non-volatile memory media 110. In one embodiment, the expiration module 612 expires key-value pairs automatically in response to an expiration event, such as an expiration request from a client 114, a key-value quota being satisfied, a predefined amount of time occurring since creation of a key-value pair, a predefined amount of time occurring since access of a key-value pair, a storage capacity recovery event for the non-volatile memory device 102, or the like. The expiration module 612, in one embodiment, expires key-value pairs by age, expiring older keys in favor of newer keys. For example, in response to a key-value quota or another predefined threshold number of key-value pairs being satisfied, the expiration module 612 may expire the oldest key-value pair so that the total number of key-value pairs does not exceed the key-value quota or other predefined threshold number of key-value pairs.

In one embodiment, the expiration module 612 cooperates or coordinates with a garbage collection or storage capacity recovery process of the non-volatile memory device 102 to expire key-value pairs. In a typical storage capacity recovery process, the non-volatile memory controller 104 selects an erase block of the non-volatile memory media 110, such as a physical erase block, logical erase block, or the like, for storage capacity recovery, copies valid data from the selected erase block forward to retain the valid data in the non-volatile memory media 110, and erases the selected erase block which becomes available to be reused to store other data. For example, the non-volatile memory controller 104 may copy valid data forward to an append point of a sequential, log-based writing structure preserved in the non-volatile memory media 110, or the like.

In certain embodiments, instead of copying key-value pairs forward to retain the key-value pairs as part of a storage capacity recovery process for an erase block, the expiration module 612 expires key-value pairs stored in an erase block in response to a storage capacity recovery event for the erase block. In one embodiment, the non-volatile memory controller 104 performs storage capacity recovery in a first-in-first-out ("FIFO") order beginning with the oldest data at a tail of the sequential, log-based writing structure and proceeding toward the newest data at a head of the sequential, log-based writing structure. In this manner, key-value pairs are expired in a FIFO order, with older key-value pairs being expired prior to newer key-value pairs in a temporal order.

Expiring key-value pairs instead of copying them forward, in one embodiment, reduces write amplification in the non-volatile memory device 102. Write amplification is the rewriting or moving of data during a storage capacity recovery or garbage collection process, causing the same data originally written in response to a storage request to be written more than once. Write amplification can increase the number of writes of a non-volatile memory device 102, consume write bandwidth of a non-volatile memory device 102, reduce a usable lifetime of a non-volatile memory device 102, and otherwise reduce performance of a non-volatile memory device 102. In certain embodiments, reducing write amplification by expiring key-value pairs instead of copying them forward allows the key-value store 118 to operate at or near peak performance indefinitely with little or no write amplification.

In certain embodiments, the expiration module 612 notifies a client 114, the key-value store module 116, or the like in response to expiring a key-value pair. In a further embodiment, the expiration module 612 enumerates to a client 114, the key-value store module 116, or the like which key-value pairs the expiration module 612 has expired, listing the expired key-value pairs or the like. The expiration module 612, in various embodiments, may perform a callback to enumerate expired key-value pairs, may maintain a log of expired key-value pairs, or the like.

FIG. 7A depicts another embodiment of a client interface module 604. In certain embodiments, the client interface module 604 may be substantially similar to the client interface module 604 described above with regard to FIGS. 6A and 6B. The client interface module 604, in the depicted embodiment, includes a create/destroy module 702, an open/close module 704, a put module 706, a get module 708, a delete module 710, an iterate module 712, an enumerate module 714, an export module 716, a pool module 718, a metadata module 720, and a notification module 722.

In one embodiment, the create/destroy module 702 services key-value commands to create and/or destroy a key-value store 118. In one embodiment, the create/destroy module 702 services a CREATE command from a client 114 to create a key-value store 118. In embodiments where a key-value store 118 is created in a VSU 122 as described above with regard to FIG. 1B, the create/destroy module 702 may accept a VSU identifier as a parameter. In other embodiments, the create/destroy module 702 may initialize a VSU 122 for a key-value store 118 in response to receiving a CREATE command from a client 114 without a VSU identifier. In one embodiment, in response to successfully creating and/or initializing a key-value store 118, the create/destroy module 702 returns a key-value store identifier for the created key-value store 118 to a requesting client 114. A key-value store identifier uniquely identifies a key-value store 118 and may be used by a client 114 or other entity to reference or identify the key-value store 118.

In a further embodiment, the create/destroy module 702 services a POOL CREATE command from a client 114 to create a pool within a specified key-value store 118. Pools are described in greater detail below with regard to the pool module 718. In one embodiment, the create/destroy module 702 receives a key-value store identifier as a parameter to a POOL CREATE command. In other embodiments, the create/destroy module 702 may receive pool metadata or the like as one or more parameters to a POOL CREATE command. In one embodiment, the create/destroy module 702, in response to creating or initializing a pool, determines and returns a pool identifier for the created pool to a requesting client 114. In another embodiment, the create/destroy module 702 may receive a pool identifier from a requesting client 114, and clients 114 may determine and manage their own pool identifiers. The create/destroy module 702 may cooperate with the pool module 718 described below to determine or otherwise manage pool identifiers. In certain embodiments, where clients 114 may define pool identifiers, the pool module 718 may maintain a list or other data structure to track defined pool identifiers, to ensure that each pool identifier is unique or the like.

The create/destroy module 702, in one embodiment, services a DESTROY command to remove or destroy a key-value store 118. In embodiments where a VSU 122 stores a key-value store 118, in response to the create/destroy module 702 servicing a DESTROY command and removing a key-value store 118, the underlying VSU 122 may be reused, repurposed, removed, or the like. In one embodiment, the create/destroy module 702 receives a key-value store identifier as a parameter to a DESTROY command to identify the key-value store 118 to be destroyed. To service a DESTROY command, in certain embodiments, the create/destroy module 702 invalidates, trims, removes, erases, deletes, or otherwise clears keys, data values, metadata, and/or other data associated with the key-value store 118 identified in a received DESTROY command.

In a further embodiment, the create/destroy module 702 services a POOL DESTROY command to remove or destroy a pool of a key-value store 118. The create/destroy module 702 may receive a pool identifier as a parameter to a POOL DESTROY command to identify the pool to be destroyed. The create/destroy module 702 may invalidate, trim, remove, erase, delete, or otherwise clear keys, data values, metadata, and/or other data associated with the pool identified in a received POOL DESTROY command.

In one embodiment, the open/close module 704 services key-value commands from clients 114 to open or unlock key-value stores 118 for supported operations and to close or lock key-value stores 118 preventing execution of supported operations. In response to an OPEN command, with a key-value store identifier as a parameter, the open/close module 704 may open or unlock the key-value store 118 identified by the received key-value store identifier. In response to a CLOSE command, with a key-value store identifier as a parameter, the open/close module 704 may close or lock the key-value store 118 identified by the received key-value store identifier.

In one embodiment, the put module 706 services key-value commands from clients 114 to write or store data values in a key-value store 118, in response to a PUT command or the like. In one embodiment, in response to receiving a write request such as a PUT command from a client 114, the put module 706 stores a received data value in the key-value store 118, adding the data value to the key-value store 118. A PUT command, in one embodiment, includes a data value and a key as parameters. In a further embodiment, a PUT command may include a data value without a key, and the key-value mapping module 602 may assign the data value a key and the put module 706 may return the key to the requesting client 114.

The put module 706, in certain embodiments, receives a key-value store identifier as a parameter to a PUT command, identifying the key-value store 118 in which the put module 706 is to store the included data value. In a further embodiment, the put module 706 may receive a pool identifier for the included data value as a parameter to a PUT command. In other embodiments, the put module 706 may receive a size or length of the data value, an expiration flag or expiration time for the expiration module 612, a replace flag, a generation count for the key, or the like as parameters to a PUT command.

For example, in embodiments where the put module 706 may receive a replace flag as a parameter to a PUT command, the put module 706 may replace the value of the key in the key-value store 118 in response to a replace flag of TRUE if the key already exists in the key-value store 118, but may return an error if the replace flag is FALSE and the key already exists. Similarly, if the replace flag is TRUE and the key does not already exist in the key-value store 118, the put module 706 may return an error. If the key does not already exist in the key-value store 118 and the replace flag is FALSE, the put module 706 may write the value of the key to the key-value store 118. In certain embodiments, the put module 706 supports a BATCH PUT command to store or set data values for a plurality of keys at a time in a batch.

As described below with regard to FIG. 7B, in certain embodiments the device interface module 606 uses an atomic write module 730 and/or a conditional write module 738 to implement a PUT command from the put module 706 on the non-volatile memory device 102. The device interface module 606, in one embodiment, uses primitive operations provided by the non-volatile memory controller 104 to implement a PUT command. In certain embodiments, the put module 706 stores key-value metadata with a data value on the non-volatile memory media 110. The put module 706 may store key-value metadata at a predefined or known location relative to the data value, such as in a first block or sector, in a last block or sector, in a packet header, or the like. Key-value metadata, in various embodiments, may include a length of the data value; the key associated with the data value; a logical address of the data value; a hash value of the key, the data value, and/or the logical address; a pool identifier for the data value; a client identifier of an owner of the data value; and/or other key-value metadata associated with the data value.

In one embodiment, the get module 708 services key-value store read requests for clients 114, such as a GET command, a BATCH GET command, or the like. In one embodiment, the get module 708 provides a requested data value from a key-value store 118 to a requesting client 114 in response to receiving a GET command or other read request for the requested data value from a requesting client 114. A GET command, in certain embodiments, includes a key, and the get module 708 uses the key to locate and retrieve the corresponding data value, in cooperation with the key-value mapping module 602 described above with regard to FIG. 6A. The get module 708 may coordinate with the key-value mapping module 602 to locate and retrieve a data value, may access the logical-to-physical address mapping directly, may provide a logical address for a data value to the logical-to-physical translation layer 512, or the like to read a data value from the non-volatile memory media 110 in cooperation with the non-volatile memory controller 104. The get module 708 may retrieve a data value directly from a key-value store index, may retrieve a data value from an LBA for the data value listed in a key-value store index, or the like.

The get module 708, in certain embodiments, receives a key-value store identifier as a parameter to a GET command, identifying the key-value store 118 from which the get module 708 is to retrieve the requested data value. In a further embodiment, the get module 708 may receive a pool identifier for the requested data value as a parameter to a GET command. In other embodiments, the get module 708 may receive a size or length of a requested data value, a pointer to a data buffer to which the get module 708 may write the requested data value, a pointer to a data buffer to which the get module 708 may write key-value information or other metadata associated with the requested data value, or the like. In certain embodiments, the get module 708 supports a BATCH GET command to retrieve data values for a plurality of keys at a time in a batch.

As described below with regard to FIG. 7B, in certain embodiments the device interface module 606 uses a standard read primitive operation, a range read module 736, or the like to implement a GET command from the get module 708 on the non-volatile memory device 102. The device interface module 606, in one embodiment, uses primitive operations provided by the non-volatile memory controller 104 to implement a GET command.

In one embodiment, the delete module 710 services key-value store delete requests for clients 114, such as a DELETE command, a DELETE POOL command, a DELETE ALL command, or the like. In one embodiment, the delete module 710 clears a data value from a key-value store 118 and/or from the non-volatile memory device 102 in response to receiving a DELETE command for the data value from a requesting client 114. A DELETE command, in certain embodiments, includes a key associated with the data value to be deleted. In another embodiment, a DELETE command may include a key-value store identifier, a pool identifier, and/or other parameters associated with a key-value pair to be deleted. The delete module 710 may delete, erase, trim, remove, overwrite, invalidate, or otherwise clear a data value (or key-value pair) from a key-value store 118. In certain embodiments, the delete module 710 may clear a key or other metadata associated with a deleted data value from the key-value store 118.

In response to a DELETE POOL command with a key-value store identifier and a pool identifier, the delete module 710 may delete, erase, trim, remove, overwrite, invalidate, or otherwise clear each data value (or key-value pair) from the identified pool. The delete module 710, in response to a DELETE ALL command with a key-value store identifier or the like, deletes, erases, trims, removes, overwrites, invalidates, or otherwise clears each data value (or key-value pair) from the identified key-value store 118.

In one embodiment, the iterate module 712 iterates through key-value pairs for a client 114. For example, the iterate module 712 may iterate through key-value pairs of a specified key-value store 118, a specified pool, or the like. In certain embodiments, the iterate module 712 may support an ITERATOR INIT command, a BEGIN command, a NEXT command, a GET CURRENT command, or the like.

The iterate module 712 may return a handle, identifier, pointer, or the like for an iterator in response to an ITERATOR INIT command and may initialize the iterator to a default key and/or logical address, such as a first key or logical address sequentially, a first key or logical address temporally, a first populated logical address in a logical-to-physical address mapping structure, or the like. An ITERATOR INIT command may include a key-value store identifier and/or a pool identifier as a parameter. In certain embodiments, the iterate module 712 includes an encoded copy of the default initial key and/or logical address within the handle or identifier.

A BEGIN command sets an iterator to the beginning of a specified key-value store 118, a specified pool, or the like. A BEGIN command may include an iterator handle or identifier, a key-value store identifier, and/or a pool identifier as a parameter. A NEXT command sets the iterator to a next location in a specified key-value store 118, a specified pool, or the like, and may include an iterator handle or identifier, a key-value store identifier, and/or a pool identifier as a parameter. In one embodiment, a NEXT command may include a timeout value as a parameter. If the timeout value is set to zero or another predefined null value, the iterate module 712 may process the NEXT command until it completes. If the timeout value is set to another value specifying an amount of time, the iterate module 712 may timeout and stop processing the NEXT command if the command fails to complete within the specified amount of time. In certain embodiments, the iterate module 712 may cooperate with the key-value mapping module 602 to scan the logical-to-physical address mapping structure to locate the next non-contiguous logical address. As described above with regard to the key-value mapping module 602, in certain embodiments, the sparse logical address space is divided according to a maximum data value size, ensuring that contiguously populated address ranges in the sparse logical address space belong to exactly one key-value pair.

In response to a GET CURRENT command, in one embodiment, the iterate module 712, in cooperation with the get module 708 or the like, retrieves a key-value pair of a current iterator location. The iterate module 712, in various embodiments, may return a key, a data value, or both in response to a GET CURRENT command. For an iterator, in certain embodiments, the iterate module 712 cycles through each key and returns each key exactly once, if no new keys are added. In a further embodiment, the iterate module 712 iterates in logical address order, not necessarily in a key order. The iterate module 712, in another embodiment, allows multiple iterators to execute in parallel and allows multiple iterators to be active at a time. In one embodiment, if a key is inserted into a key-value store 118 and/or a pool while an iterator for the key-value store 118 and/or the pool is active, the iterate module 712 may not return the newly added keys. The iterate module 712 may provide iterator use concurrent with PUT commands serviced by the put module 706 or other key-value commands. Performance for concurrent key-value commands may be scaled as the number of concurrent threads increases, or the like.

In one embodiment, the enumerate module 714 services data value enumerate requests for clients 114, such as an ENUMERATE command or the like. In one embodiment, the enumerate module 714 enumerates or lists keys and/or associated data values to a client 114 in response to receiving an ENUMERATE command from the client 114. An ENUMERATE command, in certain embodiments, may have various scopes. In one embodiment, the enumerate module 714 may enumerate to a client 114 each key and/or data value associated with a client identifier. In another embodiment, the enumerate module 714 may enumerate to a client 114 each key and/or data value associated with a pool identifier. A client 114, in one embodiment, may specify the scope of the ENUMERATE command in an ENUMERATE command.

In one embodiment, the export module 716 services key-value export requests for clients 114, such as an EXPORT command or the like. In one embodiment, the export module 716 exports data values and associated keys to a requesting client 114 in response to receiving an EXPORT command. The export module 716 may export just data values and keys associated with the requesting client 114, may export data values and keys associated with a pool identifier, may export an entire key-value store 118, or may export data values with a different granularity. In a further embodiment, the export module 716 is also configured to import data values and associated keys into a key-value store 118, such as data values exported from a different key-value store 118 or the like. In this manner, the export module 716 may facilitate the transfer of key-value stores 118 from one non-volatile memory device 102 to another, the backing up of a key-value store 118, or the like.

In one embodiment, the pool module 718 manages a plurality of pools within a key-value store 118 for clients 114. Clients 114, in certain embodiments, may prefer to manage key-value pairs in pools to group related key-value pairs, as described above. Pools may provide an abstraction to group or categorize logically related key-value pairs within a key-value store 118. Pools may enable clients 114 to manage key-value pairs more efficiently, by performing management operations for an entire pool instead of for individual key-value pairs, such as a pool or group delete or the like. Certain clients 114 may prefer to use large numbers of pools, such as hundreds, thousands, or millions of pools. The sparse logical address space of the non-volatile memory device 102, or of a VSU 122, in one embodiment, may not be large enough to accommodate including a pool identifier in a key, even with a hash function conversion as described above, which may result in a high number of collisions.

In one embodiment, the pool module 718 cooperates with the key-value mapping module 602 to maintain and manage key-value pools. The key-value mapping module 602, in certain embodiments, hashes or otherwise combines a key and a pool identifier together to determine a logical address for the associated data value. Hashing or otherwise combining a key and a pool identifier together in a predefined, known manner, in one embodiment, ensures that keys map evenly to an available sparse logical address space regardless of which pool they belong to reducing hash collisions.

In certain embodiments, the key-value mapping module 602 uses a value address portion, as described above, to store an additional hash. In the example described above with regard to the key-value mapping module 602, the 11 lower order bits of a 48 bit logical address comprise a value address portion. The key-value mapping module 602, in one embodiment, may continue to use a default value, such as all zeros, for the actual logical address of a stored data value, but may store or overload an additional hash in the value address portion in the logical-to-physical address mapping structure. The additional hash, in one embodiment, comprises a hash of a pool identifier and the logical address.

In response to a PUT command or other write request for a data value of a specified pool of a key-value store 118, as described above with regard to the put module 706, in certain embodiments, the pool module 718 cooperates with the key-value mapping module 602 to determine an actual logical address (with zeros or another predefined value in the value address portion), to determine the additional hash based on the actual logical address and the pool identifier, to modify the logical address by combining the additional hash with the actual logical address (by overwriting the value address portion or the like), and to store the modified logical address in the logical-to-physical address mapping structure with a physical location of the associated data value on the non-volatile memory media 110. In other embodiments, the key-value mapping module 602 may store the additional hash and/or other pool metadata in the logical-to-physical address mapping structure with an actual logical address as a separate metadata entry, metadata field, or the like.

In response to a GET command or other read request for a data value of a specified pool of a key-value store 118, as described above with regard to the get module 708, in certain embodiments, the pool module 718 cooperates with the key-value mapping module 602 to determine an actual logical address for the requested data value (with the value address portion having zeros or another predefined value) even if an additional hash is stored in the value address portion in the logical-to-physical address mapping structure. In one embodiment, the put module 706 stores and the get module 708 retrieves key-value metadata associated with a data value, and the key-value metadata may include a pool identifier. The pool module 718 may determine whether a retrieved pool identifier from the key-value metadata matches a requested pool identifier to ensure that the correct key and correct pool has been read in response to the GET command, that a hash collision has not occurred, or the like.

Associating pool identifiers with key-value pairs, in some embodiments, could increase an amount of volatile memory used to store a logical-to-physical address mapping structure, increase the amount or size of key-value metadata stored with an associated value in the non-volatile memory media 110, or the like, due to storing pool identifiers and/or other pool metadata for key-value pairs. Having an explicit, separately tracked pool identifier associated with each key-value pair may also break the transparent nature of using a sparse logical address space to map keys to physical locations of the associated values in the non-volatile memory media 110 by introducing an additional tracking or lookup layer.

In certain embodiments, to make efficient use of the sparse logical address space, to avoid increased use of volatile memory and/or the non-volatile memory media 110, or the like, the pool module 718 may use the sparse logical address space described above to encode pool identifiers as an offset within a range of logical addresses, such as the value address portion of a logical address or the like. The encoding of a pool identifier into a logical address by the pool module 718, in certain embodiments, may be transparent in that the logical-to-physical translation layer 512 may process, store, and map logical addresses with pool identifier encodings in a standard manner as it would a non-encoded, non-key-value logical address of the non-volatile memory device 102, with little or no modification to support key-value pools.

As described above, the key-value store module 116 leverages the sparse logical address space of the non-volatile memory device 102 to store key-value pairs in one or more key-value stores 118. In certain embodiments, the put module 706, in cooperation with the device interface module 606 as described above, may store a key-value pair in the non-volatile memory media 110 as key-value metadata stored with the associated data value. Key-value metadata may include a length of the data value; the key associated with the data value; a logical address of the data value; one or more hash values of the key, the data value, and/or the logical address; a pool identifier for the data value; a client identifier of an owner of the data value; a key count; and/or other key-value metadata associated with the data value.

The key-value store module 116, the key-value mapping module 602, and the like may not store actual entire keys in memory but, as described above, may compute a hash of the actual entire key to determine a logical address or location for the associated value. Using a hash value in the logical-to-physical address mapping structure instead of entire keys, in certain embodiments, reduces the size of the logical-to-physical address mapping structure, allowing large keys to be used (e.g., up to 128 bytes or more) with smaller logical addresses (e.g., 48 bits, 64 bits, 128 bits or the like). Each potential location for a key-value pair in the logical-to-physical address mapping structure is associated with or reserves a region of the sparse logical address space to store key-value metadata and the associated data value.

The pool module 718, in certain embodiments, encodes pool identifiers into logical addresses of the associated key-value pairs, in cooperation with the key-value mapping module 602 or the like. In one embodiment, the pool module 718 encodes or otherwise stores pool identifiers as offsets within the associated or reserved regions of the sparse logical address space. An offset, as used herein, is a logical distance or difference between logical addresses or locations within a logical address space. The pool module 718 may encode a pool identifier as an offset by adding, appending, combining, storing, or otherwise integrating the pool identifier, a hash value for the pool identifier, or the like with a logical address for an associated key, so that the resulting encoded logical address is offset within the reserved region of the logical address space. For example, a logical address for a key that is not encoded with a pool identifier may map to a location at, or toward a beginning of, a reserved region of the logical address space, while a logical address encoded with a pool identifier may map to a location offset within the reserved region, further away from the beginning of the reserved region.

In a logical address encoded with a pool identifier, the last N bits (reading right to left) or least significant bits of a logical address for a key-value pair may be associated with the pool identifier; the first N bits, or most significant bits, of a logical address for a key-value pair may be associated with the pool identifier; or the pool identifier may be encoded at a different position within the logical address. For example, the pool module 718, in various embodiments, may encode a pool identifier into a value address portion of a logical address, may hash a pool identifier with a key to form a key address portion of a logical address, may encode a pool identifier at another location within a logical address, or the like. In certain embodiments, the pool module 718 may encode a pool identifier into a pool identifier address portion of a logical address, that comprises a separate set of bits from the key address portion and the value address portion described above. For example, in one embodiment, the pool module 718 may divide the most significant bits between the key address portion and the pool identifier address portion, with the value-address portion comprising the least significant bits. The location and encoding of a pool identifier address portion is predefined or known to the pool module 718, and the pool identifier address portion may have various positions relative to a key address portion and/or a value address portion of a logical address.

In embodiments where the pool module 718 does not hash the pool identifier, the value selected for N (e.g., the number of bits associated with or assigned to pool identifier encoding) may determine the number of key-value pools that are addressable, if N=2 then 4 key-value pools may be addressable, if N=3 then 8 key-value pools may be addressable, if N=10 then 1024 key-value pools may be addressable, or the like. By using the last N bits or least significant bits of a logical address for a key-value pair to encode a pool identifier, the pool module 718 may use the value address portion of the logical address both to reserve space for data values and to identify membership in a key-value pool.

The pool module 718 may store or encode a pool identifier itself as N bits of a logical address, may store a hash value of a pool identifier as N bits of a logical address, or the like. For example, for a maximum pool identifier value of 1024, the pool module 718 may allocate 10 bits of the logical address to encode the pool identifiers directly in the logical address without hashing. In a further embodiment, the pool module 718 may provide a maximum number of pool identifier values and a corresponding maximum number of available key-value pools that are greater than the amount of allocated bits of a logical address by hashing pool identifiers and encoding the resulting hash values into the logical addresses, as an offset represented by the allocated bits of the logical address, or the like.

In a further embodiment, determining a hash value for a pool identifier and encoding the resulting hash values may allow clients 114 greater flexibility to define or select pool identifiers other than what may be available by encoding the pool identifier into the number of data bits in the value address portion of a logical address. For example, the pool module 718, in certain embodiments, may support textual strings, pool names, digital certificates, or other data structures as pool identifiers by hashing the data structure and encoding the resulting hash value into a portion of a logical address.

By encoding pool identifiers into logical addresses of a sparse logical address space, the pool module 718 and/or the key-value mapping module 602 may transparently organize a key-value store 118 into key-value pools, without separately storing, tracking, or mapping pool identifiers, and without modifying the logical-to-physical translation layer 512 or the like to separately support pool identifiers, thereby minimizing the overhead of providing key-value pools to clients 114. In one embodiment, encoding pool identifiers into logical addresses of a sparse logical address space may alleviate the need to allocate additional volatile memory to store a pool identifier for each key-value pair. In a further embodiment, using the value address portion to store encoded pool identifiers may alleviate or reduce the need to extend or increase the size of the sparse logical address space to accommodate pool identifiers, as the value address portion serves the additional purpose of providing reserved logical address space for the value to be addressed and stored in the non-volatile memory media 110. For example, if a pool identifier were encoded in a logical address other than in the value address portion, in certain embodiments, the length or number of bits in each logical address may otherwise need to be increased by the entire size of the encoded pool identifier.

The key-value mapping module 602, to accommodate pool identifier encoding as logical address offsets, in one embodiment, may allocate larger ranges or regions of logical addresses for each key-value pair than would otherwise be necessary so that the ranges or regions may include the key-value pair (e.g., key-value metadata and the data value) stored at the offset. One tradeoff of increasing the size of ranges or regions of logical addresses for key-value pairs may be an increased probability of collisions, meaning the chance that multiple keys may hash into the same logical address range or region. This tradeoff, however, may be balanced with the convenience of providing key-value pools and the increased efficiency of encoding pool identifiers as logical address offsets in a sparse logical address space. Additionally, the key-value mapping module 602 may manage or prevent collisions as described above.

Ranges or regions of logical addresses sized to include both a key-value pair and an offset may facilitate the autonomous garbage collection or storage capacity recovery process described above. For example, in certain embodiments, the key-value mapping module 602 may ensure that a buffer or gap of at least one logical address exists between each key-value pair such that a stored key-value pair (e.g., key-value metadata and the data value) is logically contiguous but adjacent stored key-value pairs are not contiguous. The garbage collection or storage capacity recovery process may be configured to maintain data that has contiguous logical addresses, such as a stored key-value pair, contiguously in the log-based writing structure of the non-volatile memory media 110, copying logically contiguous data forward on the log-based writing structure together, or the like so that the logically contiguous data is also stored in close physical proximity. As used herein, data is logically contiguous if the data is associated with a single range of adjacent, contiguous logical addresses of the sparse logical address space, with no intervening logical addresses or the like. Alternatively, data is logically separated if the data is separated by at least one logical address in the sparse logical address space.

The key-value mapping module 602, in one embodiment, may ensure that a logical buffer or gap exists between different key-value pairs by allocating a logical address range to a key-value pair that is at least one logical address larger than a combined size of a maximum pool identifier offset and a maximum data value size for the key-value pair. For example, the key-value mapping module 602 may set the maximum pool identifier offset, the maximum data value size, and/or a logical address range size to place a logical buffer or gap of at least one logical address between each key-value pair. By ensuring that each individual key-value pair is logically contiguous but that different key-value pairs are logically separated by a logical buffer or gap of at least one logical address, in certain embodiments the garbage collection or storage capacity recovery process may manage the stored key-value pairs as logical units automatically, without an explicit command or configuration by the key-value store module 116.

If key-value metadata for a key-value pair is stored separately from the corresponding key data value, due to a garbage collection or storage capacity recovery process failing to manage key-value pairs as contiguous logical units or the like, accessing the key-value pair in the sequential, log-based writing structure of the non-volatile memory media 110 may require a "scatter-gather" read and/or write (e.g., multiple operations) to access the separate locations. The key-value mapping module 602, in one embodiment, may avoid or decrease scatter-gather operations by storing a data value and the corresponding key-value metadata contiguously in the logical address range or region allocated to the key-value pair and ensuring that a logical buffer or gap exists between different key-value pairs, as described above.

The size of a range or region of logical addresses that the key-value mapping module 602 allocates to each key-value pair may be selected based on a maximum value for a pool identifier and/or a maximum size of a data value of a key-value pair. In certain embodiments, the size of a range or region of logical addresses may be selected to fit or include the maximum value for a pool identifier and a data value of the maximum data value size, since the data value may be stored at the offset represented by the pool identifier, a hash value of the pool identifier, or the like.

For example, if the maximum pool identifier value or hash value is 2048 (e.g., 11 bits), the maximum data value size is 1 mebibyte, and the block or sector size is 512 bytes, the size of the range or region of logical addresses may be $2^{12}$ addresses (e.g., 12 bits), enough to address 2 mebibytes, so that the offset in which the pool identifier is encoded falls within the first mebibyte and the second mebibyte is reserved to ensure that the data value may be contiguously stored starting at any address in the first mebibyte, depending on the offset for the pool identifier, without extending out of the allocated range or region and potentially overlapping or colliding with a different range or region of logical addresses.

In certain embodiments, allocating a 2 mebibyte range or region of logical addresses to accommodate pool identifier encoding may provide a probability of about 3% that a key hash collision will occur, while allocating a 1 mebibyte range or region without pool identifier encoding may provide a probability of about 2%. The maximum value of a pool identifier may be selected to balance a number of available key-value pools with a probability of key hash collisions, or the like. While the key-value mapping module 602 and/or the pool module 718 may allocate or reserve a certain range or region of a sparse logical address space for each key-value pair, in certain embodiments, capacity of the non-volatile memory media 110 is used by the stored key-value pair itself (e.g., key-value metadata and the data value) and the remainder of the allocated logical range or region, including the pool identifier offset, does not consume physical storage capacity.

In certain embodiments, as described below with regard to the exists module 734 of FIG. 7B, prior to inserting a key-value pair into a key-value store 118, the pool module 718 performs a RANGE EXISTS operation or the like to determine whether a previously stored key-value pair from a different pool already exists in the same range of logical addresses allocated to the key-value pair that is to be inserted. By performing a RANGE EXISTS check, in certain embodiments, the pool module 718 may avoid overwriting key-value pairs from different pools.

If the RANGE EXISTS operation determines that a previously stored key-value pair already occupies an allocated range of logical addresses, that a key-value pair will overlap a previously stored key-value pair, or the like, the pool module 718 may handle the collision as described above with regard to the key-value mapping module 602 or the like. If a stored key-value pair and the key-value pair to be inserted both fit into the allocated range of logical addresses without overlapping (e.g., their pool identifiers are sufficiently far apart to accommodate their value sizes), in one embodiment, the pool module 718 may allow the multiple non-overlapping key-value pairs to occupy the same allocated range of logical addresses instead of treating the multiple key-value pairs as a collision.

In embodiments where a selected maximum pool identifier value is less than or equal to the size of the range of logical addresses allocated to pool identifier encoding (e.g., 1024 for a 10 bit pool identifier encoding, 2048 for an 11 bit pool identifier encoding) the pool module 718 may directly encode the pool identifier as the offset within the range, including the pool identifier directly in the logical address or the like. In one embodiment, a GET request for a key-value pair may include a key and a pool identifier associated with the key-value pair. To check for a key match in response to a GET request or the like, the key-value mapping module 602 may compute a hash of the key or otherwise convert the key to a starting logical address for the allocated logical address range of the key-value pair. The pool module 718, in response to the key-value mapping module 602 determining the starting logical address, may use the pool identifier to determine the offset within the allocated logical address range where the key-value pair is located. For a GET operation, if the exists module 734 described below determines that a key-value pair is stored at the determined offset, the data value and/or other key-value information is read from the determined offset to satisfy the GET operation. If the key-value pair starts at a different offset, then the key-value pair is a member of a different key-value pool and a collision or error has occurred.

In embodiments where a selected maximum pool identifier value is greater than the size of the range of logical addresses allocated to pool identifier encoding (e.g., greater than 1024 for a 10 bit pool identifier encoding, greater than 2048 for an 11 bit pool identifier encoding) the pool module 718 may hash the pool identifier and encode the resulting hash value as the offset within the range, instead of encoding the pool identifier directly. Similarly, a PUT or GET operation may use a hash value of the pool identifier as an offset within a range of logical addresses instead of using the pool identifier directly as the offset to accommodate larger pool identifier values. In certain embodiments, where a hash value is used as the offset, the pool module 718 may read a pool identifier from the stored key-value metadata for a key-value pair to check that the stored pool identifier matches a requested pool identifier, to confirm that a pool identifier collision has not occurred.

In certain embodiments, the pool module 718 may dynamically determine whether or not to hash pool identifiers based on whether a selected maximum pool identifier value satisfies a size threshold such as a maximum encodable value or the like. The maximum encodable value, as used herein, comprises an amount that may be represented by the number of bits available for encoding pool identifiers. The pool module 718, in one embodiment, may hash pool identifiers if the maximum pool identifier value is greater than the maximum encodable value. In a further embodiment, the pool module 718 may encode pool identifiers directly without hashing if the maximum pool identifier value is less than or equal to the maximum encodable value. For example, if 10 bits are available for encoding pool identifiers, representing a maximum encodable value of 1024, the pool module 718 may hash pool identifiers if the selected maximum pool identifier value is greater than 1024 and may encode pool identifiers directly without hashing if the selected maximum pool identifier value is less than or equal to 1024.

In this manner, the pool module 718 may provide clients 114 the efficiency of directly encoding pool identifiers for clients with key-value stores 118 if the clients 114 have a small number of key-value pools, while providing the flexibility of supporting a larger number of key-value pools for other clients 114. In certain embodiments, a client 114 may select a maximum pool identifier value for a key-value store 118. For example, in various embodiments, a client 114 may set the maximum pool identifier value using an API of the client interface module 604 and/or the pool module 718, may set the maximum pool identifier value at creation time of the key-value store 118 using the open/close module 704, or the like.

The key-value mapping module 602, in certain embodiments, may set or adjust the size of a sparse logical address space assigned to a key-value store 118 based on a maximum pool identifier value for the key-value store 118. For example, the key-value mapping module 602 may increase a size of a sparse logical address space from a default size in response to a maximum pool identifier value that exceeds a threshold, may decrease a size of a sparse logical address space from a default size in response to a maximum pool identifier value that is less than a threshold, or the like. The key-value mapping module 602, in certain embodiments, may select the size of a sparse logical address space for a key-value store 118 to accommodate logical addresses with a size sufficient to encode a maximum pool identifier value while remaining below a selected likelihood of a hash collision, or the like.

The iterate module 712, in certain embodiments, includes a default iterator that iterates over logical addresses and/or keys for an entire key-value store 118, regardless of pools of the key-value store 118. If a BEGIN command, a NEXT command, a GET CURRENT command, or the like specifies a pool, the pool module 718 may cooperate with the iterate module 712 to provide a pool level iterator. For a pool level iterator, in one embodiment, the iterate module 712 iterates over logical addresses and/or keys for the entire key-value store 118 as described above with regard to the default iterator, and determines a hash based on a pool identifier for the pool level iterator and a selected logical address and compares the resulting hash with an additional hash stored in the logical-to-physical address mapping structure as described above. If the determined hash matches the stored additional hash, the logical address is associated with a key-value pair of the pool for the pool level iterator and the iterate module 712 iterates to the selected logical address or key. If the determined hash fails to match the stored additional hash, the logical address is not associated with a key-value pair of the pool for the pool level iterator, and the iterate module 712 continues to test subsequent logical addresses and/or keys until a member of the pool is located. In embodiments where hash collisions may occur (due to large numbers of pools or the like), in addition to the matching check, the pool module 718 and/or the iterate module 712 may retrieve key-value metadata from the non-volatile memory media 110 for the selected logical address to confirm that the pool identifier stored with the key-value metadata matches the pool identifier of the poll level iterator. In this manner, using the additional hash as a hint or preliminary check allows the pool module 718 and/or the iterate module 712 to resolve at least a portion of false matches without reading key-value metadata from the non-volatile memory media 110, providing greater efficiency for a pool level iterator of the iterate module 712 than if key-value metadata were read from the non-volatile memory media 110 for each iterated logical address and/or key.

In one embodiment, the metadata module 720 services key-value commands from clients 114 relating to metadata or other information for key-value pairs, key-value stores 118, and/or key-value pools, such as a GET STORE INFO command, a SET STORE METADATA, a GET POOL INFO command, a SET POOL METADATA command, a GET KEY INFO command, a SET KEY METADATA command, or the like. The metadata module 720, in one embodiment, returns metadata and/or other information to a requesting client, such as a total number of pools, a total number of valid keys, an amount of available storage capacity, or the like, in response to a GET STORE INFO command with a key-value store identifier. The metadata module 720, in a further embodiment, sets metadata for a key-value store 118 in response to a SET STORE METADATA command from a client 114 with a key-value store identifier for the key-value store and the metadata to be set or updated, such as a priority or quality of service for the key-value store 118, ownership information for the key-value store 118, configuration parameters for the key-value store 118, or the like.

The metadata module 720, in one embodiment, returns metadata and/or other information to a requesting client, such as a total number of valid keys, an amount of available storage capacity, or the like, in response to a GET POOL INFO command with a key-value store identifier and a pool identifier. The metadata module 720, in a further embodiment, sets metadata for a pool in response to a SET POOL METADATA command from a client 114 with a key-value store identifier and a pool identifier for the pool and the metadata to be set or updated, such as a priority or quality of service for the pool, ownership information for the pool, configuration parameters for the pool, or the like.

The metadata module 720, in one embodiment, returns metadata and/or other information to a requesting client, such as an expiration time for a key, a generation count for a key, a length of the data value addressed by the key, or the like, in response to a GET KEY INFO command with a key, a key-value store identifier, and/or a pool identifier. The metadata module 720, in a further embodiment, sets metadata for a key and/or data value in response to a SET KEY METADATA command from a client 114 with a key, a key-value store identifier, and/or a pool identifier for the key and the metadata to be set or updated, such as a priority or quality of service for the key, ownership information for the key, configuration parameters for the key, or the like.

In one embodiment, the notification module 722 notifies a client 114, the computer device 112, and/or the key-value store module 116 of one or more key-value events, such as an amount of available storage capacity for a key-value store falling below a predefined threshold, the expiration module 612 expiring one or more key-value pairs, a key-value error event, a key-value security event, or the like. The notification module 722, in certain embodiments, supports a REGISTER NOTIFICATION HANDLER command with which a client 114, the computer device 112, and/or another entity may register to receive notifications for a key-value store 118, a pool, a key, or the like. In one embodiment, a REGISTER NOTIFICATION HANDLER command includes a key-value store identifier, a pool identifier, and/or a key as a parameter. In a further embodiment, a REGISTER NOTIFICATION HANDLER command includes an identifier or pointer to a handler which is to receive notifications.

Figure 7B:
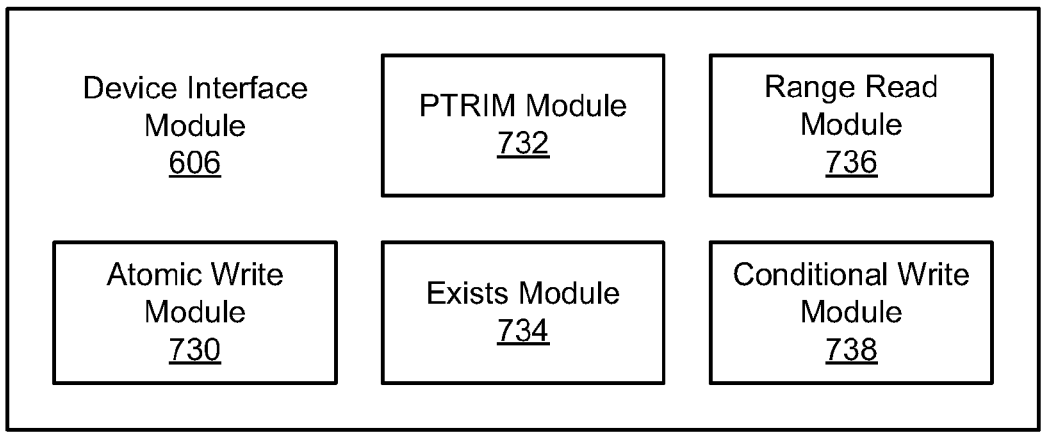
FIG. 7B is a schematic block diagram illustrating one embodiment of a device interface module.

FIG. 7B depicts another embodiment of a device interface module 606. In certain embodiments, the device interface module 606 may be substantially similar to the device interface module 606 described above with regard to FIGS. 6A and 6B. The device interface module 606, in the depicted embodiment, includes an atomic write module 730, a PTRIM module 732, an exists module 734, a range read module 736, and a conditional write module 738.

In one embodiment, the atomic write module 730 stores a data value to the non-volatile memory device 102, in response to a PUT command or the like for an associated key, using an ATOMIC WRITE operation. In further embodiments, the atomic write module 730 may additionally store key-value metadata for a data value with the data value, as described above with regard to the put module 706. An ATOMIC WRITE operation, in certain embodiments, provides variable size writes to accommodate variable sized data values.

The atomic write module 730 may leverage storage metadata (such as the logical-to-physical address mapping structure) and the sequential, log-based data storage disclosed herein to implement efficient atomic operations such as an ATOMIC WRITE operation. Many applications (e.g., user applications 502) rely on atomic storage operations. Atomic storage operations may be limited to a relatively small, fixed-sized data (e.g., a single sector within a block storage device). Atomic storage operations may require a "copy on write" operation to ensure consistency (e.g., to allow the atomic storage operation to be rolled back, if necessary), which may significantly impact the performance of the atomic storage operations. Moreover, support for atomic storage operations may typically be provided by a layer that maintains its own, separate metadata pertaining to atomic storage operations, resulting in duplicative effort, increased overhead, and/or decreased performance.

In some embodiments, the atomic write module 730 may leverage or extend storage metadata to provide efficient atomic storage operations through the memory controller interface 124. Consistency of storage metadata may be maintained by deferring updates until the one or more storage operations comprising the atomic storage request are complete. Metadata pertaining to storage operations that are "in process" (e.g., ongoing operations that are not yet complete) may be maintained in separate "inflight" metadata. Accordingly, in certain embodiments, the state of storage metadata is maintained until the atomic storage operation successfully completes, obviating the need for extensive post-failure "roll back" operations.

The sequential, log-based data format provides an "event log" of storage operations on the non-volatile memory device 102. The sequential, log-based storage retains multiple copies of data (e.g., previous versions of the data) on the non-volatile memory device 102. The previous versions may be retained until the data is marked as invalid in the storage metadata and/or the data is recovered in a storage capacity recovery operation.

The storage metadata, such as the logical-to-physical address mapping structure, may be reconstructed from the sequential, log-based data stored on the non-volatile memory media 110. The up-to-date version of data is identified based upon the location of the append point and/or sequence indicators associated with the data. During reconstruction, data pertaining to an incomplete atomic storage request, such as an ATOMIC WRITE operation for a data value, may be identified (and discarded) using persistent metadata associated with the data.

In some embodiments, the atomic write module 730 provides atomic storage operations by storing data in a sequential, log-based format, storing data pertaining to an atomic storage request together with persistent metadata on the non-volatile memory media 110, and/or acknowledging completion of the atomic storage request when the one or more storage operations are complete. The logical identifiers of the atomic storage request may be noncontiguous. Completion of a storage request may comprise transferring data to a write buffer, a protection domain, a powercut safe domain, and/or storing the data on a non-volatile memory device 102. The persistent metadata may be stored with data of the atomic storage request in a single storage operation. The storage metadata may be preserved while an atomic storage operation is in process by deferring updates to the storage metadata until the atomic storage operation is complete. Metadata pertaining to an atomic storage operation that is in progress may be maintained in a separate index (inflight index). In some embodiments, a first persistent metadata flag identifies data pertaining to the atomic storage request, and a second persistent metadata flag indicates completion of the atomic storage request. An incomplete atomic storage request is identified when the non-volatile memory device 102 comprises the first flag, but not the second flag. Alternatively, the persistent metadata flags may comprise an identifier (e.g., transaction or atomic storage request identifier). Storage operations of an atomic storage request may be completed despite invalid shutdown conditions, such as a failure of a host computer device 112, power loss or the like. Assignments between logical identifiers and physical storage locations may be preserved until the atomic storage operation completes. Metadata pertaining to in process atomic storage operations may be maintained in an inflight index, which may be separate from other storage metadata. The inflight index may be accessed to identify read and/or write hazards pertaining to the atomic storage request.

In one embodiment, the atomic write module 730 stores data values to one or more logical addresses of the non-volatile memory device 102 that are members of a restricted set of logical addresses. Data of the restricted set of logical addresses is accessible to clients 114 through a key-value store interface 120 of the key-value store module 116, but is unavailable through a block device interface for the non-volatile memory device 102 (such as the memory controller interface 124 or the like). For example, in one embodiment, the non-volatile memory device 102 has a sparse logical address space that is larger than a physically addressable capacity of the non-volatile memory device 102. The sparse logical address space may include a first set of logical addresses that is available to clients 114 over a block device interface. The first set of logical addresses may correspond to a reported physical capacity of the non-volatile memory device 102, that clients 114 may access using standard block device commands. The sparse logical address space may also include a second set of logical addresses, the restricted set, that is unavailable to clients 114 through a block device interface. In one embodiment, the restricted set of logical addresses is in a portion of the sparse logical address space that is greater than a maximum client addressable capacity of the non-volatile memory device 102.

In certain embodiments, because the atomic write module 730 stores key-value store data in a restricted set of logical addresses that are unavailable over a block device interface and/or available exclusively through a key-value store interface, the key-value store data may be substantially invisible to clients 114 or other entities accessing the non-volatile memory device 102 using a block device interface. The key-value store data therefore persists through formatting of the non-volatile memory device 102, installation of an operating system on the non-volatile memory device 102, erasing of the non-volatile memory device 102, or the like.

The one or more logical addresses at which the atomic write module 730 stores or persists data values, are mapped to physical locations on the non-volatile memory media 110 of the non-volatile memory device 102. In one embodiment, the logical-to-physical translation layer 512 uses a single mapping structure to map logical addresses for key-value store data to physical locations on the non-volatile memory media 110, and to map logical addresses for workload data to physical locations on the non-volatile memory media 110.

The atomic write module 730, in one embodiment, intermingles key-value store data with workload data on the non-volatile memory media 110. By separating the key-value store data from the workload data logically but intermingling them physically, the key-value store data receives the same data protection characteristics as the workload data. For example, as described above, the non-volatile memory controller 104, the write data pipeline 106, and the read data pipeline 108 provide certain data protection characteristics for data, such as error correction, garbage collection or storage capacity recovery, power cut or power loss protection, or the like to protect the integrity of data on the non-volatile memory media 110. These data protection characteristics are applied to data regardless of the logical address for the data, restricted or not, applying to workload data and key-value store data.

In one embodiment, the atomic write module 730 stores or persists key-value store data by inserting the key-value store data into a write path for the non-volatile memory device 102, such as the write data pipeline 106, a write queue, a write buffer, or the like. In certain embodiments, the write path includes both the key-value store data and workload data so that the key-value store data receives the same data protection characteristics as the workload data, as described above. In another embodiment, the atomic write module 730 persists the key-value store data by writing the key-value store data to an append point of a sequential log-based writing structure persisted on the non-volatile memory media 110 of the non-volatile memory device 102. The sequential log-based writing structure, in certain embodiments, stores key-value store data and workload data intermingled in an order that the write data pipeline 106 or other write path receives the data. The sequential log-based writing structure, in a further embodiment, stores key-value store data and workload data using an address mapping structure that associates logical addresses with physical storage locations of the non-volatile memory device 102. Embodiments of sequential log-based writing structures and address mapping structures are described above with regard to the logical-to-physical mapping layer 512 and below with regard to FIG. 10.

In one embodiment, the PTRIM module 732 uses a PTRIM operation to persistently delete, erase, remove, or otherwise clear an associated data value from the non-volatile memory media 110 in response to a DELETE command or the like for a key.

In some embodiments, the PTRIM module 732 may be configured to receive PTRIM messages from clients 114, from the delete module 710, or the like. As used herein, a PTRIM message refers to a message (e.g., "hint" or "directive") that one or more logical addresses and/or keys are no longer in use to reference data on the non-volatile memory media 110 (e.g., that data of the specified logical address and/or key can be (or shall be for PTRIM directives) erased from the non-volatile memory media 110). A PTRIM message may not require that the data be removed immediately; rather, the data may remain on the non-volatile memory media 110 until the storage division upon which the data is stored is erased (e.g., in a subsequent storage capacity recovery operation). Data of the PTRIM message may be "logically invalidated," however. As used herein, "logically invalidating," data of a logical identifier refers to removing one or more references to the data in volatile metadata, such as the logical-to-physical address mapping structure, described above. Since the data is invalidated logically (e.g., in the logical-to-physical address mapping structure), the PTRIM message may provide inconsistent results if/when volatile metadata such as the logical-to-physical address mapping structure is lost due to inter alia an invalid shutdown, software fault, memory fault, or the like.

Accordingly, in some embodiments, the PTRIM module 732 may be configured to store a persistent indicator of a PTRIM message (e.g., a persistent note) on the non-volatile memory media 110. The persistent note may ensure that the PTRIM message is implemented even if volatile metadata, such as the logical-to-physical address mapping structure, is lost. Accordingly, the persistent note may be used to exclude logically invalidated data from reconstructed volatile metadata, such as a reconstructed logical-to-physical address mapping structure. In some embodiments, the PTRIM module 732 provides one or more different PTRIM APIs, including a PTRIM message (or hint), which does not comprise storing a persistent note, and a PTRIM directive that includes storing a persistent note to ensure that the PTRIM directive is effective.

As discussed above, the non-volatile memory device 102 may be configured to store data on the non-volatile memory media 110 in a sequential, log-based format. The contents of the non-volatile memory device 102 may, therefore, comprise an ordered "event log" of storage operations on the non-volatile memory media 102. The sequential ordering of storage operations may be maintained by appending data at an append point within the physical storage space of the non-volatile memory device 102. Alternatively, or in addition, sequence information may be maintained through persistent data stored on the non-volatile memory media 110. For example, each storage division (e.g., erase block) on the non-volatile memory media 110 may comprise a respective indicator (e.g., timestamp, sequence number, or other indicator), to indicate an order or sequence of the storage division within the event log. In this manner, the non-volatile memory controller 104 may perform a recovery scan of the sequential, log-based storage structure, including PTRIM messages or persistent notes, to reconstruct the logical-to-physical address mapping structure or other volatile metadata and to ensure that data values associated with a PTRIM operation are persistently invalidated.

In one embodiment, the exists module 734, in response to a GET command or the like for an associated key, uses an EXISTS operation to determine whether the non-volatile memory media 110 stores a data value for the key. Being able to reliably remove a data block via PTRIM, as described above, conceptually requires the notion of block existence.

Thus a corollary operation, EXISTS, can be defined to determine if a block currently exists within the storage subsystem. This operation may be needed because legacy READ and WRITE operations on a valid logical address perform a mapping allocation in typical storage devices if that block is currently unmapped. By combining EXISTS and PTRIM, a new storage paradigm can be provided that allows the filesystem to offload block tracking to a non-volatile translation layer where the tracking is already mandated, eliminating redundant tracking information. For example, the exists module 734 may implement an EXISTS operation in cooperation with the logical-to-physical translation layer 512, and may use the logical-to-physical address mapping structure, as maintained by the PTRIM module 732, to determine if a valid data value for a logical address is stored by the non-volatile memory media 110.

The put module 706, in one embodiment, in response to a PUT command, may cooperate with the key-value mapping module 602 to determine a logical address for a received key, and may cooperate with the exists module 734 to determine whether a data value already exists for the determined logical address. If a data value already exists for the determined logical address, the put module 706 may perform conflict resolution based on a replace flag for the PUT command, based on a default collision policy, or the like as described above. In other embodiments, instead of or in addition to cooperating with the exists module 734, the put module 706 may use a CONDITIONAL WRITE command, as described below with regard to the conditional write module 738. The get module 708, in certain embodiments, in response to receiving a GET command, cooperates with the key-value mapping module 602 to determine a logical address for a received key, and cooperates with the exists module 734 to determine whether a data value exists for the determined logical address to satisfy the GET command as described above.

In certain embodiments, as described above with regard to the pool module 718, the exists module 734 may implement a RANGE EXISTS operation, to determine whether a block currently exists in a range of logical addresses. For example, in embodiments where the pool module 718 encodes a pool identifier as an offset within a range of logical addresses, the exists module 734 may search for the presence or existence of a key-value pair (e.g., key-value metadata and a data value) stored anywhere within an allocated range of logical addresses. The exists module 734 may search a range of allocated logical addresses by traversing the logical-to-physical address mapping structure described above checking for logical address entries within the range, or the like.

The location or offset at which a key-value pair is stored may indicate which key-value pool the key-value pair is a member. The exists module 734 may perform a RANGE EXISTS operation, in certain embodiments, over a range of logical addresses associated with encoded pool identifiers, without searching the entire allocated range. In the 2 mebibyte, 512 byte block or sector size example described above with regard to the pool module 718 where a range of $2^{12}$ logical addresses are reserved, for example, the exists module 734 may search the first 1 mebibyte addressable by the logical address range, the first $2^{11}$ z logical addresses, for existence of a key-value pair without searching the second mebibyte addressable by the range, the second $2^{11}$ logical addresses.

As described above, to search a range of logical addresses, the exists module 734 may search or traverse the logical-to-physical address mapping structure, checking for the existence of a logical address in the searched range within the logical-to-physical address mapping structure. In certain embodiments, existence of a logical address in the logical-to-physical address mapping structure denotes storage of data corresponding to the logical address in the non-volatile memory media 110, so that if the exists module 734 locates a logical address, the data of the logical address is stored on the non-volatile memory media 110.

The exists module 734, in one embodiment, may perform a RANGE EXISTS operation prior to inserting a key-value pair into a key-value store 118, to avoid overwriting a key-value pair from a different key-value pool in the same range or the like. For example, the put module 706, in response to a PUT command, may cooperate with the exists module 734 to determine whether a data value already exists within a range or region of logical addresses using a RANGE EXISTS operation. In a further embodiment, the exists module 734 may determine a size of a stored key-value pair as part of a RANGE EXISTS operation, to facilitate storage of non-overlapping key-value pairs of different pools within the same range of logical addresses, allowing multiple key-value pairs to share the same allocated range of logical addresses, size permitting.

In one embodiment, the range read module 736 retrieves a data value, and associated key-value metadata if any, from the non-volatile memory media 110 using a RANGE READ operation in response to a GET command or another read request as described above with regard to the get module 708. Without a RANGE READ operation, in certain embodiments, the key-value mapping module 602 determines a logical address for a requested data value as described above, and the get module 708 reads key-value metadata for the requested data value to determine a length of the data value (since data values may have variable lengths), to check that the received key matches the stored key, or the like. With the length of the data value, the get module 708 may read the full data value from the non-volatile memory media using a standard READ operation.

The range read module 736, in certain embodiments, instead of reading the key-value metadata and performing a second read operation to read the data value, reads the entire data value from the non-volatile memory media 110 prior to confirming that the stored key matches the received key. In one embodiment, hash collisions occur infrequently, such as about less than 2% of the time, and using the range read module 736 optimizes the implementation of the GET command.

In certain embodiments, to read the data value without knowing the size or length of the data value, the range read module 736 provides a RANGE READ operation. In a standard READ operation, an unfilled range of memory is typically filled with zeros, which is inefficient since the zeros are not part of the requested data value. A RANGE READ operation, in contrast to a standard READ operation, returns only a populated range of data, without adding or padding the remainder with zeros. For example, if the non-volatile memory media 110 stores a data value at logical address X and the data value is Y blocks or sectors long, the range read module 736 may perform a RANGE READ for Z blocks or sectors starting at X (where Z>Y), and will only return Y blocks or sectors to the get module 708.

In one embodiment, the conditional write module 738 implements a PUT command in cooperation with the put module 706. In certain embodiments, the put module 706 may service a PUT command without the conditional write module 738 by cooperating with the key-value mapping module 602 to determine a logical address for a data value based on a key, providing the logical address to the exists module 734 to determine whether a data value exists for the logical address, and, if the exists module 734 determines that a data value does not yet exist for the logical address, writing the data value to the logical address using the atomic write module 730 or the like. If a data value exists for the logical address, the put module 706 may perform conflict resolution based on a replace flag for the PUT command, based on a default collision policy, or the like as described above. In one embodiment, if hash collisions are relatively infrequent, less than about 2% of the time or the like, the majority of EXISTS calls made by the exists module 734 for PUT commands will fail because no data value exists for the associated logical address. EXISTS calls may incur overhead, as a system call, and may contend with other PUT commands for access to the logical-to-physical map.

The conditional write module 738, in one embodiment, implements a CONDITIONAL WRITE operation that fails if a part of the range in question is populated with data. In certain embodiments, the CONDITIONAL WRITE operation fails if a data value is already stored at a logical address. With a CONDITIONAL WRITE operation, in one embodiment, the put module 706 does not use the exists module 734 to make an EXISTS call during execution of a PUT command, but instead directly issue the conditional write module 738 to make a CONDITIONAL WRITE. If a CONDITIONAL WRITE succeeds, the PUT command is complete. If a CONDITIONAL WRITE fails, the put module 706 may invoke conflict resolution based on a replace flag for the PUT command, based on a default collision policy, or the like. The conditional write module 738 may cooperate with the atomic write module 730 to write data values to the non-volatile memory media 110 when the CONDITIONAL WRITE does not fail. In embodiments where a CONDITIONAL WRITE is atomic, if the CONDITIONAL WRITE fails, no evidence of the failed attempt will be visible to a subsequent READ operation or GET command.

By using primitive operations such as ATOMIC WRITE, EXISTS, RANGE EXISTS, PTRIM, RANGE READ, and CONDITIONAL WRITE, in certain embodiments, the device interface module 606 stores and retrieves variable sized data values efficiently without wasting physical storage capacity of the non-volatile memory media 110. Further, primitive operations such as ATOMIC WRITE, EXISTS, RANGE EXISTS, PTRIM, RANGE READ, and CONDITIONAL WRITE, in one embodiment, obviate the need for additional key-value data structures such as a key-value index or the like, allowing the key-value mapping module 602 to use the logical-to-physical address mapping structure to map keys to physical locations for values without the overhead of additional levels of lookups or record keeping.

Figure 8:
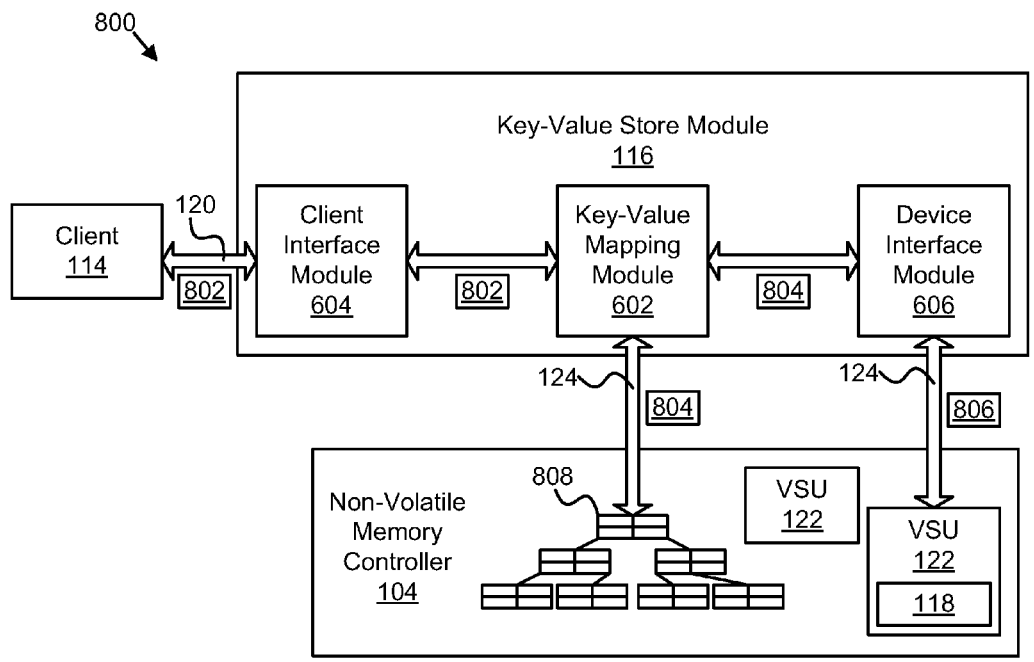
FIG. 8 is a schematic block diagram illustrating one embodiment of a system for a key-value store.

FIG. 8 depicts one embodiment of a system 800 for a key-value store 118. The system 800, in the depicted embodiment, includes a client 114, a key-value store module 116, and a non-volatile memory controller 104. The client 114, the key-value store module 116, and the non-volatile memory controller 104, in certain embodiments, may be substantially similar to those described above.

The client 114, in the depicted embodiment, communicates one or more key-value store commands to the client interface module 604 over a key-value store interface 120 provided by the client interface module 604, such as a key-value store API. Examples of key-value store commands, in various embodiments, may include one or more of a CREATE command, a POOL CREATE command, an OPEN command, a PUT command, a GET command, a DELETE command, a DELETE POOL command, a DELETE ALL command, an ITERATOR NIT command, a BEGIN command, a NEXT command, a GET CURRENT command, an ENUMERATE command, an EXPORT command, a GET STORE INFO command, a SET STORE METADATA, a GET POOL INFO command, a SET POOL METADATA command, a GET KEY INFO command, a SET KEY METADATA command, a REGISTER NOTIFICATION HANDLER command, a CLOSE command, a DESTROY command, a BATCH GET command, a BATCH PUT command, and the like.

Certain key-value store commands include a key 802, which the client 114 may send to the client interface module 604 as a parameter to a key-value store command. In the depicted embodiment, the client interface module 604 sends the key 802, with other key-value store command data or instructions, to the key-value mapping module 602, which determines a logical address 804 based on the received key 802. As described above, the key-value mapping module 602 may use a key 802 as a logical address 804, may hash a key 802 into a logical address 804, may hash a key 802 into a key address portion of a logical address 804 and add a value address portion to complete the logical address 804, or the like.

The key-value mapping module 602, in the depicted embodiment, is in communication with the non-volatile memory controller 104 to access and/or manipulate a logical-to-physical address mapping structure 808. The logical-to-physical address mapping structure 808 is described in greater detail with regard to FIG. 10. The key-value mapping module 602, as described above, may cooperate with a logical-to-physical translation layer 512 of the non-volatile memory controller 104 to store logical addresses 804 for key-value pairs in the logical-to-physical address mapping structure 808, to map logical addresses 804 for key-value pairs to physical locations of the data values on the non-volatile memory media 110, to determine whether a key-value pair for a logical address 804 exists and is stored on the non-volatile memory media 110, or the like. The key-value mapping module 602, in one embodiment, sends a determined logical address 804 for a data value to the device interface module 606. In other embodiments, the key-value mapping module 602 and/or the client interface module 604 may send a physical location of a data value on the non-volatile memory media 110, other key-value store command data or instructions, or the like to the device interface module 606. The device interface module 606 executes one or more primitive operations that the non-volatile memory controller 104 provides, such as WRITE, ATOMIC WRITE, EXISTS, RANGE EXISTS, PTRIM, READ, RANGE READ, CONDITIONAL WRITE, or the like, to service a key-value store command from the client 114. The device interface module 606 may cooperate with the client interface module 604 to translate a key-value store command to one or more primitive operations of the non-volatile memory controller 104. The device interface module 606 may return a data value, key-value metadata, or the like to the client interface 604 to include in a key-value store command response to the client 114.

Figure 9:
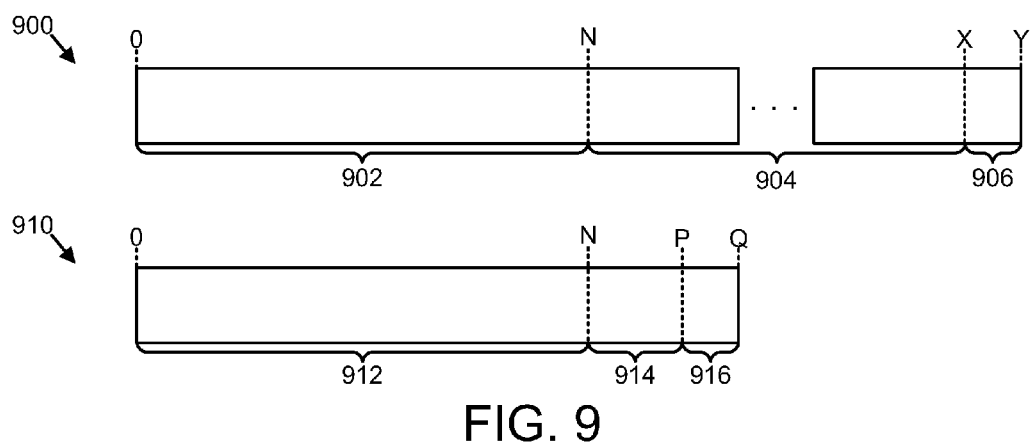
FIG. 9 is a schematic block diagram illustrating one embodiment of a logical address space and a physical storage capacity for a non-volatile memory.

FIG. 9 depicts one embodiment of a logical address space 900 and a physical storage capacity 910 for a non-volatile memory device 102. In the depicted embodiment, the logical address space 900 is a sparse address space that is larger than the physical storage capacity 910 of the non-volatile memory device 102. A first set of LBAs 902 corresponds to a reported capacity 912 of the non-volatile memory device 102. The reported capacity 912, in certain embodiments, is the capacity that is discoverable and useable by clients 114, operating systems, computer devices 112, and the like. The first set of LBAs 902 is available to clients 114 over a block device interface.

The reported capacity 912, in the depicted embodiment, is less than the total available physical storage capacity 910 of the non-volatile memory device 102, as the non-volatile memory device 102 includes reserve capacity 914 for bad block substitutions, for storing metadata, for storing invalid data, and the like and key-value store capacity 916 for storing key-value store data. The reserve capacity 914 and the key-value store capacity 916, in certain embodiments, may be managed together, as available metadata capacity or system capacity, and adjusted based on capacity demands. While the reported capacity 912, the reserve capacity 914, and the key-value store capacity 916 are depicted logically as being separated, as described above, in certain embodiment, workload data, key-value store data, system metadata, and the like use the same write path and are written to an append point of a sequential, log-based writing structure, so that the workload data, key-value store data, system metadata, and the like are intermingled on the physical non-volatile memory media 110. Further, in the depicted embodiment, each set of LBAs 902, 904, 906 is illustrated as a contiguous range of LBAs. In other embodiments, the first set of LBAs 902 and the key-value store set of LBAs 906 may be noncontiguous, interspersed using one or more hashing functions or other address mapping functions, or otherwise intermingled through the logical address space 900, instead of being disposed in contiguous ranges.

In the depicted embodiment, a key-value store set of LBAs 906 comprises a restricted set of LBAs 906 and is a part of a larger restricted set of LBAs 904, 906. Alternatively, in another embodiment, the key-value store set of LBAs 906 may be a single restricted set of LBAs 906, with the set of LBAs 904 between LBA N and LBA X not being a restricted set. A restricted set of LBAs is inaccessible using a block device interface. In one embodiment, the size of the key-value store set of LBAs 906 is dynamic, and may grow or shrink dynamically as data values are added to or removed from the key-value store 118. In another embodiment, the size of the key-value store set of LBAs 906 is static. For example, a client 114, in one embodiment, may request a certain size for a key-value store set of LBAs 906 using a CREATE command, requesting a certain number of keys, requesting a certain size of key-value store index 802, or the like and the size for the key-value store set of LBAs 906 may be based on the client request. In another embodiment, the key-value store set of LBAs 906 is associated with a VSU 122 of a key-value store 118. The size of the key-value store set of LBAs 906, in certain embodiments, is selected not to exceed the reserve capacity 914 of the non-volatile memory device 102. In other embodiments, the size of the key-value store set of LBAs 906 may be allowed to grow into the reported capacity 912. In one embodiment, the size allocated for the key-value store set of LBAs 906 is a logical or virtual allocation and does not use or reserve physical storage capacity 910 of the non-volatile memory device 102 until data values are stored in the key-value store set of LBAs 906 and the corresponding LBAs are mapped to physical locations on the non-volatile memory device 102 that store the data values.

In embodiments where one or more additional LBAs 904 exist in the logical address space 900, the additional LBAs 904 may be restricted or unrestricted. The additional LBAs 904, in one embodiment, may be unused. In another embodiment, the additional LBAs 904 may be allocated to additional key-value stores 118, or for other functions of the non-volatile memory device 102.

Figure 10:
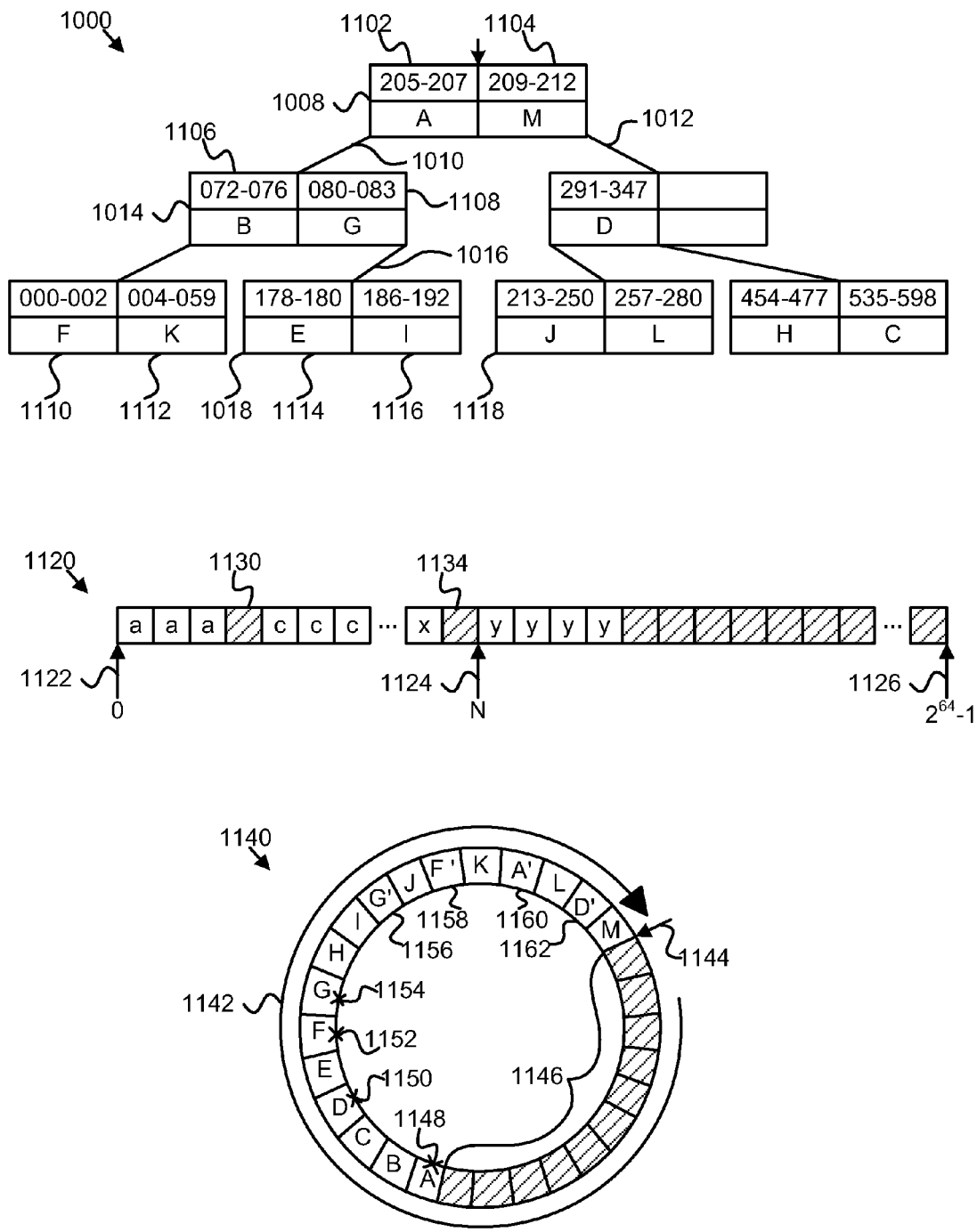
FIG. 10 is a schematic block diagram illustrating one embodiment of a mapping structure, a logical address space, and a log-based writing structure.

FIG. 10 depicts one embodiment of a mapping structure 1000, a logical address space 1120, and a sequential, log-based, append-only writing structure 1140. The mapping structure 1000, in one embodiment, is maintained by the logical-to-physical translation layer 512 of the non-volatile memory controller 506 to map LBAs or other logical addresses to physical locations on the non-volatile memory media 110. The mapping structure 1000, in the depicted embodiment, is a B-tree with several entries. In the depicted embodiment, the nodes of the mapping structure 1000 include direct references to physical locations in the non-volatile memory device 102. In other embodiments, the mapping structure 1000 may include links that map to entries in a reverse map, or the like. The mapping structure 1000, in various embodiments, may be used either with or without a reverse map. In other embodiments, the references in the mapping structure 1000 may include alpha-numerical characters, hexadecimal characters, pointers, links, and the like.

The mapping structure 1000, in the depicted embodiment, includes a plurality of nodes. Each node, in the depicted embodiment, is capable of storing two entries. In other embodiments, each node may be capable of storing a greater number of entries, the number of entries at each level may change as the mapping structure 1000 grows or shrinks through use, or the like.

Each entry, in the depicted embodiment, maps a variable length range of LBAs of the non-volatile memory device 102 to a physical location in the storage media 110 for the non-volatile memory device 102. Further, while variable length ranges of LBAs, in the depicted embodiment, are represented by a starting address and an ending address, in other embodiments, a variable length range of LBAs may be represented by a starting address and a length, or the like. In another embodiment, instead of storing variable length ranges of LBAs, the mapping structure 1000 may store a single LBA or other logical address in an entry as a starting address for a data value and/or for associated key-value metadata.

In one embodiment, the capital letters 'A' through 'M' represent a logical or physical erase block in the physical storage media 110 of the non-volatile memory device 102 that stores the data of the corresponding range of LBAs. In other embodiments, the capital letters may represent other physical addresses or locations of the non-volatile memory device 102. In the depicted embodiment, the capital letters 'A' through 'M' are also depicted in the log-based writing structure 1140 which represents the physical storage media 110 of the non-volatile memory device 102.

In the depicted embodiment, membership in the mapping structure 1000 denotes membership (or storage) in the non-volatile memory device 102. In another embodiment, an entry may further include an indicator of whether the non-volatile memory device 102 stores data corresponding to a logical block within the range of LBAs, data of a reverse map, and/or other data.

In the depicted embodiment, the root node 1008 includes entries 1102, 1104 with noncontiguous ranges of LBAs. A "hole" exists at LBA "208" between the two entries 1102, 1104 of the root node. In one embodiment, a "hole" indicates that the non-volatile memory device 102 does not store data corresponding to one or more LBAs corresponding to the "hole." In one embodiment, the non-volatile memory device 102 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 1106, 1108 of the node 1014, between the entries 1110, 1112 of the left child node of the node 1014, between entries 1114, 1116 of the node 1018, and between entries of the node 1118. In one embodiment, similar "holes" may also exist between entries in parent nodes and child nodes. For example, in the depicted embodiment, a "hole" of LBAs "060-071" exists between the left entry 1106 of the node 1014 and the right entry 1112 of the left child node of the node 1014.

The "hole" at LBA "003," in the depicted embodiment, can also be seen in the logical address space 1120 of the non-volatile memory device 102 at logical address "003" 1130. The hash marks at LBA "003" 1140 represent an empty location, or a location for which the non-volatile memory device 102 does not store data. The "hole" at LBA 1134 in the logical address space 1120, is due to one or more block I/O requests with noncontiguous ranges, a PTRIM or other deallocation command to the non-volatile memory device 102, or the like.

The logical address space 1120 of the non-volatile memory device 102, in the depicted embodiment, is larger than the physical storage capacity and corresponding storage device address space of the non-volatile memory device 102. In the depicted embodiment, the non-volatile memory device 102 has a 64 bit logical address space 1120 beginning at logical address "0" 1122 and extending to logical address "$2^{64}-1$" 1126. Because the storage device address space corresponds to only a subset of the logical address space 1120 of the non-volatile memory device 102, the rest of the logical address space 1120 may be restricted, and used for a key-value store 118 as described above, or used for other functions of the non-volatile memory device 102.

The sequential, log-based, append-only writing structure 1140, in the depicted embodiment, is a logical representation of the physical storage media 110 of the non-volatile memory device 102. In certain embodiments, the non-volatile memory device 102 stores data sequentially, appending data to the log-based writing structure 1140 at an append point 1144. The non-volatile memory device 102, in a further embodiment, uses a storage space recovery process, such as a garbage collection module or other storage space recovery module that re-uses non-volatile storage media 110 storing deallocated/unused logical blocks. Non-volatile storage media storing deallocated/unused logical blocks, in the depicted embodiment, is added to an available storage pool 1146 for the non-volatile memory device 102. By clearing invalid data from the non-volatile memory device 102, as described above, and adding the physical storage capacity corresponding to the cleared data back to the available storage pool 1146, in one embodiment, the log-based writing structure 1140 is cyclic, ring-like, and has a theoretically infinite capacity.

In the depicted embodiment, the append point 1144 progresses around the log-based, append-only writing structure 1140 in a circular pattern 1142. In one embodiment, the circular pattern 1142 wear balances the non-volatile memory media 110, increasing a usable life of the non-volatile memory media 110. In the depicted embodiment, a garbage collection module or other storage capacity recovery process has marked several blocks 1148, 1150, 1152, 1154 as invalid, represented by an "X" marking on the blocks 1148, 1150, 1152, 1154. The garbage collection module, in one embodiment, will recover the physical storage capacity of the invalid blocks 1148, 1150, 1152, 1154 and add the recovered capacity to the available storage pool 1146. In the depicted embodiment, modified versions of the blocks 1148, 1150, 1152, 1154 have been appended to the log-based writing structure 1140 as new blocks 1156, 1158, 1160, 1162 in a read, modify, write operation or the like, allowing the original blocks 1148, 1150, 1152, 1154 to be recovered.

In one embodiment, workload data and key-value store data are intermingled in the log-based writing structure 1140. The mapping structure 1000, in a further embodiment, maps LBAs for both workload data and key-value store data to physical locations on the non-volatile memory media 110 of the log-based writing structure 1140. In this manner, a garbage collection module or other storage recovery process services both workload data and key-value store data, and both workload data and key-value store data receive the same data protection characteristics.

Figure 11:
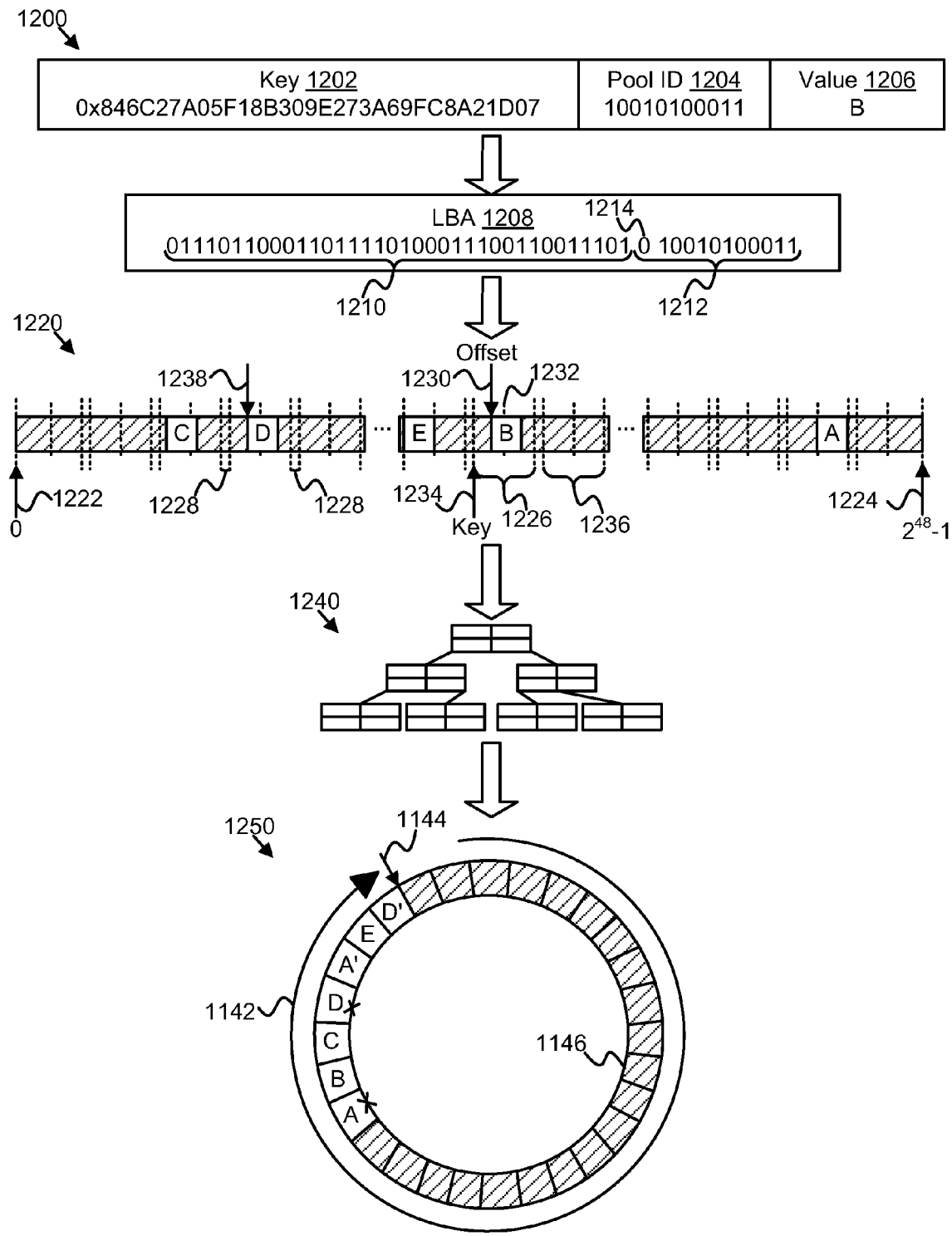
FIG. 11 is a schematic block diagram illustrating one embodiment of a key-value pair, a pool identifier, a logical address, a logical address space, a mapping structure, and a log-based writing structure.

FIG. 11 depicts one embodiment of a key-value pair 1200, a logical address 1208, a logical address space 1220, a logical-to-physical address mapping structure 1240, and a log-based writing structure 1250. In certain embodiments, the logical address space 1220, the logical-to-physical address mapping structure, and the log-based writing structure may be substantially similar to the logical address space 1120, the mapping structure 1000, and the log-based writing structure 1140 described above with regard to FIG. 10.

The put module 706 may receive the key-value pair 1200 from a client 114 as part of a PUT command and store the key-value pair 1200 in a key-value store 118, the get module 708 may retrieve the key-value pair 1200 from a key-value store 118 for a client 114 in response to a GET command, or the like as described above.

In one embodiment, the key-value pair 1200 includes a key 1202, a pool identifier 1204, and a data value 1206. The key 1202, in the depicted embodiment, comprises a 128 bit value represented in hexadecimal. The key-value mapping module 602, in certain embodiments, in response to a PUT command to store the key-value pair 1200, a GET command to retrieve the key-value pair 1200, or the like, hashes the key 1202 to determine a hash value from the key 1202. In a further embodiment, the key-value mapping module 602 may hash the key 1202 together with the pool identifier 1204 to determine the hash value. Hashing the key 1202 and the pool identifier 1204 together, in certain embodiments, may decrease the likelihood of hash collisions, may allow the use of similar keys 1202 in different key-value pools, or the like.

The key-value mapping module 602 may use the determined hash value as a key address portion 1210 of the logical address 1208 corresponding to the key-value pair 1200. In the depicted embodiment, the key address portion 1210 of the logical address 1208 is a 36 bit value and the key-value mapping module 602 hashes the 128 bit key 1202 into the 36 bit key address portion 1210.

The pool identifier 1204, in the depicted embodiment, comprises an 11 bit value, which the pool module 718 encodes directly into a value address portion 1212 of the logical address 1208. In other embodiments, as described above, the pool module 718 may hash a larger pool identifier 1204 into a smaller value address portion 1212. The value address portion 1212, in the depicted embodiment, includes a spacing portion 1214 of a single bit. The spacing portion 1214, in other embodiments, may comprise more than a bit, may share bits with the encoded pool identifier 1204 in the value address portion 1212, or the like. For example, the pool module 718 may encode the spacing portion 1214 and the pool identifier 1204 together so that the spacing portion 1214 and the pool identifier 1204 share bits of the value address portion 1212 by enforcing a cap on values that the value address portion 1212 may take, limiting the encoded pool identifier 1204 to less than the maximum encodeable value provided by the value address portion. Allocating a spacing portion 1214, in certain embodiments, ensures that the data value 1206 does not extend beyond a region 1226 of the logical address space 1220 allocated for the key-value pair 1200 by limiting the range of values that the value address portion 1212 may take. For example, a spacing portion 1214 comprising a binary zero positioned as depicted in FIG. 11 ensures that the value address portion 1212 does not exceed half of the maximum encodable value of the value address portion 1212.

The size and/or location of the spacing portion 1214, in one embodiment, is selected so that the value address portion 1212 provides a region 1226 of the logical address space 1220 large enough to fit an offset 1230 associated with the pool identifier 1204 and the data value 1206 stored at the offset 1230. A spacing portion 1214 of 1 bit, disposed adjacent to the encoded pool identifier 1204 in the logical address 1208, may divide each region 1226 of the logical address space 1220 in half 1232, ensuring that the offset 1230 falls in the first, lower order half of the region 1226, providing up to the second, higher order half of the region for addresses to blocks/sectors stored as the data value 1206. In other embodiments, the spacing portion 1214 may divide each region 1226 into portions with ratios other than one half, balancing the number of available key-value pools with the maximum size of data values 1206 supported.

In the depicted embodiment, with a pool identifier 1204 of 11 bits and a spacing portion 1214 of 1 bit, each half of the region 1226 is about 1 mebibyte, as described above in the example with regard to the pool module 718. In one embodiment, the spacing portion 1214 may comprise a binary zero so that the offset falls within the first, lower order half of the region 1226. While the spacing portion 1214 is depicted as separate from the pool identifier 1204, in certain embodiments, the spacing portion 1214 may be part of the pool identifier 1204, integrated/encoded with the pool identifier 1204, or the like. For example, one or more highest order bits of the pool identifier 1204 may comprise the spacing portion 1214, may be encoded or hashed into the spacing portion 1214, may comprise a binary zero, or the like.

The logical address space 1220, in one embodiment, begins at logical address "0" 1222 and extends to logical address "$2^{48}-1$" 1224. Allocating a range of lower order bits as a value address portion 1212, in certain embodiments, logically divides or segments the logical address space 1220 into equally sized regions 1226, slots, or compartments for each key-value pair 1200. The region 1226 associated with a key-value pair 1200, in one embodiment, begins at the logical address associated with the key address portion 1210, with the remainder of the logical address 1208 (e.g., the value address portion 1212) set to binary zeroes. As described above, in certain embodiments, a maximum data value size, an allocated size of each region 1226, or the like are selected to provide a buffer 1228 of at least one logical address between adjacent regions 1226. In the depicted embodiment, each region 1226 is sized so that a data value 1206 of a maximum size, stored at a maximum offset 1230 (e.g. at the half 1232 marker provided by the spacing portion 1214), will not extend into the buffer 1228. In other embodiments, regions 1226 may be disposed directly adjacent to each other at contiguous logical addresses, without a buffer 1228.

The data value 1206 is represented as "B" in the depicted embodiment. The data value 1206 is stored in the logical address space 1220 at the logical address 1208 for the key-value pair 1200, which includes the key address portion 1210 and the value address portion 1212, the key address portion 1210 determining a starting logical address 1234 for the region 1226 and the value address portion 1212 determining an offset 1230 within the region 1226 where the data value 1206 and associated key-value metadata are stored. If the key address portion 1210 is incremented by one, instead of mapping to the starting logical address 1234 and the associated region 1226, the incremented key address portion 1210 would map to the next region 1236.

The offset 1230 for the key-value pair 1200, in the depicted embodiment, is equal and identical to an offset 1238 for the data value "D," indicating that the key-value pair 1200 is a member of the same key-value pool as the key-value pair with the value "D." In one embodiment, offsets for key-value pairs 1200 are equal if the value address portions 1212 for the key-value pairs 1200 are equal, indicating that the key-value pairs 1200 are members of the same key-value pool. In embodiments where the pool module 718 hashes pool identifiers 1204 into the value address portion 1212, equal value address portions 1212 may potentially indicate a hash collision, and the pool module 718 may retrieve one or more pool identifiers 1204 stored as key-value metadata with the corresponding data values 1206 on the non-volatile memory media 110 to verify that the pool identifiers 1204 are equal, and that a hash collision has not occurred.

In one embodiment, the logical-to-physical address mapping structure 1240 may be substantially similar to the logical-to-physical address mapping structure 808 described above with regard to FIG. 8 and/or the mapping structure 1000 described above with regard to FIG. 10. As described above, in certain embodiments, the key-value mapping module 602, in cooperation with the pool module 718 or the like, upon determining the logical address 1220 from the key 1202 and the pool identifier 1204, uses the logical-to-physical address mapping structure 1240 to map the determined logical address 1208 to a physical location in the log-based writing structure 1250 of the non-volatile memory media 110.

In certain embodiments, while the key-value pairs 1200 are organized by key address portion 1210 in the logical address space 1220 and may be separated by buffers 1228, offsets 1230, 1238, or the like, the key-value pairs 1200 may be organized sequentially within the log-based writing structure 1250, in the order in which write or update operations for the key-value pairs 1200 were received from clients 114. For example, logical erase blocks of the non-volatile memory media 110 may be assigned sequence numbers to form the log-based writing structure 1250 and the device interface module 606 in cooperation with the non-volatile memory controller 104 may write key-value pairs 1200 sequentially within the logical erase blocks progressing through the sequence of logical erase blocks to preserve the order of operations within the log-based writing structure 1250.

Figure 12A:
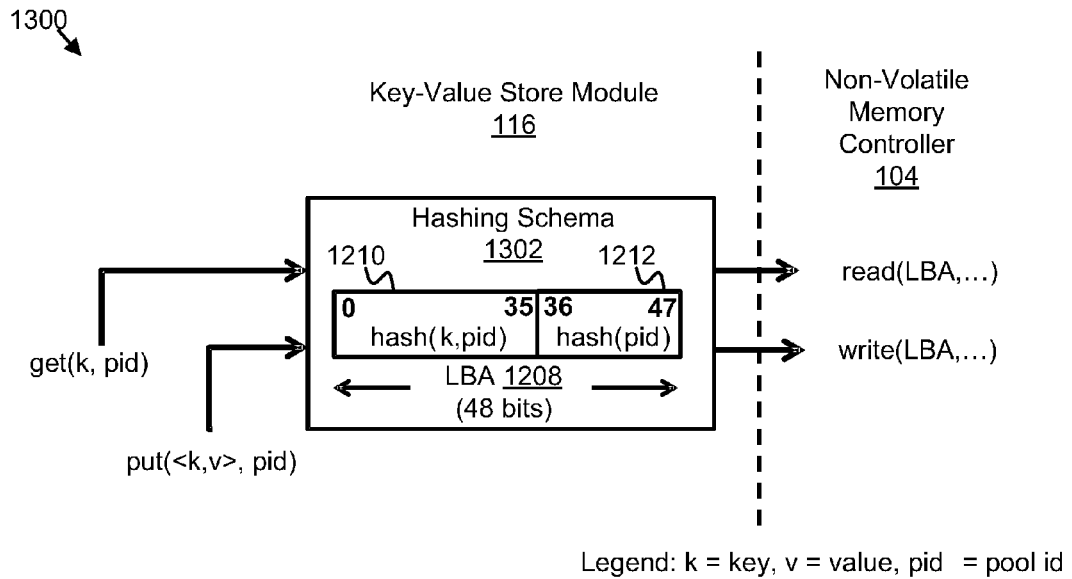
FIG. 12A is a schematic block diagram illustrating one embodiment of a system for key-value pool identifier encoding.

FIG. 12A depicts one embodiment of a system 1300 for key-value pool identifier encoding. The key-value store module 116 receives GET commands to retrieve key-value pairs from a key-value store 118, PUT commands to write key-values to a key-value store 118, and the like from clients 114 as described above. In the depicted embodiment, each GET command comprises a key and a pool identifier associated with a requested key-value pair. Each PUT command, in the depicted embodiment, comprises a key, a value, and a pool identifier associated with the key-value pair. The key-value store module 116, using the key-value mapping module 602 and/or the pool module 718, uses a deterministic hashing schema 1302 (described below) to hash together the key and the pool identifier into the key address portion 1210 of a logical address 1208 and to hash the pool identifier into the value address portion 1212 of the logical address 1208 to determine the logical address 1208. In the depicted embodiment, the logical address 1208 is 48 bits, with a 36 bit key address portion 1210 and a 12 bit value address portion 1212. The key-value store module 116, in response to determining the logical address 1208, may fulfill the GET command, the PUT command, or the like using a read operation, a write operation, or other primitive operations of the non-volatile memory controller 104 with the logical address 1208.

Figure 12B:
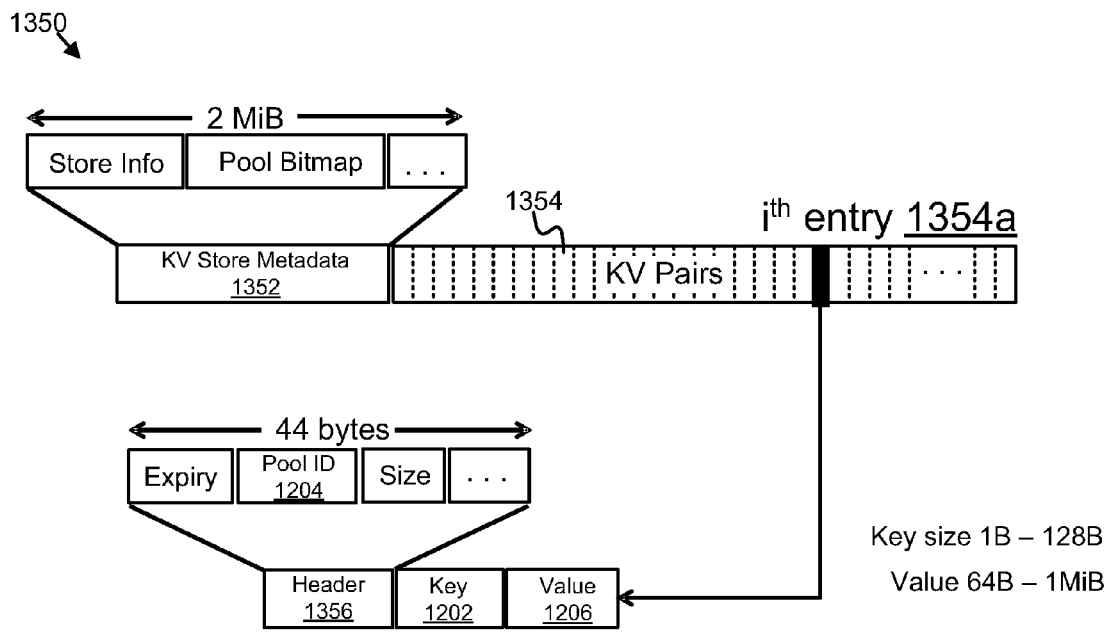
FIG. 12B is a schematic block diagram of a logical address space.

FIG. 12B depicts another embodiment of a logical address space 1350. The logical address space 1350 may comprise a logical address space of an entire non-volatile memory device 102, a logical address space of a VSU 122, or the like. In the depicted embodiment, the logical address space 1350 stores key-value store metadata 1352 at a first end of the logical address space 1350, such as key-value store information, key-value pool information, a key-value pool bitmap, and/or other metadata. The key-value store metadata 1352, in the depicted embodiment, is 2 mebibytes in size.

The logical address space 1350 stores key-value pairs after the key-value store metadata 1352, in a plurality of slots 1354, including an ith entry 1354*a*. The slots 1354, in certain embodiments, may be substantially similar to the regions 1226 described above with regard to FIG. 11. Each slot 1354 comprises a set of logical addresses of the logical address space 1350, such as the ranges or regions 1226 of logical addresses described above. In the depicted embodiment, each slot 1354 comprises an adjacent range of logical addresses.

An $i^{th}$ entry 1354*a*, in the depicted embodiment, is stored in the $i^{th}$ slot 1354. An entry, as used herein, comprises a slot 1354 that is populated with a key-value pair. The key-value pair entry 1354*a*, in the depicted embodiment, includes a header 1356 with a pool identifier 1204 and other key-value metadata such as an expiration, a size, and the like. The header 1356, as depicted, is 44 bytes. A key-value pair entry 1354*a*, in the depicted example embodiment, also includes the key 1202 and the value 1206 associated with the entry 1354*a*. In the example embodiment, each key 1202 may have a size between about 1 byte and 128 bytes and each value may have a size between about 64 bytes and 1 mebibyte.

For purposes of illustration, in one embodiment, the logical address space 1350 comprises a sparse logical address space of 48 bits, meaning that logical addresses of the logical address space 1350 are each 48 bits in length and are thus capable of representing/addressing up to $2^{48}$ different addresses. In the example, each logical address is associated with one block or sector of 512 bytes, and a maximum key-value pair size, including key-value metadata 1356, is less than 2 mebibytes. To accommodate the maximum key-value pair size, and to provide a buffer 1228 (See FIG. 11) of at least one logical address between adjacent key-value pairs as described above, the logical address space 1350 may be divided into slots 1354, for example of 2 mebibytes, or 4096 blocks or sectors. Because the logical address space 1350 is sparse, allocating slots 1354 larger than the maximum key-value pair size, in one embodiment, does not consume extra storage capacity of the non-volatile memory media 110, since the key-value pair, including key-value metadata 1356, is physically stored in the non-volatile memory media 110 and the remainder of the slot 1354 consumes logical addresses that are not mapped to the non-volatile memory media 110.

In the example, since it takes 36 bits of a logical address to address a slot 1354 of 4096 blocks or sectors, the least significant 12 bits (e.g., the last 12 bits) of a logical address define or specify an offset 1230 into a slot 1354, while the most significant 36 bits (e.g., the first 36 bits) of the logical address define or specify which slot 1354 is associated with the key-value pair of the logical address. In the example, the most significant 36 bits index or identify the slots 1354, so incrementing or decrementing the value of the most significant 36 bits identifies an adjacent slot 1354. As described above, in certain embodiments, the most significant bits of a logical address comprise a key address portion 1210 and the least significant bits comprise a value address portion 1212.

In embodiments without key-value pools, the least significant bits (e.g., the value address portion 1212) may have a default or known value, such as 0 or the like, providing a known offset 1230, such as an offset 1230 of 0, into the associated slot 1354. For example, if the key-value mapping module 602 hashes a key K1 into a 36 bit binary key address portion 1210 of 111100001111000011110000111100001111, and the default offset 1230 is 0, then the device interface module 606, using the atomic write module 730 and/or the conditional write module 738, stores the key-value pair, including key-value metadata 1356, at a logical address of 111100001111000011110000111100001111000000000000, appending a value address portion 1212 of 000000000000 to the key address portion 1210 to form the logical address. Even if the size of the key-value pair, including key-value metadata 1356, is the maximum key-value pair size it will be less than 2 mebibytes, and the key value pair will be stored with a buffer 1228 or gap of at least one block or sector logically separating the key value pair from the next slot 1354, which does not begin until logical address 111100001111000011110000111100010000000000000000.

In embodiments with key-value pools, as described above, the pool module 718 may encode the pool identifier 1204 as an offset 1230 into a region 1226 or slot 1354, instead of hardcoding the offset 1230 to 0 or another default value as described in the previous example. To store a key-value pair at an offset 1230 greater than 0 but to accommodate the same maximum key-value pair size, in one embodiment, the size of the slots 1354 may be larger in embodiments with key-value pools than in embodiments without, or the maximum key-value pair size may be smaller.

For example, in an embodiment with key-value pools, instead of allocating the 12 least significant bits of a logical address as a value address portion 1212 defining a slot size as described above, 13 least significant bits may be allocated. Or alternatively, in the example, a value address portion 1212 of 12 bits may be used, but the maximum key-value pair size may instead be reduced from less than 2 mebibytes to less than 1 mebibyte, or the like. In this example, with a maximum key-value pair size, including key-value metadata 1356, of less than 1 mebibyte, the device interface module 606 may store a key-value pair starting at an offset 1230 anywhere in the first 2048 blocks or sectors of a slot 1354, without storing the key-value pair either adjacent to or overlapping the next slot 1354, preserving a buffer 1228 or gap between the slots 1354.

In this example, if the key K1 is assigned to pool 5, the key-value mapping module 602 may hash K1 into 36 bits of 111100001111000011110000111100001111 and the key-value mapping module 602 may use the 36 bit hash value as a key address portion 1210, identifying a slot 1354 for the key-value pair as described above. Since the key K1 is in pool 5, in this example, the key-value mapping module 602, in cooperation with the pool module 718 or the like, may append a 12 bit value address portion 1212 of 000000000101, a binary 5, to the key address portion 1210 to form a logical address of 111100001111000011110000111100001111000000000101, and the device interface module 606 may write the key-value pair, which is less than 2048 contiguous blocks or sectors in the example, to the logical address. In this manner, each 4096 block slot 1354 is sized to accommodate an offset 1230 of up to 2048 blocks, a maximum key-value pair size of less than 2048 blocks, and a buffer 1228 or gap of at least one block between slots 1354.

Figure 13:
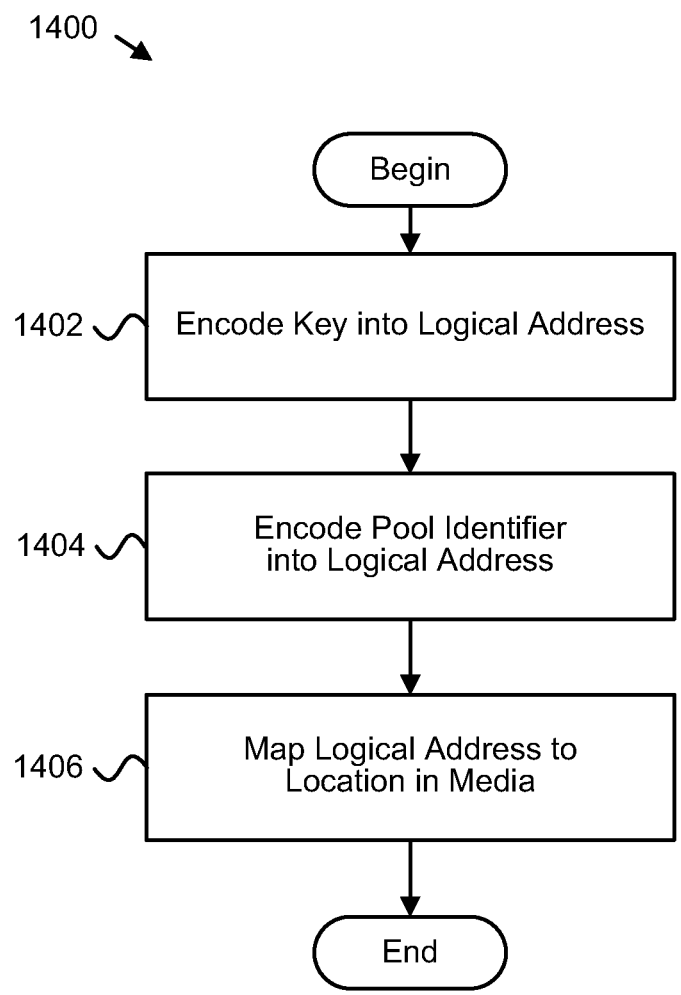
FIG. 13 is a schematic flow chart diagram illustrating one embodiment of a method for key-value pool identifier encoding.

FIG. 13 depicts one embodiment of a method 1400 for key-value pool identifier encoding. The method 1400 begins, and the key-value mapping module 602 encodes 1402 a key 1202 into a logical address 1208, in response to a PUT command to store or write a key-value pair, a GET command to read a key-value pair, or the like. As described above, the key-value mapping module 602 may encode 1402 the key 1202 into a key address portion 1210 of the logical address 1208 or the like. In one embodiment, the key-value mapping module 602 encodes 1402 the key 1202 by copying the key 1202 itself directly into the logical address 1208. In another embodiment, the key-value mapping module 602 encodes 1402 the key 1202 by hashing the key 1202 and copying the resulting hash value into the logical address 1208. In a further embodiment, the key-value mapping module 602 may encode 1402 the key 1202 by hashing the key 1202 and the pool identifier 1204 together and copying the resulting hash value into the logical address 1208.

The pool module 718 encodes 1404 the pool identifier 1204 into the logical address 1208. As described above, the pool module 718 may encode 1404 the pool identifier 1204 into a value address portion 1212 of the logical address 1208 or the like. In one embodiment, the pool module 718 encodes 1404 the pool identifier 1204 by copying the pool identifier 1204 itself directly into the logical address 1208. In other embodiments, the pool module 718 may encode 1404 the pool identifier 1204 by hashing the pool identifier 1204 and copying the resulting hash value into the logical address 1208.

The logical-to-physical translation layer 512 maps 1406 the logical address 1208 to a location of the value 1206 associated with the encoded 1402 key 1202 in the non-volatile memory media 110 and the method 1400 ends. The method 1400, in other embodiments, may include retrieving or reading the value 1206 from the mapped 1406 location, writing or storing the value 1206 to the mapped 1406 location, or the like to fulfill a key-value store command such as a PUT command or a GET command.

A means for encoding a key 1202 of a key-value pair 1200 into a logical address 1208 of a sparse logical address space 1220, 1350 for non-volatile memory media 110, in various embodiments, may include a key-value store module 116, a key-value mapping module 602, a hashing schema 1302, a non-volatile memory controller 104, a device driver installed for the non-volatile memory device 102 on the computer device 112, a client 114, a non-volatile memory controller 506, a hardware controller 520, other logic hardware, and/or other executable code stored on a computer readable storage medium. Other embodiments may include similar or equivalent means for encoding a key 1202 of a key-value pair 1200 into a logical address 1208 of a sparse logical address space 1220, 1350 for non-volatile memory media 110.

A means for encoding a pool identifier 1204 for a key-value pair 1200 into a logical address 1208 of a sparse logical address space 1220, 1350 for non-volatile memory media 110, in various embodiments, may include a key-value store module 116, a key-value mapping module 602, a pool module 718, a hashing schema 1302, a non-volatile memory controller 104, a device driver installed for the non-volatile memory device 102 on the computer device 112, a client 114, a non-volatile memory controller 506, a hardware controller 520, other logic hardware, and/or other executable code stored on a computer readable storage medium. Other embodiments may include similar or equivalent means for encoding a pool identifier 1204 for a key-value pair 1200 into a logical address 1208 of a sparse logical address space 1220, 1350 for non-volatile memory media 110.

A means for mapping a logical address 1208 to a location for a value 1206 of a key-value pair 1200 in non-volatile memory media 110, in various embodiments, may include a key-value store module 116, a logical-to-physical translation layer 512, a key-value mapping module 602, a non-volatile memory controller 104, a device driver installed for the non-volatile memory device 102 on the computer device 112, a non-volatile memory controller 506, a hardware controller 520, other logic hardware, and/or other executable code stored on a computer readable storage medium. Other embodiments may include similar or equivalent means for mapping a logical address 1208 to a location for a value 1206 of a key-value pair 1200 in non-volatile memory media 110.

A means for providing a buffer 1228 of at least one logical address between stored key-value pairs 1200, 1354 in a sparse logical address space 1220, 1350, in various embodiments, may include a key-value store module 116, a key-value mapping module 602, a pool module 718, a non-volatile memory controller 104, a device driver installed for the non-volatile memory device 102 on the computer device 112, a client 114, a non-volatile memory controller 506, a hardware controller 520, other logic hardware, and/or other executable code stored on a computer readable storage medium. Other embodiments may include similar or equivalent means for providing a buffer 1228 of at least one logical address between stored key-value pairs 1200, 1354 in a sparse logical address space 1220, 1350.

What is claimed is:

1. An apparatus comprising:
   a key-value mapping module configured to encode a key of a key-value pair into a key address portion of a logical address of a sparse logical address space for non-volatile storage media such that the logical address includes the encoded key;
   a pool module configured to encode a pool identifier for the key-value pair into a value address portion of the logical address, the value address portion having a number of bits such that the value address portion addresses at least a maximum size key-value pair value; and
   a logical-to-physical translation layer configured to map the logical address to a location of at least a portion of the value of the key-value pair in the non-volatile storage media;
   wherein at least a portion of the key-value mapping module, the pool module, and the logical-to-physical translation layer comprise one or more of logic hardware and a non-transitory computer readable storage medium storing executable code.

2. The apparatus of claim 1, further comprising a client interface module configured to receive one or more key-value store commands for the key-value pair from one or more clients and a device interface module configured to execute one or more primitive operations of a non-volatile storage controller for the non-volatile storage media to fulfill the one or more key-value store commands.

3. A method comprising:
   mapping a key of a key-value pair to a slot within a sparse logical address space of a non-volatile memory medium;
   determining an offset for the key-value pair within the slot based on a pool identifier for the key-value pair; and
   reading a populated range of data comprising a value of the key-value pair from a range of logical addresses including a logical address associated with the slot and the offset, the logical address associated with the slot and the offset including an identifier of the key.

4. The method of claim 3, wherein the populated range of data is read using a RANGE READ operation without providing the RANGE READ operation a length of the populated range of data.

5. The method of claim 3, wherein the populated range of data comprises the value of the key-value pair and metadata for the key-value pair, the populated range of data read using a single read operation.

6. The method of claim 3, wherein the sparse logical address space is segmented into a plurality of slots, each of the plurality of slots sized to provide a buffer of at least one logical address between stored key-value pairs in the sparse logical address space.

7. A method comprising:
encoding a key of a key-value pair into a logical address within a sparse logical address space for a non-volatile medium such that the logical address includes the encoded key;
mapping the logical address to a physical location on the non-volatile medium; and
storing a value of the key-value pair at the physical location.

8. The method of claim 7, wherein encoding the key comprises hashing the key and including a resulting hash value in the logical address.

9. The method of claim 8, further comprising re-hashing the key to a different logical address in response to locating an existing entry for the logical address in a logical-to-physical address mapping structure for the non-volatile medium.

10. The method of claim 7, further comprising creating a buffer of at least one logical address between stored key-value pairs in the sparse logical address space, wherein a storage capacity recovery process for the non-volatile medium is configured to copy the value of the key-value pair and the key-value metadata for the key-value pair to a contiguous location on the non-volatile medium in response to detecting the buffer between the stored key-value pairs during a storage capacity recovery operation for the key-value pair.

11. The method of claim 7, wherein storing the value comprises executing one or more primitive operations of a non-volatile storage controller for the non-volatile medium to atomically store the value and key-value metadata for the key-value pair contiguously at the physical location.

12. The method of claim 7, wherein the logical address comprises a value address portion, bits of the value address portion allocating an address range sized to address at least a maximum size for the value of the key-value pair.

13. The method of claim 7, wherein storing the value comprises storing the value within a logical address range associated with the key-value pair in response to (a) locating an existing logical address entry within the logical address range, the existing logical address entry for a different key-value pair; and (b) determining that the value will not overlap with a different value associated with the different key-value pair within the logical address range.

14. The method of claim 7, wherein the key of the key-value pair comprises a fingerprint and the value of the key-value pair comprises a deduplication index for the fingerprint.

15. The method of claim 7, further comprising evicting an existing key-value pair for the logical address from the non-volatile medium in response to encoding the key into the logical address, wherein the non-volatile medium is used as a cache.

16. An apparatus comprising:
a key-value mapping module configured to determine a logical address for a key-value pair based on a key of the key-value pair in response to a key-value command, the logical address including an identifier of the key;
an exists module configured to determine whether data for the logical address is stored in a non-volatile device based on a logical-to-physical address mapping structure for the non-volatile device; and
a device interface module configured to translate the key-value command to one or more storage operations for the non-volatile device to satisfy the key-value command.

17. The apparatus of claim 16, wherein the one or more storage operations comprise an ATOMIC WRITE operation configured to store a value of the key-value pair having a variable size and key-value metadata contiguously in a sequential, log-based data format for the non-volatile device.

18. The apparatus of claim 16, wherein the one or more storage operations comprise a CONDITIONAL WRITE operation configured to store a value of the key-value pair to the non-volatile device in response to the exists module determining that data for the logical address is not already stored in the non-volatile device and to fail in response to the exists module determining that data for the logical address is already stored in the non-volatile device.

19. The apparatus of claim 16, wherein the one or more storage operations comprise a PTRIM operation configured to persistently invalidate the key-value pair from the non-volatile device.

20. The apparatus of claim 19, wherein the PTRIM operation is configured to store a persistent indicator on the non-volatile device, the persistent indicator configured to exclude an invalidated key-value pair from reconstructed volatile metadata.

21. The apparatus of claim 16, wherein the one or more storage operations comprise a RANGE READ operation configured to return a populated range of data for a value of the key-value pair without adding data for an unfilled range.

22. The apparatus of claim 16, wherein existence of an entry for the logical address in the logical-to-physical mapping structure denotes storage of an existing data value for the logical address in the non-volatile device.

23. The apparatus of claim 22, wherein the exists module is configured to determine whether data for the logical address is stored in the non-volatile device using a RANGE EXISTS operation, the RANGE EXISTS operation configured to determine whether data is currently stored by the non-volatile device in an allocated range of logical addresses for the key-value pair by checking for entries in the allocated range in the logical-to-physical address mapping structure.

24. An apparatus comprising:
means for mapping a key of a key-value pair to a logical address for a non-volatile memory medium using a known transform such that the logical address includes the transformed key;
means for mapping a range of logical addresses including the logical address to a physical location in the non-volatile memory medium in response to determining that no other mapping exists for the range of logical addresses; and
means for writing a value of the key-value pair and associated key-value metadata to the physical location;
wherein the means for mapping a key, the means for mapping a range, and the means for writing a value comprise one or more of logic hardware and a non-transitory computer readable storage medium storing executable code.

25. The apparatus of claim 24, further comprising means for ensuring that a buffer of at least one logical address exists between the range of logical addresses for the key-value pair and a second range of logical addresses for a second key-value pair.

26. The apparatus of claim 24, further comprising means for mapping the key to a different logical address in response to determining that another mapping exists for the range of logical addresses.

27. A computer program product comprising a non-transitory computer readable storage medium storing computer usable program code executable to perform operations, the operations comprising:

hashing keys of key-value pairs into key address portions of logical addresses of a sparse logical address space for a non-volatile memory device such that the logical addresses include the hashed keys, value address portions of the logical addresses segmenting the sparse logical address space into ranges of contiguous logical addresses for the key-value pairs;

maintaining a logical-to-physical address mapping structure mapping the logical addresses to physical locations in the non-volatile memory device; and expiring a key-value pair from the key-value pairs by invalidating data of a range of logical addresses associated with the key-value pair.

28. The computer program product of claim 24, wherein the operations further comprise removing a mapping for the range of logical addresses associated with the key-value pair from the logical-to-physical address mapping structure in response to expiring the key-value pair.

29. The computer program product of claim 27, wherein invalidating the data comprises storing a persistent indicator on the non-volatile memory device, the persistent indicator configured to exclude the expired key-value pair from being reconstructed.

30. The computer program product of claim 27, wherein expiring the key-value pair is in response to one or more of an expiration request from a client, a key-value quota being satisfied, a predefined amount of time occurring since creation of the key-value pair, a predefined amount of time occurring since access of the key-value pair, and a storage capacity recovery event for the non-volatile memory device.

* * * * *